(12) United States Patent
Nakagami et al.

(10) Patent No.: US 8,824,542 B2
(45) Date of Patent: *Sep. 2, 2014

(54) IMAGE PROCESSING APPARATUS AND METHOD

(75) Inventors: Ohji Nakagami, Tokyo (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 477 days.

This patent is subject to a terminal disclaimer.

(21) Appl. No.: 13/147,291

(22) PCT Filed: Feb. 12, 2010

(86) PCT No.: PCT/JP2010/052016
§ 371 (c)(1),
(2), (4) Date: Aug. 1, 2011

(87) PCT Pub. No.: WO2010/095556
PCT Pub. Date: Aug. 26, 2010

(65) Prior Publication Data
US 2011/0286526 A1    Nov. 24, 2011

(30) Foreign Application Priority Data
Feb. 19, 2009    (JP) .................................. 2009-036497

(51) Int. Cl.
*H04B 1/66* (2006.01)
*H04N 7/30* (2006.01)
*H04N 7/50* (2006.01)
*H04N 7/36* (2006.01)
*H04N 7/26* (2006.01)

(52) U.S. Cl.
CPC ... *H04N 19/00715* (2013.01); *H04N 19/00818* (2013.01); *H04N 19/00781* (2013.01); *H04N 19/00121* (2013.01); *H04N 19/00721* (2013.01); *H04N 19/00066* (2013.01); *H04N 19/00787* (2013.01); *H04N 19/00896* (2013.01); *H04N 19/0089* (2013.01); *H04N 19/00024* (2013.01); *H04N 19/00545* (2013.01); *H04N 19/00436* (2013.01); *H04N 19/00036* (2013.01)
USPC ....................................................... 375/240

(58) Field of Classification Search
USPC ....................................................... 375/240
See application file for complete search history.

(56) References Cited

U.S. PATENT DOCUMENTS 6,633,676 B1    10/2003    Kleihorst et al.
2006/0062299 A1    3/2006    Park et al.
(Continued)

FOREIGN PATENT DOCUMENTS

EP    1 811 786 A1    7/2007
JP    8 154250    6/1996
(Continued)

OTHER PUBLICATIONS

U.S. Appl. No. 13/201,351, filed Aug. 12, 2011, Nakagami, et al.
(Continued)

*Primary Examiner* — Sath V Perungavoor
*Assistant Examiner* — Peter D Le
(74) *Attorney, Agent, or Firm* — Oblon, Spivak, McClelland, Maier & Neustadt, L.L.P.

(57) ABSTRACT

An image processing apparatus and method that can improve encoding efficiency while preventing an increase in load. An extraction circuit of a filtering prediction circuit extracts motion compensation images for generating a prediction image in a high-resolution enhancement layer from reference frames in a low-resolution base layer. A filtering circuit of the filtering prediction circuit performs filtering, which involves upconversion and which uses analysis in the time direction, on a plurality of motion compensation images in the base layer extracted by the extraction circuit to generate a prediction image in the enhancement layer. The image processing apparatus may be an encoding apparatus or a decoding apparatus.

13 Claims, 26 Drawing Sheets

(56) References Cited

U.S. PATENT DOCUMENTS

| | | |
|---|---|---|
| 2006/0153295 A1 | 7/2006 | Wang et al. |
| 2006/0188024 A1* | 8/2006 | Suzuki et al. ............ 375/240.23 |
| 2007/0071104 A1* | 3/2007 | Kondo ..................... 375/240.21 |
| 2007/0086520 A1 | 4/2007 | Kim |
| 2007/0098068 A1 | 5/2007 | Kimata et al. |
| 2007/0183072 A1 | 8/2007 | Lee |
| 2007/0291847 A1 | 12/2007 | Shimauchi et al. |
| 2008/0260043 A1 | 10/2008 | Bottreau et al. |
| 2009/0010568 A1 | 1/2009 | Nakagami et al. |
| 2009/0074061 A1 | 3/2009 | Yin et al. |
| 2009/0080535 A1 | 3/2009 | Yin et al. |
| 2009/0112272 A1 | 4/2009 | Schleicher et al. |
| 2009/0116760 A1 | 5/2009 | Boon et al. |
| 2009/0262803 A1 | 10/2009 | Wang et al. |
| 2010/0118963 A1 | 5/2010 | Nakagami et al. |
| 2010/0183072 A1 | 7/2010 | Nakagami et al. |
| 2010/0260260 A1* | 10/2010 | Wiegand et al. ......... 375/240.12 |
| 2011/0122953 A1 | 5/2011 | Nakagami et al. |
| 2011/0123131 A1 | 5/2011 | Nakagami et al. |
| 2012/0177117 A1 | 7/2012 | Wang et al. |

FOREIGN PATENT DOCUMENTS

| | | |
|---|---|---|
| JP | 2007 81983 | 3/2007 |
| JP | 2008 104188 | 5/2008 |
| JP | 2009 502099 | 1/2009 |
| WO | WO 2007/008286 A1 | 1/2007 |

OTHER PUBLICATIONS

U.S. Appl. No. 13/147,981, filed Aug. 4, 2011, Nakagami, et al.

Extended European Search Report issued Oct. 18, 2012, in Application No. / Patent No. 10743683.4-2223 / 2400760 PCT/JP2010052016.

Soon-kak Kwon, et al., "Overview of H.264/MPEG-4 part 10", Journal of Visual Communication and Image Representation, Academic Press, vol. 17, No. 2, XP024905089, Apr. 1, 2006, pp. 186-216.

Irani, M. et al., "Improving Resolution by Image Registration", CVGIP: Graphical Models and Image Processing, vol. 53, No. 3, pp. 231-239, (1991).

International Search Report Issued May 18, 2010 in PCT/JP10/052016 filed Feb. 12, 2010.

* cited by examiner

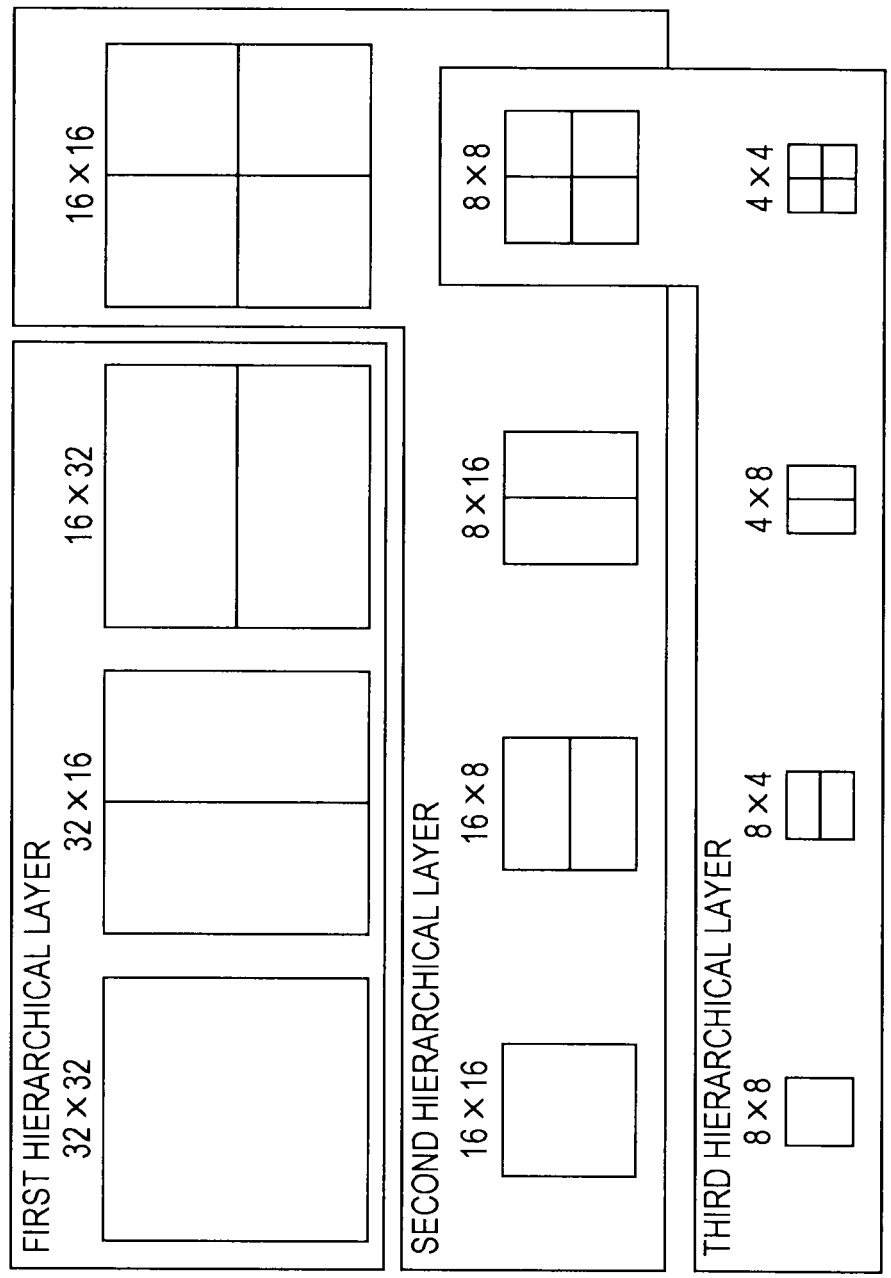

IMAGE PROCESSING APPARATUS AND METHOD

TECHNICAL FIELD

The present invention relates to an image processing apparatus and method, and more specifically to an image processing apparatus and method that can improve encoding efficiency while preventing an increase in load.

BACKGROUND ART

Conventionally, encoding schemes using motion compensation and the orthogonal transform such as the discrete cosine transform, Karhunen-Loève transform, or wavelet transform, including MPEG (Moving Picture Experts Group), H.26x, etc., have been generally utilized as encoding schemes in the case of handling moving images. In these moving image encoding schemes, the reduction in amount of code is achieved by utilizing the correlation in the spatial direction and time direction among the characteristics of an input image signal to be encoded.

For example, in H.264, unidirectional prediction or bidirectional prediction is used when an inter-frame that is a frame to be subjected to inter-frame prediction (inter-prediction) is generated utilizing the correlation in the time direction. Inter-frame prediction is designed to generate a prediction image on the basis of frames at different times.

Furthermore, in SVC (Scalable Video Coding), which is a standard extension of H.264, an encoding scheme that takes spatial scalability into account has been established. The SVC (H.264/AVC Annex G) is the up-to-date video coding standard that was standardized in November 2007 by ITU-T (International Telecommunication Union Telecommunication Standardization Sector) and ISO/IEC (International Organization for Standardization/International Electrotechnical Commission).

FIG. 1 illustrates a reference relationship to create a prediction image for compression that takes spatial scalability into account in the SVC. In the SVC, encoding is performed at a plurality of resolutions in, for example, a base layer and an enhancement layer illustrated in FIG. 1. In the case of the example in FIG. 1, as a base layer, an image having a resolution of n×m [pixel (pix)] (n and m are integers) is encoded using spatial scalability. Together with this, an image having a resolution of N×M [pixel (pix)] (N and M are integers, where N>n and M>m), as an enhancement layer, is encoded using spatial scalability.

In the case of the base layer, the current frame is encoded utilizing intra-prediction or inter-prediction similarly to the case of encoding based on the H.264 standard. In the case of the example in FIG. 1, when encoding of the base layer is performed, two reference planes (Ref0, Ref1) are used. Motion compensation images (MC0, MC1) from the individual reference planes are extracted, and inter-prediction is performed.

Also in the case of the enhancement layer, similarly to the case of the basic layer, the current frame can be encoded utilizing intra-prediction or inter-prediction.

In the case of intra-prediction, prediction is performed utilizing spatial correlation in the enhancement layer of the current frame. Intra-prediction is effective in a moving image to be encoded when the correlation in the time direction is low, such as when the subject moves a small amount. In general, in general moving images, however, in many cases, the correlation in the time direction is higher than prediction in the spatial direction, and intra-prediction cannot be said to be optimum in terms of encoding efficiency.

In the case of inter-prediction, decoded images in the enhancement layer of temporally preceding or following frames are used as reference planes. Inter-prediction uses correlation in the time direction, and thus makes high encoding efficiency feasible. However, it is necessary that it be necessary to decode in advance high-resolution frame images in the enhancement layer that serve as reference planes. Furthermore, it is also necessary to save the high-resolution images in a memory in order to utilize them for reference. Moreover, it is necessary to read the high-resolution images having a large amount of data from the memory. Accordingly, inter-prediction can be said to be a scheme that imposes a large load in terms of the amount of processing and implementation cost.

In this regard, in the case of the enhancement layer, in addition to the above two schemes, a prediction method based on spatial upsampling (upconversion) of the base layer (hereinafter referred to as upconversion prediction) can be used to encode the current frame.

An image in the base layer is a low-resolution version of an image in the enhancement layer, and can therefore be considered to include a signal corresponding to the low-frequency components of the image in the enhancement layer. That is to say, the image in the enhancement layer can be obtained by adding high-frequency components to the image in the base layer. Upconversion prediction is a method for performing prediction utilizing such correlation between layers, and is a prediction method useful to improve encoding efficiency particularly in a case where intra- or inter-prediction does not apply. Furthermore, this prediction method decodes the image in the enhancement layer of the current frame merely by decoding the image at the same time in the base layer, and can therefore be said to be a prediction scheme that is excellent (that imposes a small load) also in terms of the amount of processing.

Meanwhile, processes for increasing resolution include a technique for performing motion compensation and FIR filtering of pixel values to convert the correlation in the time direction into the spatial resolution for utilization. (See, for example, NPL 1).

In the method described in NPL 1, the correlation in the time direction is utilized for the process for increasing the resolution of an input image sequence. Specifically, difference information on a motion-predicted/compensated image between the current image and the previous image is calculated, and is fed back to the target current image to recover the high-frequency component included in the input image.

CITATION LIST

Non Patent Literature

NPL 1: "Improving Resolution by Image Registration", MICHAL IRANI AND SHMUEL PELEG, Department of Computer Science, The Hebrew University of Jerusalem, 91904 Jerusalem, Israel, Communicated by Rama Chellapa, Received Jun. 16, 1989; accepted May 25, 1990

SUMMARY OF INVENTION

Technical Problem

However, upconverting a low-resolution image causes an image having a small number of high-frequency components to be generated due to an influence of a linear interpolation filter. In upconversion prediction, therefore, only a prediction image having a small number of high-frequency components can be obtained. That is to say, in upconversion prediction, it cannot be said that pixel information in the base layer, which has been transmitted, is sufficiently utilized to perform prediction. In the enhancement layer, therefore, a large amount of code may be needed to encode a residual signal.

As above, in conventional encoding and decoding methods, it has been difficult to achieve both improvement in encoding efficiency and prevention of an increase in load.

Thus, there may be conceived a method in which improvement in encoding efficiency is realized by applying an image processing technique as described in NPL 1 for converting the temporal correlation of a moving image into the spatial resolution. However, the method described in NPL 1 cannot be simply applied to the SVC.

For example, in inter-prediction, the resolution of a motion compensation image obtained from a reference plane is the same as that of a prediction image that is generated, and the method described in NPL 1 cannot be applied to upconversion prediction. Furthermore, in upconversion prediction, since a prediction image is generated only from the image of the current frame in the base layer, the method described in NPL 1 where the resolution is increased using three images cannot be applied to upconversion prediction.

The present invention has been proposed in view of the above situation, and is intended to perform encoding that takes spatial scalability into account, by more efficiently utilizing the temporal correlation included in a signal sequence in a moving image, thereby enabling improvement in encoding efficiency while preventing an increase in the load of processes such as encoding and decoding.

Solution to Problem

One aspect of the present invention provides an image processing apparatus including decoding means for decoding an encoded image; generating means for adding an image decoded by the decoding means and a prediction image and for generating a decoded image; extracting means for performing motion compensation using, as reference frames, frames formed of decoded images generated by the generating means and using motion vectors in the images that have been encoded, and for extracting motion compensation images having a lower resolution than the prediction image from the reference frames corresponding to the prediction image; and prediction image generating means for performing a filtering process for compensating the motion compensation images extracted by the extracting means for high-frequency components by utilizing correlation in a time direction that is included in the motion compensation images, thereby generating the prediction image that has a higher resolution than the motion compensation images.

The encoded image has been hierarchically decomposed into images in a plurality of layers having different resolutions and the images have been encoded; the decoding means can decode the encoded image in each layer; the generating means can generate the decoded image in each layer; when decoding of a high-resolution layer is to be performed, the extracting means can use, as the reference frames, frames in a layer having a lower resolution than the layer, and extract motion compensation images from the reference frames in the layer having a lower resolution; and the prediction image generating means can generate the prediction image in the high-resolution layer by performing the filtering process on the motion compensation images extracted from the reference frames in the layer having a lower resolution.

The prediction image generating means can include resolution converting means for converting a resolution of a difference image between a plurality of motion compensation images extracted by the extracting means and increasing the resolution; first filter means for applying a low-pass filter to the difference image whose resolution has been increased by the resolution converting means; second filter means for applying a high-pass filter to an image obtained by applying a low-pass filter by the first filter means; and adding means for adding the image obtained by applying a low-pass filter by the first filter means and an image obtained by applying a high-pass filter by the second filter means to one of the plurality of motion compensation images extracted by the extracting means, and for generating the prediction image.

The adding means can add the image obtained by applying a low-pass filter by the first filter means and the image obtained by applying a high-pass filter by the second filter means to a motion compensation image extracted from a preceding frame with respect to a time of the prediction image.

The image processing apparatus can further include unidirectional prediction means for performing unidirectional prediction using a plurality of motion compensation images, and for generating the prediction image; bidirectional prediction means for performing bidirectional prediction using a plurality of motion compensation images, and for generating the prediction image; and judging means for judging whether the prediction image is to be generated through unidirectional prediction by the unidirectional prediction means, generated through bidirectional prediction by the bidirectional prediction means, or generated through the filtering process by the prediction image generating means, by using an identification flag included in a header of the encoded image.

One aspect of the present invention further provides an image processing method including decoding an encoded image; adding a decoded image and a prediction image and generating a decoded image; performing motion compensation using, as reference frames, frames formed of generated decoded images and using motion vectors in the images that have been encoded, and extracting motion compensation images having a lower resolution than the prediction image from the reference frames corresponding to the prediction image; and performing a filtering process for compensating the extracted motion compensation images for high-frequency components by utilizing correlation in a time direction that is included in the motion compensation images, thereby generating the prediction image that has a higher resolution than the motion compensation images.

Another aspect of the present invention provides an image processing apparatus including encoding means for encoding an original image that is an image to be encoded, and for generating an encoded image; detecting means for detecting motion vectors on the basis of images and the original image, each of the images being obtained by performing local decoding on the basis of a residual signal indicating a difference between the original image and a prediction image; extracting means for performing motion compensation using, as reference frames, frames formed of the images obtained by performing local decoding and using the motion vectors detected by the detecting means, and for extracting motion compensation images having a lower resolution than the prediction images from the reference frames corresponding to the prediction images; and generating means for performing a filtering process for compensating the motion compensation images extracted by the extracting means for high-frequency components by utilizing correlation in a time direction that is included in the motion compensation images, thereby generating a prediction image having a higher resolution than the motion compensation images.

The encoding means can generate encoded images in a plurality of layers having different resolutions; when decoding of a high-resolution layer is to be performed, the extracting means can use, as the reference frames, frames in a layer having a lower resolution than the layer, and extract motion compensation images from the reference frames in the layer having a lower resolution using motion vectors detected in the layer having a lower resolution by the detecting means; and the generating means can generate a prediction image in the high-resolution layer by performing the filtering process on the motion compensation images extracted from the reference frames in the layer having a lower resolution.

The generating means can include resolution converting means for converting a resolution of a difference image between a plurality of motion compensation images extracted by the extracting means and increasing the resolution; first filter means for applying a low-pass filter to the difference image whose resolution has been increased by the resolution converting means; second filter means for applying a high-pass filter to an image obtained by applying a low-pass filter by the first filter means; and adding means for adding the image obtained by applying a low-pass filter by the first filter means and an image obtained by applying a high-pass filter by the second filter means to one of the plurality of motion compensation images extracted by the extracting means, and generating the prediction image.

The adding means can add the image obtained by applying a low-pass filter by the first filter means and the image obtained by applying a high-pass filter by the second filter means to a motion compensation image extracted from a preceding frame with respect to a time of the prediction image.

The encoding means can make a header include an identification flag identifying whether a prediction image to be added to an image decoded by a decoding apparatus is to be generated through unidirectional prediction, generated through bidirectional prediction, or generated through the filtering process.

Another aspect of the present invention further provides an image processing method including encoding an original image that is an image to be encoded, and generating an encoded image; detecting motion vectors on the basis of images and the original image, each of the images being obtained by performing local decoding on the basis of a residual signal indicating a difference between the original image and a prediction image; performing motion compensation using, as reference frames, frames formed of the images obtained by performing local decoding and using the detected motion vectors, and extracting motion compensation images having a lower resolution than the prediction images from the reference frames corresponding to the prediction images; and performing a filtering process for compensating the extracted motion compensation images for high-frequency components by utilizing correlation in a time direction that is included in the motion compensation images, thereby generating a prediction image having a higher resolution than the motion compensation images.

In one aspect of the present invention, an encoded image is decoded; a decoded image and a prediction image are added and a decoded image is generated; motion compensation is performed using, as reference frames, frames formed of generated decoded images and using motion vectors in the images that have been encoded, and extracting motion compensation images having a lower resolution than the prediction image from the reference frames corresponding to the prediction image; and a filtering process for compensating the extracted motion compensation images for high-frequency components by utilizing correlation in a time direction that is included in the motion compensation images is performed, thereby generating the prediction image that has a higher resolution than the motion compensation images.

In another aspect of the present invention, an original image that is an image to be encoded is encoded, and an encoded image is generated; motion vectors are detected on the basis of images and the original image, each of the images being obtained by performing local decoding on the basis of a residual signal indicating a difference between the original image and a prediction image; motion compensation is performed using, as reference frames, frames formed of the images obtained by performing local decoding and using the detected motion vectors, and motion compensation images having a lower resolution than the prediction images are extracted from the reference frames corresponding to the prediction images; and a filtering process for compensating the extracted motion compensation images for high-frequency components by utilizing correlation in a time direction that is included in the motion compensation images is performed, thereby generating a prediction image having a higher resolution than the motion compensation images.

Advantageous Effects of Invention

According to the present invention, information can be processed. In particular, a high-accuracy prediction image can be generated and encoding efficiency can be improved without increasing a load more than necessary.

BRIEF DESCRIPTION OF DRAWINGS

FIG. 26 is a diagram illustrating examples of the size of a macroblock.

DESCRIPTION OF EMBODIMENTS

Modes for carrying out the invention (hereinafter, embodiments) will be explained hereinafter. Note that the explanation will be given in the following order:
1. First embodiment (decoding process)
2. Second embodiment (encoding process)
3. Third embodiment (decoding process with three or more motion compensation images)
4. Fourth embodiment (decoding process and encoding process using motion compensation images in the same layer)

1. First Embodiment

Overview of Prediction

Figure 2:
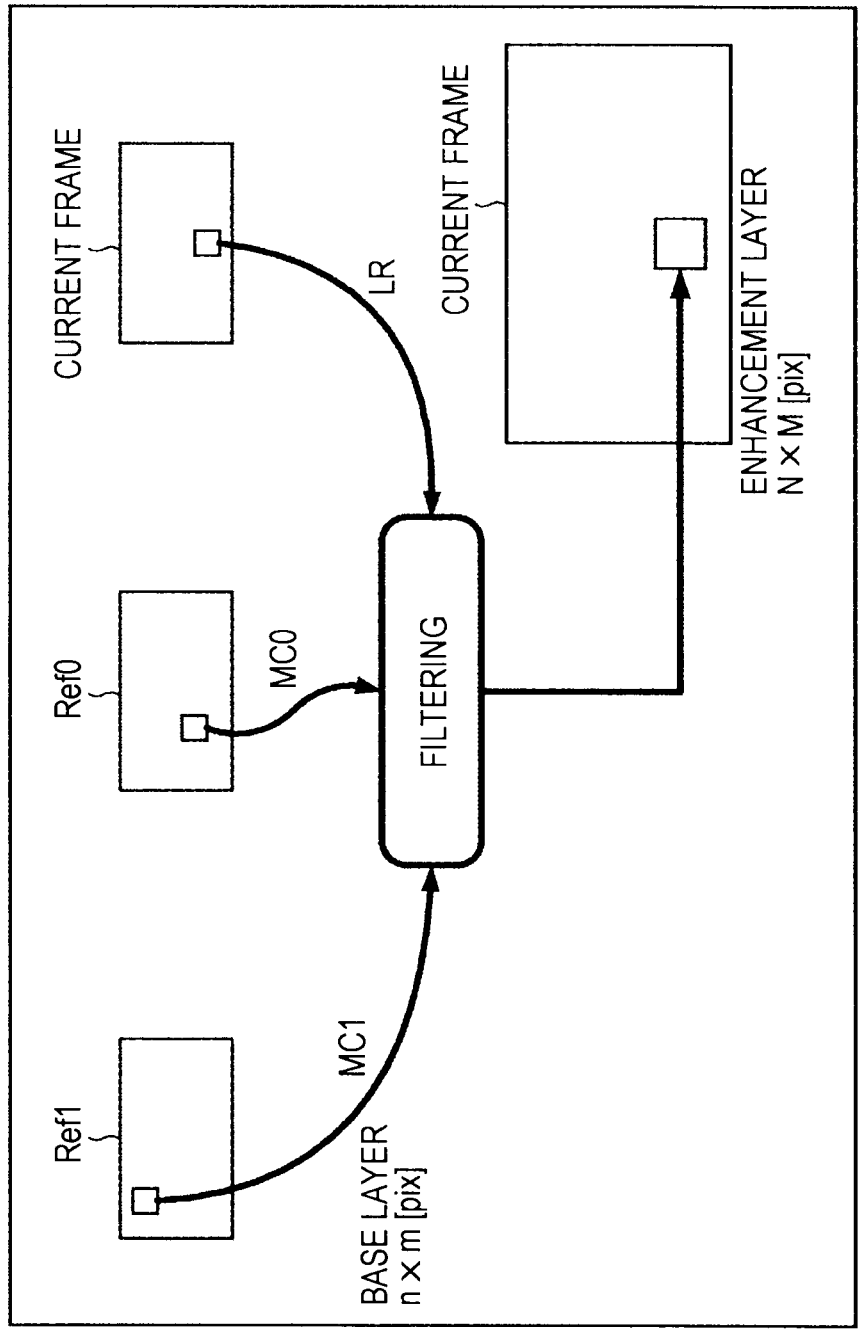
FIG. 2 is a diagram explaining an overview of the generation of a prediction image to which the present invention is applied.

FIG. 2 is a diagram explaining an overview of a prediction image generation method to which the present invention is applied. As illustrated in FIG. 2, in this case, filtering is performed on images of a plurality of reference planes in a base layer to generate a prediction image of the current block (processing target block at the current time) in an enhancement layer.

In this manner, using the analysis in the time direction makes it possible to more efficiently utilize signal components in an image sequence than using a spatial upsampling filter. As a result, a prediction image generated by the technique of the present invention (hereinafter referred to as filtering prediction) can reduce prediction residuals while having spatially higher frequency components than a prediction image generated through conventional upconversion prediction that utilizes the image of the current frame (processing target frame at the current time) in the base layer. That is to say, the amount of code for a picture to be encoded in the enhancement layer can be reduced, and it is possible to contribute to the improvement in encoding efficiency.

Moreover, in this filtering prediction, decoded images in the enhancement layer at temporally different frames are not referred to. Thus, the amount of processing necessary for encoding, the temporary storage capacity, the amount of information read from a memory, and the like can be reduced, and the cost taken for implementation can be reduced. Furthermore, power consumption can also be reduced.

[Configuration of Decoding Apparatus]

Figure 3:
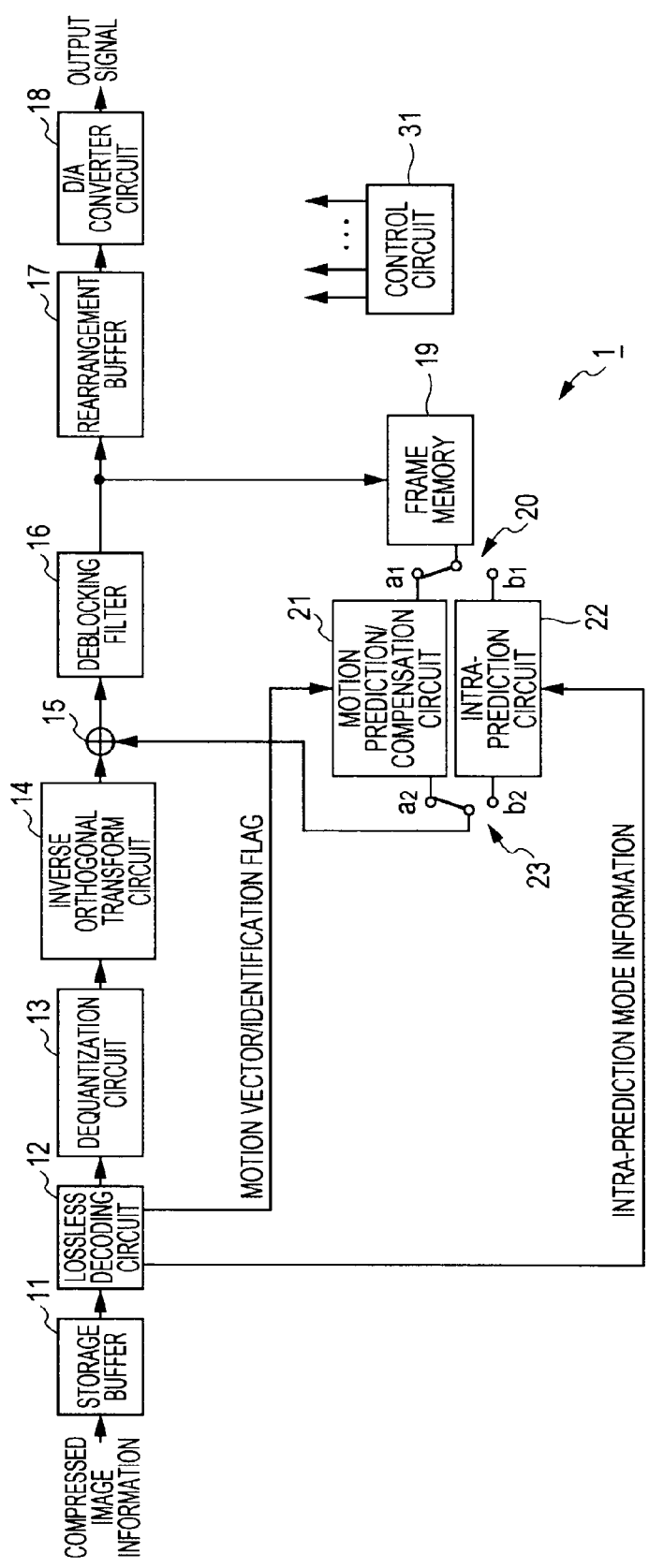
FIG. 3 is a block diagram illustrating an example configuration of a main part of a decoding apparatus to which the present invention is applied.

FIG. 3 is a block diagram illustrating an example configuration of a decoding apparatus 1 according to an embodiment of the present invention.

Image information encoded by an encoding apparatus described below is input to the decoding apparatus 1 via a cable, a network, or a removable medium. Examples of the compressed image information include image information encoded in accordance with the H.264/SVC standard.

In the SVC, compressed image information is composed of layers of a plurality of resolutions. The layer of the lowest resolution is a base layer, and layers of higher resolutions than the base layer are enhancement layers. Note that the number of layers is arbitrary; however, in the following description, it is assumed that compressed image information is composed of two layers. That is, compressed image information input to the decoding apparatus 1 has the base layer and one enhancement layer.

Compressed image information of each frame is sequentially input to the decoding apparatus 1. In each frame, bit streams of the respective layers from the low-resolution side to the high-resolution side are sequentially input. That is to say, the bit stream in the base layer is earlier input to the decoding apparatus 1.

The bit stream in the base layer is decoded in a manner similar to that in the case of compressed image information based on the H.264/AVC standard, and the explanation thereof is thus omitted here. After the bit stream in the base layer is decoded, the bit stream in the enhancement layer is input to the decoding apparatus 1. Basically, a process on the bit stream in the enhancement layer will be explained hereinafter.

A storage buffer 11 sequentially stores bit streams input as compressed image information. The information stored in the storage buffer 11 is read by a lossless decoding circuit 12 in units of images of certain units such as macroblocks forming a frame, as appropriate. In the H.264 standard, it is also possible to perform processing instead of in units of macroblocks of 16×16 pixels, in units of blocks into which a macroblock is further divided, such as blocks of 8×8 pixels or 4×4 pixels.

The lossless decoding circuit 12 performs a decoding process corresponding to an encoding scheme, such as a variable-length decoding process or an arithmetic decoding process, on an image read from the storage buffer 11. The lossless decoding circuit 12 outputs a quantized transform coefficient, which is obtained by performing the decoding process, to a dequantization circuit 13.

Furthermore, the lossless decoding circuit 12 identifies a prediction method on the basis of an identification flag included in the header of the image to be decoded. In a case where it is judged that the image to be decoded is an intra-coded image, the lossless decoding circuit 12 outputs intra-prediction mode information stored in the header of the image to an intra-prediction circuit 22. The intra-prediction mode information includes information regarding intra-prediction, such as the size of a block used as the unit of the process.

In a case where it is judged that the image to be decoded is inter-coded information, the lossless decoding circuit 12 outputs motion vectors and an identification flag that are stored in the header of the image to a motion prediction/compensation circuit 21. The mode of prediction in which a prediction image is to be generated through inter-prediction is identified using the identification flag. Identification flags are set in units of, for example, macroblocks or frames.

In addition to the mode of unidirectional prediction, the mode of bidirectional prediction, and the mode of upconversion prediction, the modes of prediction that are prepared include the mode of filtering prediction for generating a prediction image by performing filtering on motion compensation images extracted from a plurality of reference frames located in one or both temporal directions in the base layer.

Hereinafter, the mode of prediction in which a pixel value in one motion compensation image among motion compensation images extracted from a plurality of reference frames located in one direction is set as a pixel value in a prediction image is simply referred to as a unidirectional prediction mode. Furthermore, the mode of prediction in which the average value of pixel values in motion compensation images individually extracted from a plurality of reference frames located in both directions is set as a pixel value in a prediction image is simply referred to as a bidirectional prediction mode. Moreover, the mode of prediction in which a motion compensation image extracted from the current frame in the base layer is upconverted to determine a pixel value in a prediction image is simply referred to as an upconversion prediction mode.

The fourth mode of prediction as illustrated in FIG. 2 in which a pixel value in a prediction image is determined by performing filtering including upconversion on each of motion compensation images extracted from a plurality of reference frames located in one or both directions of the base layer is referred to as a filtering prediction mode.

The dequantization circuit 13 performs dequantization on the quantized transform coefficient supplied from the lossless decoding circuit 12 using a scheme corresponding to the quantization scheme used on the encoding side. The dequantization circuit 13 outputs a transform coefficient obtained by performing dequantization to an inverse orthogonal transform circuit 14.

The inverse orthogonal transform circuit 14 performs, for example, the fourth-order inverse orthogonal transform on the transform coefficient supplied from the dequantization circuit 13 using a scheme corresponding to the orthogonal transform scheme on the encoding side, such as the discrete cosine transform or Karhunen-Loève transform, and outputs an obtained image to an adder circuit 15.

The adder circuit 15 combines the decoded image supplied from the inverse orthogonal transform circuit 14 and a prediction image supplied from the motion prediction/compensation circuit 21 or from the intra-prediction circuit 22 via a switch 23, and outputs a composite image to a deblocking filter 16.

The deblocking filter 16 removes block noise included in the image supplied from the adder circuit 15, and outputs an image from which the block noise has been removed. The image output from the deblocking filter 16 is supplied to a rearrangement buffer 17 and a frame memory 19.

The rearrangement buffer 17 temporarily stores the image supplied from the deblocking filter 16. The rearrangement buffer 17 generates an individual frame from an image of, for example, every macroblock that is stored, and rearranges the generated frames in certain order such as display order before outputting them to a D/A (Digital/Analog) converter circuit 18.

The D/A converter circuit 18 performs D/A conversion on each of the frames supplied from the rearrangement buffer 17, and outputs the signals of the frames to outside.

The frame memory 19 temporarily stores the image supplied from the deblocking filter 16. The information stored in the frame memory 19 is supplied to the motion prediction/compensation circuit 21 or the intra-prediction circuit 22 via a switch 20. Note that the frame memory 19 also stores an image in the base layer that has been decoded prior to the decoding of the enhancement layer and the stored image is utilized for the decoding of the enhancement layer, as described below.

The switch 20 is connected to a terminal a1 in a case where a prediction image is to be generated through inter-prediction, and is connected to a terminal b1 in a case where a prediction image is to be generated through intra-prediction. The switching of the switch 20 is controlled by, for example, a control circuit 31.

The motion prediction/compensation circuit 21 determines a prediction mode in accordance with the identification flag supplied from the lossless decoding circuit 12, and selects frames to be used as reference frames, from among decoded frames that are stored in the frame memory 19, in accordance with the prediction mode. The motion prediction/compensation circuit 21 determines macroblocks corresponding to the target prediction image from among macroblocks forming the reference frames on the basis of the motion vectors supplied from the lossless decoding circuit 12, and extracts the determined macroblocks as motion compensation images. The motion prediction/compensation circuit 21 determines a pixel value in a prediction image from pixel values in the motion compensation images in accordance with the prediction mode, and outputs the prediction image whose pixel values have been determined to the adder circuit 15 via the switch 23.

The intra-prediction circuit 22 performs intra-prediction in accordance with the intra-prediction mode information supplied from the lossless decoding circuit 12, and generates a prediction image. The intra-prediction circuit 22 outputs the generated prediction image to the adder circuit 15 via the switch 23.

The switch 23 is connected to a terminal a2 in a case where a prediction image has been generated by the motion prediction/compensation circuit 21, and is connected to a terminal b2 in a case where a prediction image has been generated by the intra-prediction circuit 22. The switching of the switch 23 is also controlled by, for example, the control circuit 31.

The control circuit 31 controls the overall operation of the decoding apparatus 1 by, for example, switching the connection of the switches 20 and 23. The identification of the prediction method for the processing target image may be performed by the control circuit 31.

Figure 4:
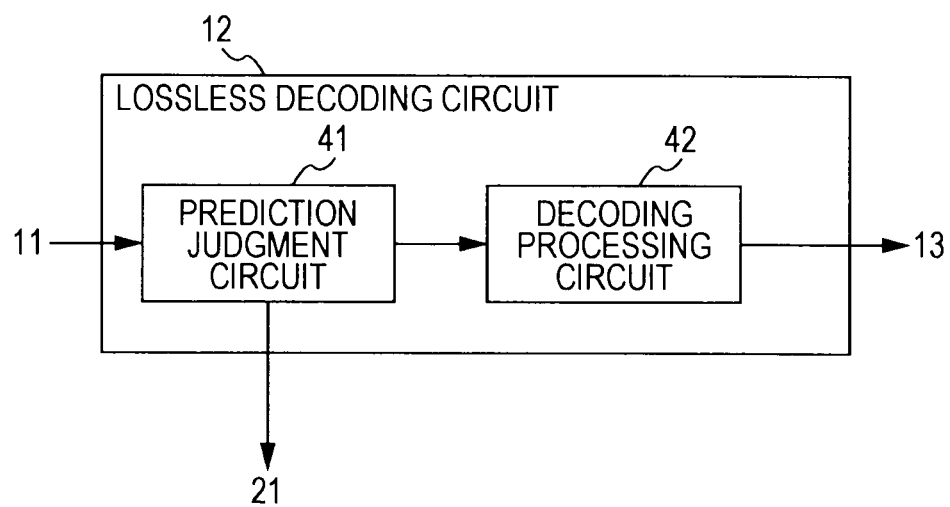
FIG. 4 is a block diagram illustrating an example configuration of a main part of a lossless decoding circuit in FIG. 3.

FIG. 4 is a block diagram illustrating an example configuration of a main part of the lossless decoding circuit 12 in FIG. 3.

As illustrated in FIG. 4, the lossless decoding circuit 12 includes a prediction judgment circuit 41 and a decoding processing circuit 42. The prediction judgment circuit 41 judges the prediction method for an image supplied from the storage buffer 11. The prediction judgment circuit 41 identifies a prediction method on the basis of, for example, an identification flag included in the header of the image to be decoded. Note that the prediction judgment circuit 41 may of course identify a prediction method by analyzing a bit stream. In this case, an identification flag can be omitted, and the amount of information of the compressed image information can be reduced.

In a case where it is judged that the image to be decoded is an intra-coded image, the prediction judgment circuit 41 outputs intra-prediction mode information stored in the header of the image to the intra-prediction circuit 22. Furthermore, in a case where it is judged that the image to be decoded is inter-coded information, the prediction judgment circuit 41 outputs motion vectors and an identification flag that are stored in the header of the image to the motion prediction/compensation circuit 21.

The prediction judgment circuit 41 further supplies the bit stream of the image for which the prediction method has been judged to the decoding processing circuit 42. The decoding processing circuit 42 performs a decoding process corresponding to the encoding scheme, such as a variable-length decoding process or an arithmetic decoding process, on the image. The prediction judgment circuit 41 outputs a quantized transform coefficient, which is obtained by performing the decoding process, to the dequantization circuit 13.

Figure 5:
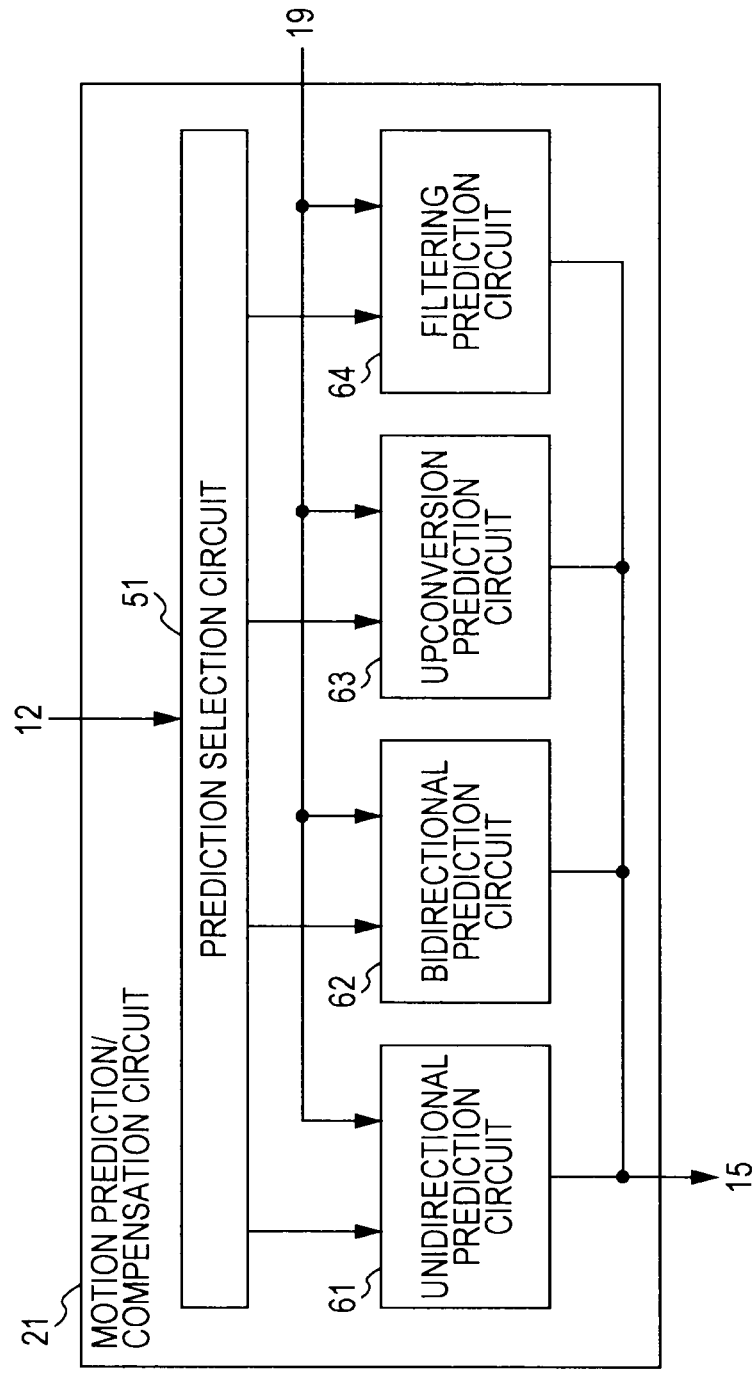
FIG. 5 is a block diagram illustrating an example configuration of a main part of a motion prediction/compensation circuit in FIG. 3.

FIG. 5 is a block diagram illustrating an example configuration of a main part of the motion prediction/compensation circuit in FIG. 3.

As illustrated in FIG. 5, the motion prediction/compensation circuit 21 includes a prediction selection circuit 51, a unidirectional prediction circuit 61, a bidirectional prediction circuit 62, an upconversion prediction circuit 63, and a filtering prediction circuit 64. The motion vectors and identification flag supplied from the lossless decoding circuit 12 (prediction judgment circuit 41) are input to the prediction selection circuit 51.

The prediction selection circuit 51 selects a prediction mode in accordance with the identification flag supplied from the prediction judgment circuit 41. In a case where it is determined that a prediction image is to be generated through unidirectional prediction, the prediction selection circuit 51 outputs the motion vectors to the unidirectional prediction circuit 61. Furthermore, in a case where it is determined that a prediction image is to be generated through bidirectional prediction, the prediction selection circuit 51 outputs the motion vectors to the bidirectional prediction circuit 62. Moreover, in a case where it is determined that a prediction image is to be generated through upconversion prediction, the prediction selection circuit 51 outputs an instruction therefor to the upconversion prediction circuit 63.

Furthermore, in a case where it is determined that a prediction image is to be generated through filtering prediction, the prediction selection circuit 51 outputs the motion vectors to the filtering prediction circuit 64.

In this manner, in order to allow identification of filtering prediction, a value different from a value representing unidirectional prediction, a value representing bidirectional prediction, and a value representing upconversion prediction which are defined in the conventional standard can be set as the value of an identification flag.

The unidirectional prediction circuit 61 sets a plurality of frames located in one temporal direction in the enhancement layer as reference frames, and determines macroblocks in the reference frames corresponding to a prediction image on the basis of the motion vectors. Furthermore, the unidirectional prediction circuit 61 generates a prediction image by reading each of the determined macroblocks in the reference frames from the frame memory 19 as a motion compensation image and by setting a pixel value in one of the motion compensation images as a pixel value in the prediction image. The unidirectional prediction circuit 61 outputs the generated prediction image to the adder circuit 15. Examples of the unidirectional prediction performed by the unidirectional prediction circuit 61 include unidirectional prediction defined in the H.264/SVC standard (or H.264 standard).

The bidirectional prediction circuit 62 sets a plurality of frames located in temporal both directions in the enhancement layer as reference frames, and determines macroblocks in the reference frames corresponding to a prediction image on the basis of the motion vectors. Furthermore, the bidirectional prediction circuit 62 generates a prediction image by reading each of the determined macroblocks in the reference frames from the frame memory 19 as a motion compensation image and by setting the average of pixel values in the read motion compensation images as a pixel value of the prediction image. The bidirectional prediction circuit 62 outputs the generated prediction image to the adder circuit 15. Examples of the bidirectional prediction performed by the bidirectional prediction circuit 62 include bidirectional prediction defined in the H.264/SVC standard (or H.264 standard).

Figure 1:
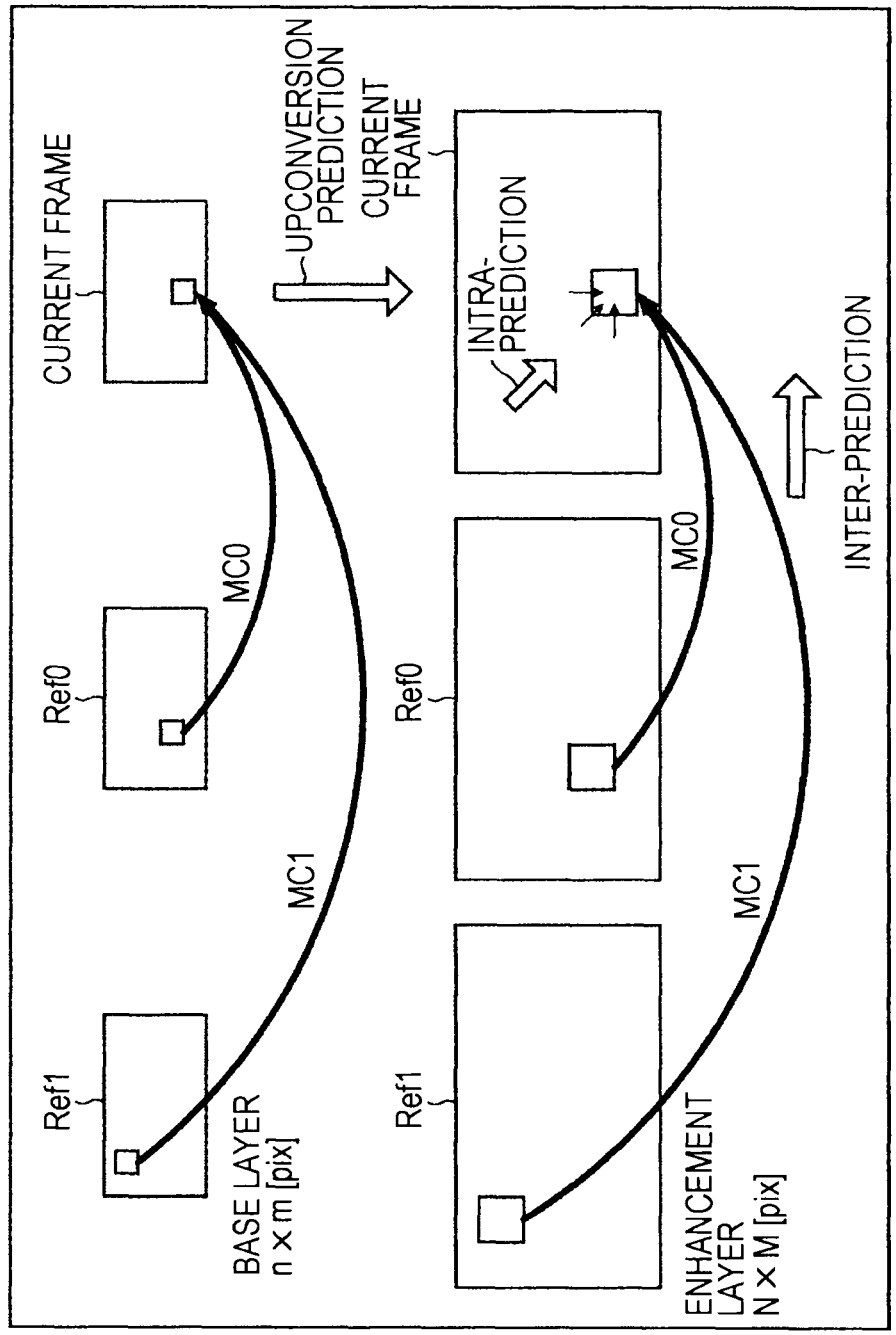
FIG. 1 is a diagram explaining decoding of a coding scheme that takes conventional spatial scalability into account.

As illustrated in FIG. 1, the upconversion prediction circuit 63 sets the current frame in the base layer as a reference frame. The upconversion prediction circuit 63 extracts a macroblock at the same position as the processing target macroblock in the current frame in the enhancement layer from the reference frame in the base layer. That is to say, the upconversion prediction circuit 63 reads the macroblock of the reference frame in the base layer, which corresponds to the processing target macroblock, from the frame memory 19. The extracted macroblock is the macroblock in the base layer, and therefore has a lower resolution than the processing target macroblock. The upconversion prediction circuit 63 upconverts the extracted macroblock in the base layer to generate a prediction image of the processing target macroblock.

The upconversion prediction circuit 63 outputs the generated prediction image to the adder circuit 15. Examples of the bidirectional prediction performed by the upconversion prediction circuit 63 include upconversion prediction defined in the H.264/SVC standard.

As illustrated in FIG. 2, the filtering prediction circuit 64 determines a plurality of frames located in one or both temporal directions in the base layer as reference frames. Which frames are to be used as reference frames may be determined in advance or may be specified by information transmitted from the encoding side together with an identification flag. For example, the temporally preceding frame with respect to the current frame and the further preceding frame, i.e., two frames, may be set as reference frames. Furthermore, for example, the temporally preceding and following frames with respect to the current frame, i.e., two frames, may be set as reference frames. Of course, other frames may be used as reference frames.

The filtering prediction circuit 64 determines macroblocks of the reference frames in the base layer determined in the above manner, which correspond to a prediction image, on the basis of the motion vectors supplied from the prediction selection circuit 51. The filtering prediction circuit 64 reads each of the determined macroblocks of the reference frames, as a motion compensation image, from the frame memory 19. Note that motion vectors may be determined, instead of in units of macroblocks of 16×16 pixels or the like, in units of blocks into which a macroblock is further divided.

The motion compensation images are images in the base layer, and therefore have a lower resolution than the processing target macroblock in the enhancement layer. The filtering prediction circuit 64 performs filtering involving upconversion using the motion compensation images as the inputs, and outputs a prediction image obtained by performing filtering to the adder circuit 15. The prediction image has been upconverted to the resolution of the macroblock in the enhancement layer.

The filtering prediction circuit 64 outputs the generated prediction image to the adder circuit 15.

Figure 6:
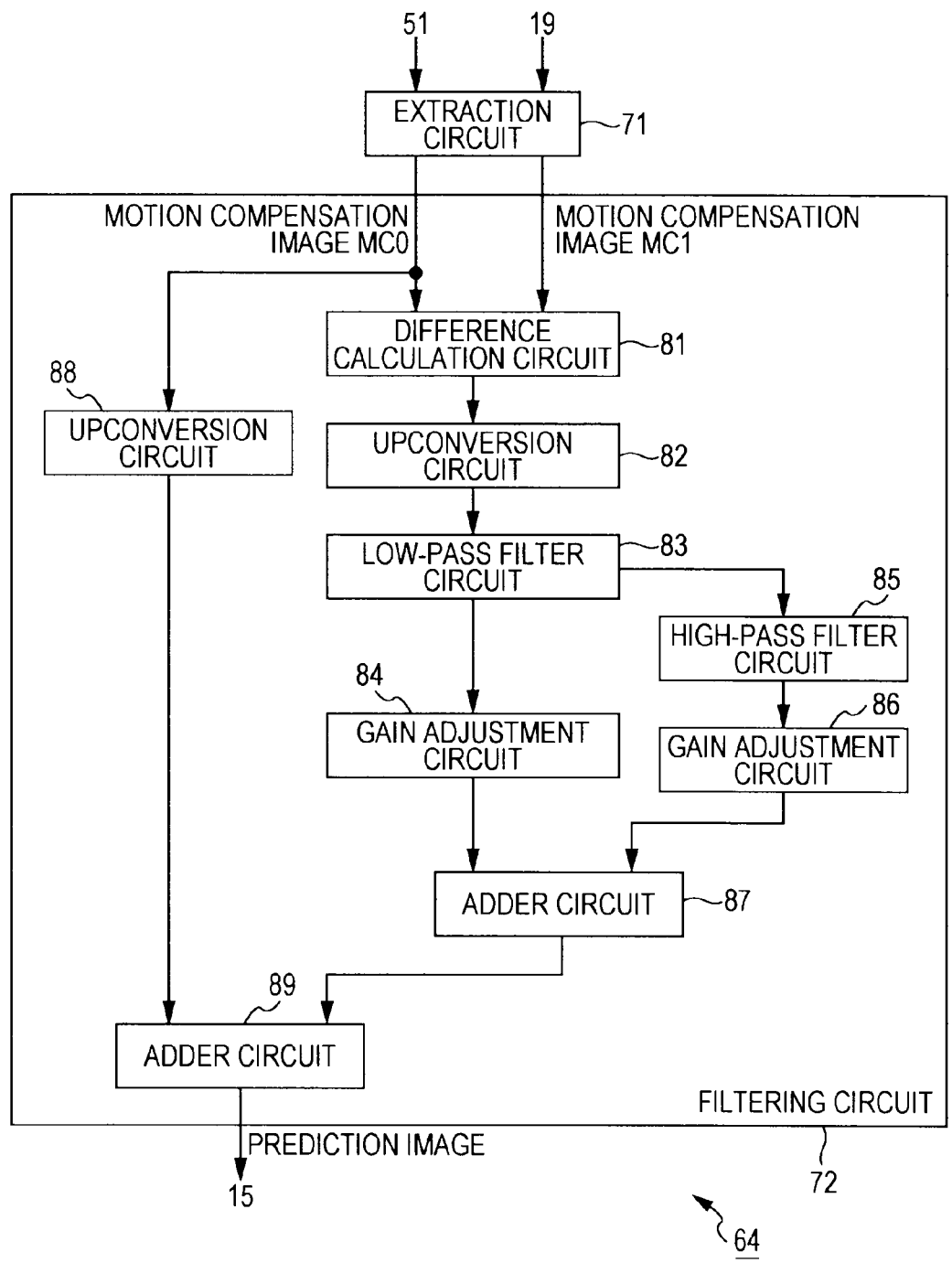
FIG. 6 is a block diagram illustrating an example configuration of a main part of a filtering prediction circuit in FIG. 5.

FIG. 6 is a block diagram illustrating an example configuration of a main part of the filtering prediction circuit 64 in FIG. 5. In the filtering prediction circuit 64 having the configuration in FIG. 6, filtering is performed on a signal in the time domain.

As illustrated in FIG. 6, the filtering prediction circuit 64 includes an extraction circuit 71 and a filtering circuit 72. The extraction circuit 71 specifies reference frames in the base layer on the basis of the information supplied from the prediction selection circuit 51, and extracts motion compensation images (for example, a motion compensation image MC0 and a motion compensation image MC1) from the reference frames in the base layer.

One conceivable means for identifying a plurality of low-resolution images used for the present invention is to utilize signals in the stream in the base layer without adding new signals.

That is, the method is that two images are used as the inputs for the subsequent filtering process, where the first input is a decoded image spatially at the same position in a low-resolution image at the current time and the second input is a temporally past or future low-resolution image that the image has used for temporal prediction.

That is to say, in this case, the extraction circuit 71 extracts, as one motion compensation image, a macroblock of the current frame in the base layer, which is at the same position as the processing target macroblock in the enhancement layer, and further extracts another motion compensation image using a motion vector that has been used for the decoding of the macroblock in the base layer. The advantage of this technique is that no addition of new signals to the stream is advantageous in terms of encoding efficiency.

At this time, in a case where in a low-resolution image, information regarding a plurality of reference frames is used for decoding, specifically, in a case where bidirectional prediction or the like is being performed, all the prediction images may be used as the second and third inputs.

In general, the more the time information with high correlation is utilized, the higher the resolution can be generated as a result of the subsequent filtering process. Thus, the above method is effective.

Moreover, in order to more accurately generate a high-resolution image through the filtering process, a method for newly encoding one or a plurality of motion vectors can also be used.

That is to say, in this case, a new motion vector separate from motion vectors utilized for the decoding of the base layer is encoded for the decoding of the enhancement layer. In this method, a new signal is added to the stream; however, increasing the prediction accuracy for the enhancement layer makes it possible to reduce residual signals in the enhancement layer. Thus, this method may be effective in terms of encoding efficiency.

The extraction circuit 71 specifies the motion compensation image MC0 and the motion compensation image MC1 in the above way, and acquires information regarding them from the frame memory 19. The extraction circuit 71 supplies the extracted motion compensation image MC0 and motion compensation image MC1 to the filtering circuit 72.

The filtering circuit 72 performs filtering involving upconversion on the supplied motion compensation image MC0 and motion compensation image MC1, and generates a prediction image. That is to say, the filtering circuit 72 performs a filtering process for compensating the plurality of motion compensation images extracted by the extraction circuit 71 for high-frequency components utilizing the correlation in the time direction included in the motion compensation images to generate a prediction image having a higher resolution than the motion compensation images. The prediction image generated in this manner has been compensated for high-frequency components. Thus, the prediction accuracy is improved. As a result, the encoding efficiency is improved.

As illustrated in FIG. 6, the filtering circuit 72 includes a difference calculation circuit 81, an upconversion circuit 82, a low-pass filter circuit 83, a gain adjustment circuit 84, a high-pass filter circuit 85, a gain adjustment circuit 86, an adder circuit 87, an upconversion circuit 88, and an adder circuit 89.

The motion compensation image MC0 supplied from the extraction circuit 71 is input to the difference calculation circuit 81 and the upconversion circuit 88, and the motion compensation image MC1 is input to the difference calculation circuit 81.

In a case where a prediction image is to be generated through unidirectional prediction, for example, an image extracted from the reference frame R0 close to the current frame, which can be considered to have higher correlation than the prediction image, is used as the motion compensation image MC0, and an image extracted from the reference frame R1 far from the current frame is used as the motion compensation image MC1. The image extracted from the reference frame R0 may be designed to be used as the motion compensation image MC1, and the image extracted from the reference frame R1 may be designed to be used as the motion compensation image MC0.

Furthermore, in a case where a prediction image is to be generated through bidirectional prediction, for example, an image extracted from the preceding reference frame L0 is used as the motion compensation image MC0, and an image extracted from the following reference frame L1 is used as the motion compensation image MC1. The image extracted from the reference frame L0 may be designed to be used as the motion compensation image MC1, and the image extracted from the reference frame L1 may be designed to be used as the motion compensation image MC0.

The difference calculation circuit 81 calculates the difference between the motion compensation image MC0 and the motion compensation image MC1 using, for example, Equation (1) below, and outputs a difference image D to the upconversion circuit 82.

$$D(i,j)=A(i,j)-B(i,j) \tag{1}$$

In Equation (1), (i, j) represents the relative position of a pixel in a motion compensation image. For example, in a case where the process is configured to be performed in units of macroblocks of 16×16 pixels, $0 \leq i \leq 16$ and $0 \leq j \leq 16$ are set. This similarly applies to the following description.

The upconversion circuit 82 performs resolution conversion on the difference image D computed by the difference calculation circuit 81. The resolution conversion ratio is based on the ratio of the spatial resolution for the base layer to that for the enhancement layer. For example, in a case where the resolution for the base layer is n×m [pixel] (n and m are integers) and that for the enhancement layer is N×M [pixel] (N and M are integers, where N>n and M>m), the magnification in the horizontal direction H_Scale and the magnification in the vertical direction V_Scale are given by Equation (2) and Equation (3).

$$H\_Scale = N/n \quad (2)$$

$$V\_Scale = M/m \quad (3)$$

The upconversion circuit 82 outputs a difference image D' that has been subjected to resolution conversion (has been upconverted) in this manner to the low-pass filter circuit 83.

The low-pass filter circuit 83 includes an FIR filter circuit. The low-pass filter circuit 83 applies a low-pass filter to the difference image D' supplied from the upconversion circuit 82, and outputs an obtained image to the gain adjustment circuit 84 and the high-pass filter circuit 85. A difference image D'' that is an image obtained by applying a low-pass filter is represented by Equation (4) as follows.

$$D'' = LPF(D') \quad (4)$$

In Equation (4), LPF(X) represents the application of a low-pass filter to an input image X using a two-dimensional FIR filter.

The gain adjustment circuit 84 adjusts the gain of the difference image D'' supplied from the low-pass filter circuit 83, and outputs the gain-adjusted image to the adder circuit 87. If $0 \leq I \leq 16 \times H\_Scale$ is set and if $0 \leq J \leq 16 \times V\_Scale$ is set, an output image X(I, J) of the gain adjustment circuit 84 is represented by Equation (5) as follows.

$$X(I,J) = \alpha D''(I,J) \quad (5)$$

The high-pass filter circuit 85 includes an FIR filter circuit. The high-pass filter circuit 85 applies a high-pass filter to the difference image D'' supplied from the low-pass filter circuit 83, and outputs an obtained image to the gain adjustment circuit 86. A difference image D''' that is an image obtained by applying a high-pass filter is represented by Equation (6) as follows.

$$D''' = HPF(D'') \quad (6)$$

In Equation (6), HPF(X) represents the performance of high-pass filtering process on the input image X using a two-dimensional FIR filter.

The gain adjustment circuit 86 adjusts the gain of the difference image D''' supplied from the high-pass filter circuit 85, and outputs the gain-adjusted image to the adder circuit 87. An output image Y(I, J) of the gain adjustment circuit 86 is represented by Equation (7) as follows.

$$Y(I,J) = \beta D'''(I,J) \quad (7)$$

As the value of α in Equation (5) and the value β in Equation (7), for example, values such as α32 0.8 and β=0.2 are selected. However, other values may be used in order to increase the accuracy of a prediction pixel. Furthermore, the values may be adaptively changed in accordance with the characteristics of an input sequence or the like.

The adder circuit 87 adds the gain-adjusted image X(I, J) and image Y(I, J), and outputs an image obtained by addition. An output image Z(I, J) of the adder circuit 87 is represented by Equation (8) as follows.

$$Z(I,J) = X(I,J) + Y(I,J) \quad (8)$$

The output image Z(I, J) is a representation of the high-frequency components of the image that can be determined from the difference, that is, the correlation, between the motion compensation image MC0 and the motion compensation image MC1.

The upconversion circuit 88 performs resolution conversion on the motion compensation image MC0. Similarly to the case of the upconversion circuit 82, the resolution conversion ratio is based on the ratio of the spatial resolution for the base layer to that for the enhancement layer. That is to say, the magnification in the horizontal direction H_Scale and the magnification in the vertical direction V_Scale are given by Equation (2) and Equation (3) above. The upconversion circuit 88 outputs an image A' that is the motion compensation image MC0 subjected to resolution conversion (upconverted) in the above manner to the adder circuit 89.

The adder circuit 89 adds the output image Z(I, J) supplied from the adder circuit 87 to the image A' supplied from the upconversion circuit 88, and outputs an obtained image to the adder circuit 15 as a prediction image. A prediction image S(I, J) that is finally output from the adder circuit 89 is represented by Equation (9) as follows.

$$S(I,J) = A'(I,J) + Z(I,J) \quad (9)$$

In this manner, according to the filtering prediction mode, an image that represents the high-frequency components and that is generated by upconverting an image in the base layer is added to an image obtained by upconverting the motion compensation image MC0. Thereby, a prediction image is generated.

By generating a prediction image in the filtering prediction mode as above, the decoding apparatus 1 can obtain a prediction image including more high-frequency components than a prediction image in upconversion prediction which is obtained by upconverting the image of the current frame in the base layer. Furthermore, since filtering is performed in the manner described above when a prediction image is generated from a plurality of motion compensation images, the decoding apparatus 1 can obtain a prediction image including more high-frequency components than a prediction image that simply has, as each pixel value, the average value of respective pixels of the plurality of motion compensation images.

Moreover, the resolution of an image to be referred to is smaller than that for inter-prediction in which a prediction image is generated by referring to frames in the enhancement layer. Accordingly, it is not necessary to save high-resolution images in the enhancement layer in the frame memory 19 or to read them from the frame memory 19. Furthermore, for example, like motion vectors, information at the time of decoding of the base layer can be utilized at the time of decoding of the enhancement layer. Thus, the amount of code for compressed image information can be reduced. That is to say, the decoding apparatus 1 can improve compression efficiency.

In this manner, the decoding apparatus 1 can improve encoding efficiency while preventing an increase in load.

[Explanations of Flow of Decoding Process]

Next, the process of the decoding apparatus 1 having the above configuration will be explained. First, an example of a flow of a decoding process for the enhancement layer will be explained with reference to a flowchart in FIG. 7. Similarly to the case of the decoding process for the base layer, the decoding for the enhancement layer is also basically performed using a method complying with the H.264 standard.

In this regard, the decoding process for the enhancement layer is largely different from the decoding process for the base layer or the H.264 standard in that there is a mode in which the image in the base layer at the same time is used to generate a prediction image. Moreover, in the case of the decoding process for the enhancement layer to which the present invention is applied, a function for using a plurality of images in the base layer, which are temporally at the same time as or different times from the current frame, for the decoding of the enhancement layer is added.

Figure 9:
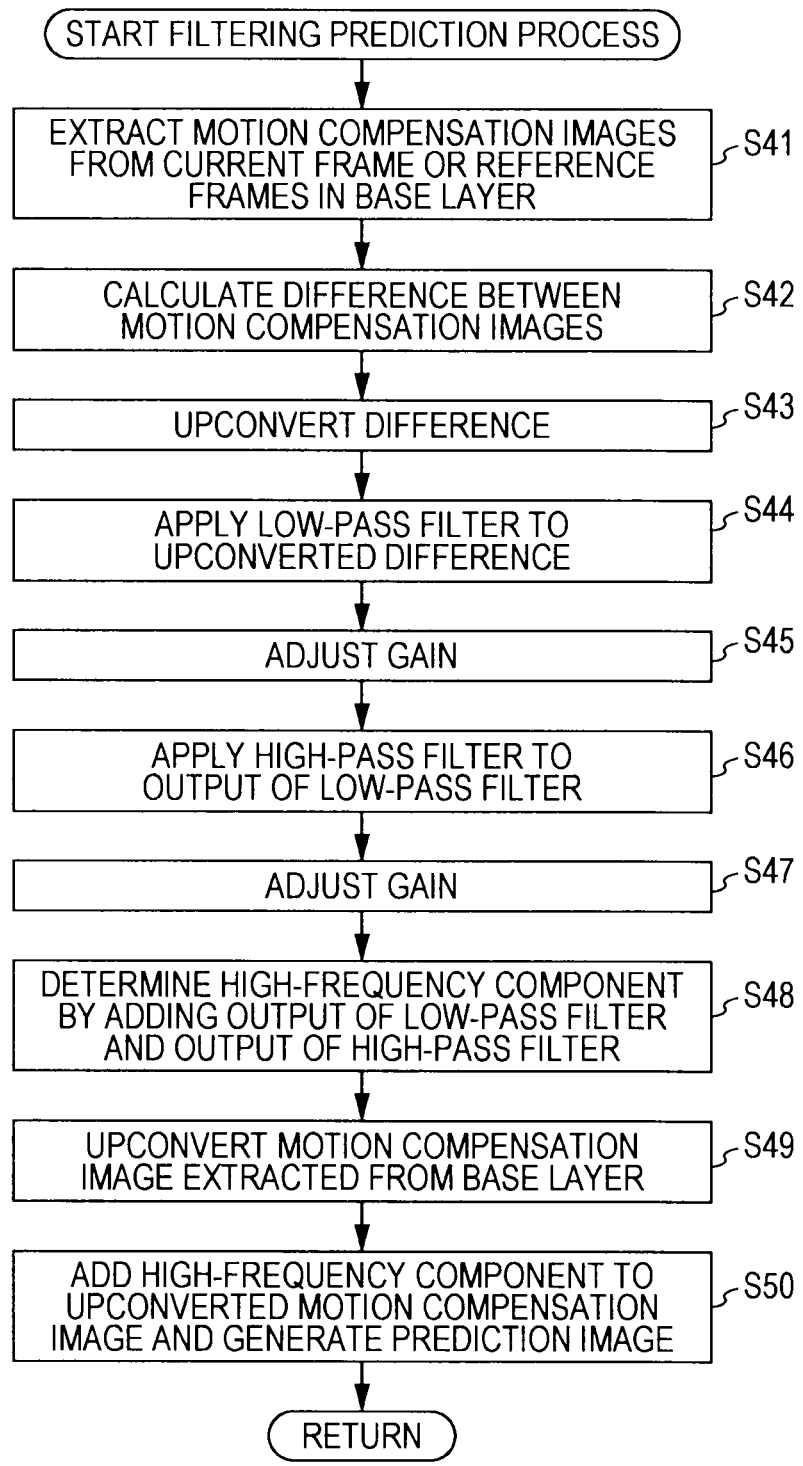
FIG. 9 is a flowchart explaining an example of a flow of a filtering prediction process when decoding is performed.

The process in FIG. 9 is started when, for example, an image of a certain size such as a macroblock of 16×16 pixels is read by the lossless decoding circuit 12 from the information stored in the storage buffer 11. The processing of each step in FIG. 9 is performed, as appropriate, in parallel with the processing of another step or by reordering the steps. This similarly applies to the processing of each step in each flowchart described below.

In step S1, the lossless decoding circuit 12 starts a lossless decoding process on an image read from the storage buffer 11. The details of the lossless decoding process will be described below. The lossless decoding circuit 12 outputs a quantized transform coefficient, which is generated using a lossless decoding process, to the dequantization circuit 13. Furthermore, the lossless decoding circuit 12 outputs intra-prediction mode information to the intra-prediction circuit 22 in a case where the image to be decoded is an intra-coded image, and outputs motion vectors and an identification flag to the motion prediction/compensation circuit 21 in a case where the image is an inter-coded image in the lossless decoding process.

In step S2, the dequantization circuit 13 performs dequantization using a scheme corresponding to the quantization scheme used on the encoding side, and outputs the transform coefficient to the inverse orthogonal transform circuit 14. In step S3, the inverse orthogonal transform circuit 14 performs the inverse orthogonal transform on the transform coefficient supplied from the dequantization circuit 13, and outputs an obtained image to the adder circuit 15.

In step S4, the adder circuit 15 combines the decoded image supplied from the inverse orthogonal transform circuit 14 and a prediction image supplied from the motion prediction/compensation circuit 21 or the intra-prediction circuit 22, and outputs a composite image to the deblocking filter 16. In step S5, the deblocking filter 16 performs filtering to remove block noise included in the composite image, and outputs an image from which block noise has been removed. In step S6, the frame memory 19 temporarily stores the image supplied from the deblocking filter 16. Furthermore, at this time, the image is also held in the rearrangement buffer 17.

In step S7, the control circuit 31 judges whether or not the foregoing process has been performed on the macroblocks in one entire frame. In a case where it is judged that the process has not been performed, attention is focused on another macroblock and the process from step S1 is repeatedly performed.

Furthermore, in a case where it is judged in step S7 that the process has been performed on the macroblocks in one entire frame, the process proceeds to step S8. In step S8, the rearrangement buffer 17 outputs the generated frame to the D/A converter circuit 18 in accordance with the control by the control circuit 31.

In step S9, the D/A converter circuit 18 performs D/A conversion on the frame supplied from the rearrangement buffer 17, and outputs an analog signal to outside. The foregoing process is performed on each frame.

Figure 8:
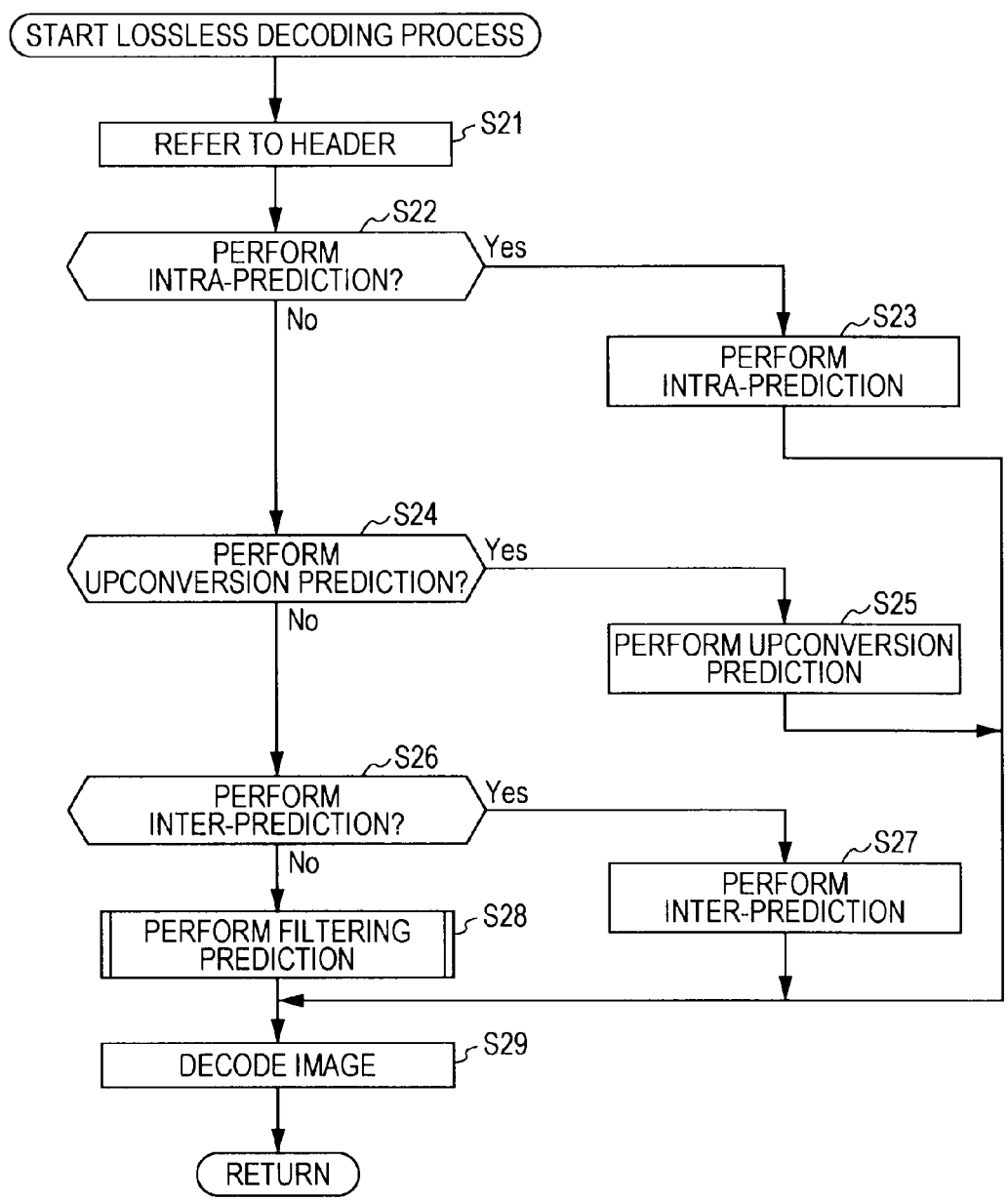
FIG. 8 is a flowchart explaining an example of a flow of a lossless decoding process.

Next, an example of a flow of the lossless decoding process will be explained with reference to a flowchart in FIG. 8.

When the lossless decoding process is started, in step S21, the prediction judgment circuit 41 refers to the header of the compressed image information supplied from the storage buffer 11. In step S22, the prediction judgment circuit 41 judges whether or not intra-prediction is to be performed on the basis of the information indicating a prediction mode specified by the encoding apparatus, which is included in the header. In a case where an intra-prediction mode has been specified by the encoding apparatus, the process proceeds to step S23.

In step S23, the intra-prediction circuit 22 performs intra-prediction to generate a prediction image, and supplies the prediction image to the adder circuit 15. The prediction image is combined with the decoded image supplied from the inverse orthogonal transform circuit 14 in step S4 in FIG. 7.

When the processing of step S23 is completed, the process proceeds to step S29. Furthermore, if it is judged in step S22 that intra-prediction is not to be performed, the process proceeds to step S24.

In step S24, the prediction judgment circuit 41 judges whether or not upconversion prediction is to be performed on the basis of the information indicating a prediction mode specified by the encoding apparatus, which is included in the header. In a case where an upconversion prediction mode has been specified by the encoding apparatus, the process proceeds to step S25.

In step S25, the upconversion prediction circuit 63 of the motion prediction/compensation circuit 21 performs upconversion prediction to generate a prediction image, and supplies the prediction image to the adder circuit 15. The prediction image is combined with the decoded image supplied from the inverse orthogonal transform circuit 14 in step S4 in FIG. 7.

When the processing of step S25 is completed, the process proceeds to step S29. Furthermore, in a case where it is judged in step S24 that upconversion prediction is not to be performed, the process proceeds to step S26.

In step S26, the prediction judgment circuit 41 judges whether or not inter-prediction is to be performed on the basis of the information indicating a prediction mode specified by the encoding apparatus, which is included in the header. In a case where an inter-prediction mode has been specified by the encoding apparatus, the process proceeds to step S27.

In step S27, the unidirectional prediction circuit 61 or the bidirectional prediction circuit 62 of the motion prediction/compensation circuit 21 performs inter-prediction (unidirectional prediction or bidirectional prediction) to generate a prediction image, and supplies the prediction image to the adder circuit 15. The prediction image is combined with the decoded image supplied from the inverse orthogonal transform circuit 14 in step S4 in FIG. 7.

When the processing of step S27 is completed, the process proceeds to step S29. Furthermore, in a case where it is judged in step S26 that a filtering prediction mode has been specified by the encoding apparatus and that inter-prediction is not to be performed, the process proceeds to step S28.

In step S28, the filtering prediction circuit 64 of the motion prediction/compensation circuit 21 performs filtering prediction to generate a prediction image on the basis of the information indicating a filtering prediction mode, which is included in the header, and supplies the prediction image to the adder circuit 15. The prediction image is combined with the decoded image supplied from the inverse orthogonal transform circuit 14 in step S4 in FIG. 7. When the processing of step S28 is completed, the process proceeds to step S29.

In step S29, the decoding processing circuit 42 decodes the residual signal of the compressed image information, and outputs a quantized transform coefficient to the dequantization circuit 13. When the processing of step S29 is completed, the lossless decoding process ends. Then, the process returns to step S1 in FIG. 7, and the processing after step S2 is executed.

Note that it has been explained that a prediction mode is selected on the basis of the information included in the header of the compressed image information to be referred to in step S21. However, this is not restrictive, and the prediction judgment circuit 41 may be configured to be capable of selecting an appropriate prediction mode by, for example, analyzing the bit stream of the compressed image information. In this case, in step S21, instead of referring to the header, the prediction judgment circuit 41 analyzes the compressed image information, and selects a prediction mode on the basis of the analysis result in the processing of step S22 and the subsequent steps.

Next, an example of a flow of the filtering prediction process executed in the processing of step S28 in FIG. 8 will be explained with reference to a flowchart in FIG. 9.

When the filtering prediction process is started, in step S41, the extraction circuit 71 extracts motion compensation images from the current frame or reference frames from the base layer. In step S42, the difference calculation circuit 81 calculates the difference between the motion compensation images. In step S43, the upconversion circuit 82 upconverts the difference between the motion compensation images computed in step S42. In step S44, the low-pass filter circuit 83 applies a low-pass filter to the difference upconverted in step S43.

In step S45, the gain adjustment circuit 84 multiplies the output of the low-pass filter in the processing of step S44 by a coefficient α to perform gain adjustment. In step S46, the high-pass filter circuit 85 applies a high-pass filter to the output of the low-pass filter in the processing of step S44. In step S47, the gain adjustment circuit 86 multiplies the output of the high-pass filter in the processing of step S46 by a coefficient β to perform gain adjustment.

In step S48, the adder circuit 87 adds the gain-adjusted output of the low-pass filter in the processing of step S45 and the gain-adjusted output of the high-pass filter in the processing of step S47 to determine high-frequency components.

In step S49, the upconversion circuit 88 upconverts the motion compensation image MC0 extracted from the base layer. In step S50, the adder circuit 89 adds the high-frequency components determined in step S48 to the motion compensation image upconverted in step S49 to generate a prediction image. The adder circuit 89 supplies the generated prediction image to the adder circuit 15.

When the processing of step S50 is completed, the filtering prediction process ends. Then, the process returns to step S28 in FIG. 8, and the processing after step S29 is executed.

As above, decoding is performed using a prediction image generated through filtering prediction, thus making it possible to obtain a high-definition decoded image without increasing the process load. That is to say, the decoding apparatus 1 can improve encoding efficiency while preventing an increase in load.

Note that it has been explained that the decoding of the base layer and the decoding of the enhancement layer are performed by the same decoding apparatus 1. However, this is not restrictive, and the decoding of both layers may be performed by different decoding apparatuses 1. In this regard, also in this case, the frame memory 19 is common to all the decoding apparatuses, and a frame in the base layer can be configured to be read at the time of decoding of the enhancement layer.

2. Second Embodiment

Configuration of Encoding Apparatus

Figure 10:
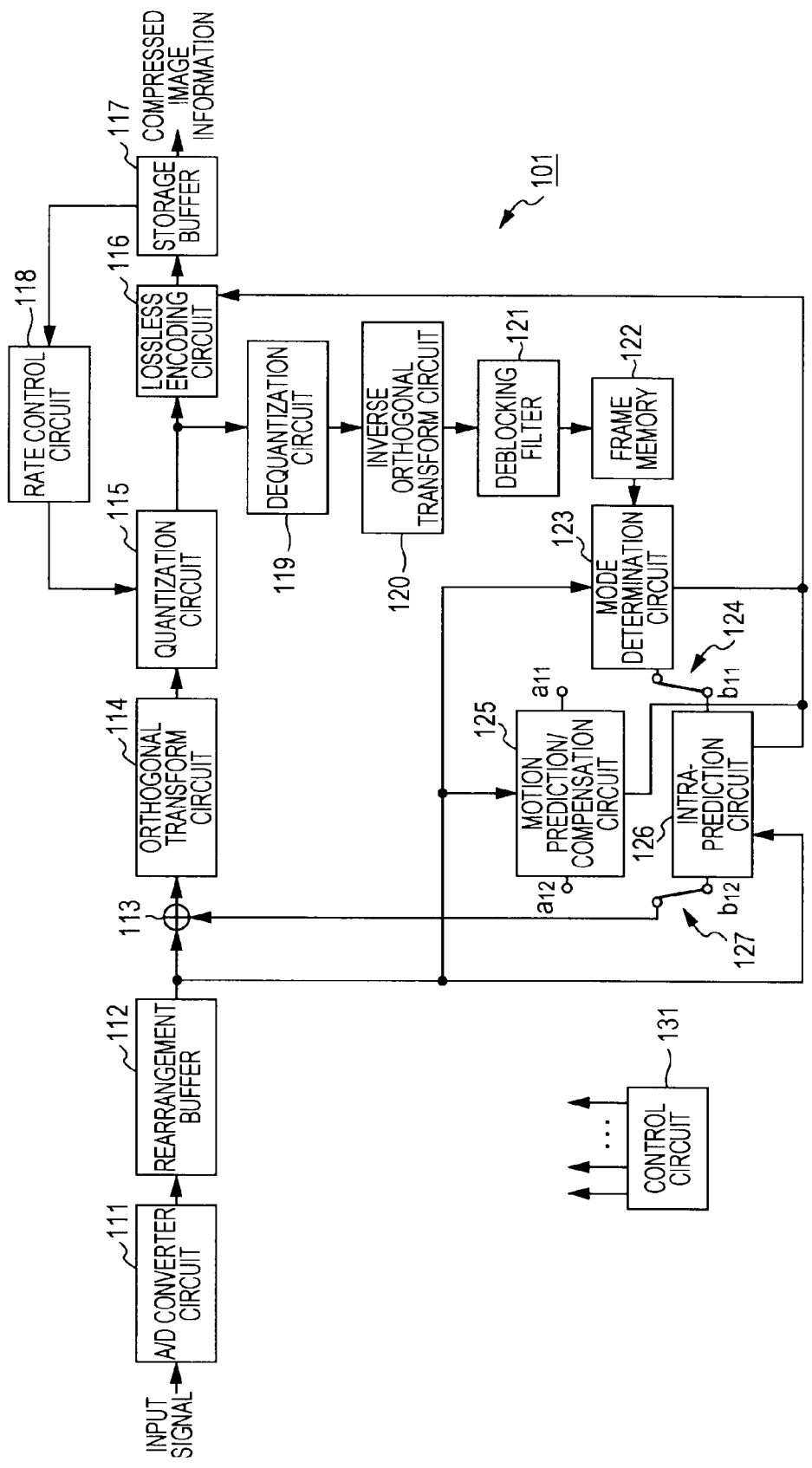
FIG. 10 is a block diagram illustrating an example configuration of a main part of an encoding apparatus to which the present invention is applied.

FIG. 10 is a block diagram illustrating an example configuration of a main part of an encoding apparatus to which the present invention is applied. The encoding apparatus 101 is an encoding apparatus corresponding to the decoding apparatus 1 in FIG. 3. That is to say, compressed image information obtained by performing encoding by the encoding apparatus 101 is input to the decoding apparatus 1 in FIG. 3.

The encoding apparatus 101 includes an A/D converter circuit 111, a rearrangement buffer 112, an adder circuit 113, an orthogonal transform circuit 114, a quantization circuit 115, a lossless encoding circuit 116, and a storage buffer 117. The encoding apparatus 101 further includes a rate control circuit 118, a dequantization circuit 119, an inverse orthogonal transform circuit 120, a deblocking filter 121, a frame memory 122, and a mode determination circuit 123. Moreover, the encoding apparatus 101 includes a switch 124, a motion prediction/compensation circuit 125, an intra-prediction circuit 126, a switch 127, and a control circuit 131.

Image information is divided into two layers (or multiple layers more than two layers), i.e., a low-resolution base layer and a high-resolution enhancement layer, and image information on each frame in the low-resolution base layer is earlier supplied to the encoding apparatus 101 and is encoded. The encoding of the base layer is performed in a manner similar to that in the case of the H.264 standard. When the encoding of the base layer is completed, image information in the enhancement layer is encoded by the encoding apparatus 101. The encoding of the enhancement layer will be explained hereinafter.

The A/D converter circuit 111 performs A/D conversion on an input signal, and outputs an image to the rearrangement buffer 112. The rearrangement buffer 112 rearranges frames in accordance with the GOP (Group of Pictures) structure of the compressed image information, and outputs an image of a certain unit such as a macroblock. The image output from the rearrangement buffer 112 is supplied to the adder circuit 113, the mode determination circuit 123, the motion prediction/compensation circuit 125, and the intra-prediction circuit 126.

The adder circuit 113 determines the difference between the image supplied from the rearrangement buffer 112 and a prediction image generated by the motion prediction/compensation circuit 125 or the intra-prediction circuit 126 and supplied via the switch 127, and outputs a residual to the orthogonal transform circuit 114. The closer the prediction image is to an original image and the smaller the number of residuals determined here is, the smaller the amount of code to be assigned to the residuals is and therefore the higher the encoding efficiency can be said to be.

The orthogonal transform circuit 114 performs the orthogonal transform, such as the discrete cosine transform or Karhunen-Loève transform, on the residual supplied from the adder circuit 113, and outputs a transform coefficient obtained by performing the orthogonal transform to the quantization circuit 115.

The quantization circuit 115 quantizes the transform coefficient supplied from the orthogonal transform circuit 114 in accordance with the control by the rate control circuit 118, and outputs the quantized transform coefficient. The transform coefficient quantized by the quantization circuit 115 is supplied to the lossless encoding circuit 116 and the dequantization circuit 119.

The lossless encoding circuit 116 compresses the transform coefficient supplied from the quantization circuit 115 by performing lossless encoding such as variable-length encoding or arithmetic encoding, and outputs information to the storage buffer 117.

Furthermore, the lossless encoding circuit 116 sets the value of an identification flag in accordance with the information supplied from the mode determination circuit 123, and describes the identification flag in the header of the image. As described above, the decoding apparatus 1 determines a prediction mode on the basis of the identification flag described by the lossless encoding circuit 116.

The lossless encoding circuit 116 also describes the information supplied from the motion prediction/compensation circuit 125 or the intra-prediction circuit 126 in the header of the image. Motion vectors and the like that are detected when inter-prediction is performed are supplied from the motion prediction/compensation circuit 125, and the information regarding the intra-prediction mode applied is supplied from the intra-prediction circuit 126.

The storage buffer 117 temporarily stores the information supplied from the lossless encoding circuit 116, and outputs it as compressed image information at a certain timing. The storage buffer 117 outputs information about the amount of code produced to the rate control circuit 118.

The rate control circuit 118 computes a quantization scale on the basis of the amount of code output from the storage buffer 117, and controls the quantization circuit 115 so that the quantization can be performed with the computed quantization scale.

The dequantization circuit 119 performs dequantization on the transform coefficient quantized by the quantization circuit 115, and outputs the transform coefficient to the inverse orthogonal transform circuit 120.

The inverse orthogonal transform circuit 120 performs the inverse orthogonal transform on the transform coefficient supplied from the dequantization circuit 119, and outputs an obtained image to the deblocking filter 121.

The deblocking filter 121 removes block noise that appears in a locally decoded image, and outputs an image from which the block noise has been removed to the frame memory 122.

The frame memory 122 stores the image supplied from the deblocking filter 121. The image stored in the frame memory 122 is read by a mode determination circuit 123 as appropriate.

The mode determination circuit 123 determines whether intra-coding is to be performed or inter-coding is to be performed, on the basis of the image stored in the frame memory 122 and the original image supplied from the rearrangement buffer 112. Furthermore, in a case where it is judged that inter-coding is to be performed, the mode determination circuit 123 determines one mode among the unidirectional prediction mode, the bidirectional prediction mode, the upconversion prediction mode, and the filtering prediction mode. The mode determination circuit 123 outputs information indicating the determination result to the lossless encoding circuit 116 as mode information.

In a case where it is judged that inter-coding is to be performed, the mode determination circuit 123 outputs frames that are stored in the frame memory 122 and that are obtained through local decoding to the motion prediction/compensation circuit 125 via the switch 124.

Furthermore, in a case where it is judged that intra-coding is to be performed, the mode determination circuit 123 outputs frames that are stored in the frame memory 122 and that are obtained through local decoding to the intra-prediction circuit 126.

The switch 124 is connected to a terminal a11 in a case where inter-coding is to be performed, and is connected to a terminal b11 in a case where intra-coding is to be performed. The switching of the switch 124 is controlled by, for example, the control circuit 131.

The motion prediction/compensation circuit 125 detects motion vectors on the basis of the original image supplied from the rearrangement buffer 112 and reference frames read from the frame memory 122, and outputs the detected motion vectors to the lossless encoding circuit 116. Furthermore, the motion prediction/compensation circuit 125 generates a prediction image by performing motion compensation using the detected motion vectors and the reference frames, and outputs the generated prediction image to the adder circuit 113 via the switch 127.

The intra-prediction circuit 126 performs intra-prediction on the basis of the original image supplied from the rearrangement buffer 112 and a reference frame locally decoded and stored in the frame memory 122, and generates a prediction image. The intra-prediction circuit 126 outputs the generated prediction image to the adder circuit 113 via the switch 127, and outputs intra-prediction mode information to the lossless encoding circuit 116.

The switch 127 is connected to a terminal a12 or a terminal b12, and outputs a prediction image generated by the motion prediction/compensation circuit 125 or the intra-prediction circuit 126 to the adder circuit 113.

The control circuit 131 controls the overall operation of the encoding apparatus 101 by, for example, switching the connection of the switches 124 and 127 in accordance with the mode determined by the mode determination circuit 123.

Figure 11:
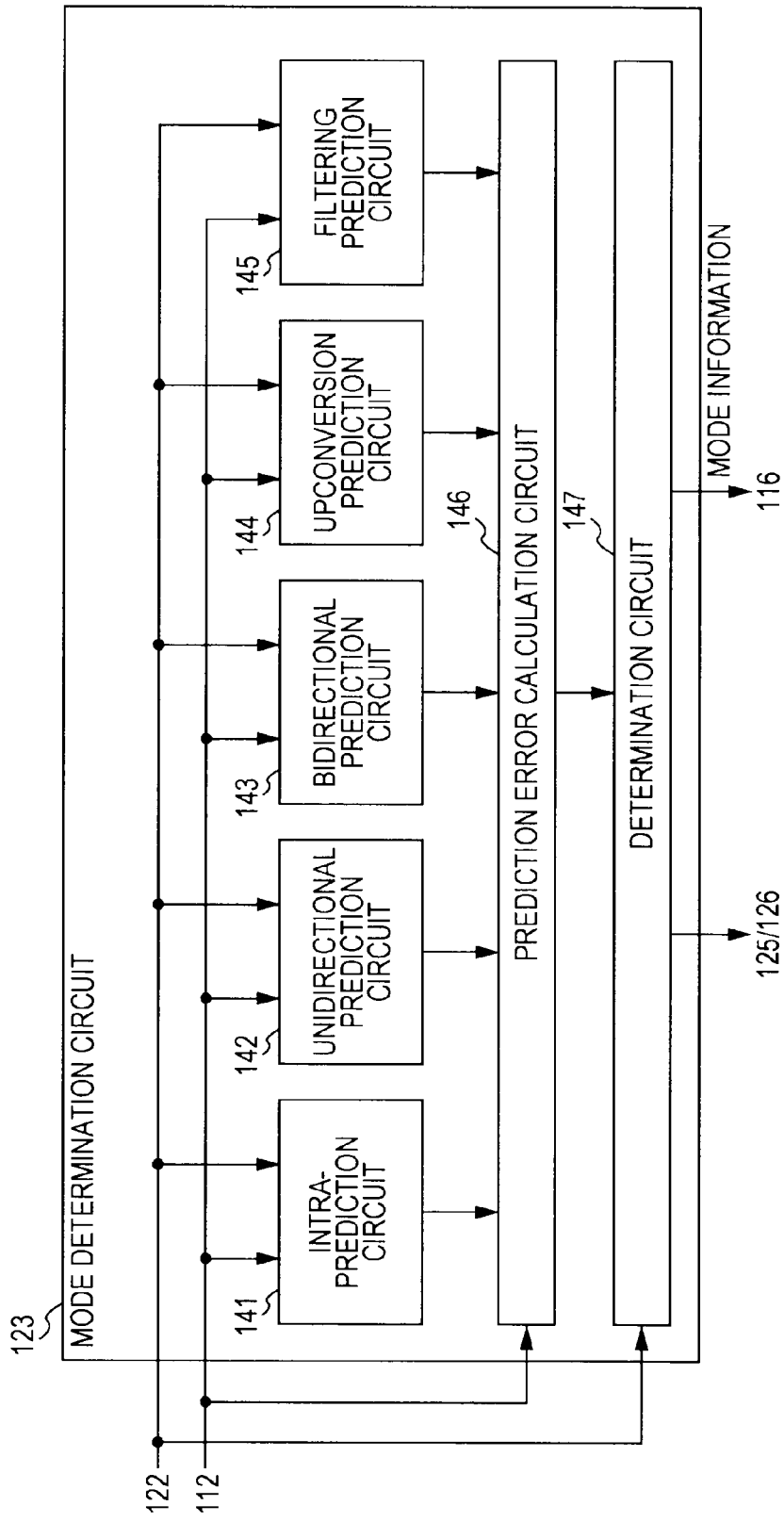
FIG. 11 is a block diagram illustrating an example configuration of a main part of a mode determination circuit in FIG. 10.

FIG. 11 is a block diagram illustrating an example configuration of a main part of the mode determination circuit 123 in FIG. 10.

As illustrated in FIG. 11, the mode determination circuit 123 includes an intra-prediction circuit 141, a unidirectional prediction circuit 142, a bidirectional prediction circuit 143, an upconversion prediction circuit 144, a filtering prediction circuit 145, a prediction error calculation circuit 146, and a determination circuit 147.

In the mode determination circuit 123, each of intra-prediction and inter-prediction is performed on a block having a different size, and which prediction mode prediction is to be performed in is determined from the obtained result. As for inter-prediction, the processing is performed in each of the prediction modes, i.e., the unidirectional prediction mode, the bidirectional prediction mode, the upconversion prediction mode, and the filtering prediction mode.

The intra-prediction circuit 141, the unidirectional prediction circuit 142, the bidirectional prediction circuit 143, the upconversion prediction circuit 144, and the filtering prediction circuit 145 perform prediction using the individual methods to generate prediction images on the basis of the original image and images read from the frame memory 122, and output the generated prediction images to the prediction error calculation circuit 146.

The intra-prediction circuit 141 performs intra-prediction using a method similar to that of the intra-prediction circuit 22 of the decoding apparatus 1. The unidirectional prediction circuit 142 detects motion vectors, extracts motion compensation images from reference frames on the basis of the detected motion vectors, and performs unidirectional prediction using the motion compensation images to generate a prediction image. That is to say, the unidirectional prediction circuit 142 generates a prediction image using a method similar to that of the unidirectional prediction circuit 61 of the decoding apparatus 1 on the basis of the detected motion vectors.

The bidirectional prediction circuit 143 detects motion vectors, extracts motion compensation images from the reference frames on the basis of the detected motion vectors, and performs bidirectional prediction using the motion compensation images to generate a prediction image. That is to say, the bidirectional prediction circuit 143 generates a prediction image using a method similar to that of the bidirectional prediction circuit 62 of the decoding apparatus 1 on the basis of the detected motion vectors.

The upconversion prediction circuit 144 sets a macroblock of the current frame in the base layer, which is at the same position as the processing target macroblock of the current frame in the enhancement layer, as a motion compensation image, and upconverts the motion compensation image to generate a prediction image in the enhancement layer. That is to say, the upconversion prediction circuit 144 generates a prediction image using a method similar to that of the upconversion prediction circuit 63 of the decoding apparatus 1.

The filtering prediction circuit 145 detects motion vectors in the base layer, extracts motion compensation images in the base layer from the reference frames on the basis of the detected motion vectors, and performs filtering prediction using the motion compensation images in the base layer to generate a prediction image. That is to say, the filtering prediction circuit 145 generates a prediction image using a method similar to that of the filtering prediction circuit 145 of the decoding apparatus 1 on the basis of the detected motion vectors.

Note that the intra-prediction circuit 141 to the filtering prediction circuit 145 detect motion vectors or perform prediction in units of, for example, blocks of 4×4 pixels, blocks of 8×8 pixels, and blocks of 16×16 pixels. The size of the block that serves as the unit of processing is arbitrary. Furthermore, the number of types of blocks on which prediction is to be performed is also arbitrary. The intra-prediction circuit 141 to the filtering prediction circuit 145 generate prediction images for each block, and output the generated individual prediction images to the prediction error calculation circuit 146.

The original image supplied from the rearrangement buffer 112 is input to the intra-prediction circuit 141 to the filtering prediction circuit 145 and to the prediction error calculation circuit 146.

The prediction error calculation circuit 146 determines the difference between each of the prediction images supplied from the respective circuits in the intra-prediction circuit 141 and the original image, and outputs residual signals representing the determined differences to the determination circuit 147. Similarly, the prediction error calculation circuit 146 determines the difference between each of the prediction images supplied from the unidirectional prediction circuit 142, the bidirectional prediction circuit 143, the upconversion prediction circuit 144, and the filtering prediction circuit 145 and the original image, and outputs residual signals representing the determined differences to the determination circuit 147.

The determination circuit 147 measures the intensities of the residual signals supplied from the prediction error calculation circuit 146, and determines, as a prediction method for generating a prediction image to be used for encoding, a prediction method that has been used to generate a prediction image having a small difference from the original image. The determination circuit 147 outputs information representing the determination result to the lossless encoding circuit 116 as mode information. The mode information also includes information representing the size of a block to be used as the unit of processing, and the like.

Furthermore, in a case where it is determined that a prediction image is to be generated through inter-prediction (in a case where it is determined that inter-coding is to be performed), the determination circuit 147 outputs reference frames read from the frame memory 122, together with the mode information, to the motion prediction/compensation circuit 125. In a case where it is determined that a prediction image is to be generated through intra-prediction (in a case where it is determined that intra-coding is to be performed), the determination circuit 147 outputs an image used for intra-prediction, which is read from the frame memory 122, to the intra-prediction circuit 126 together with the mode information.

Figure 12:
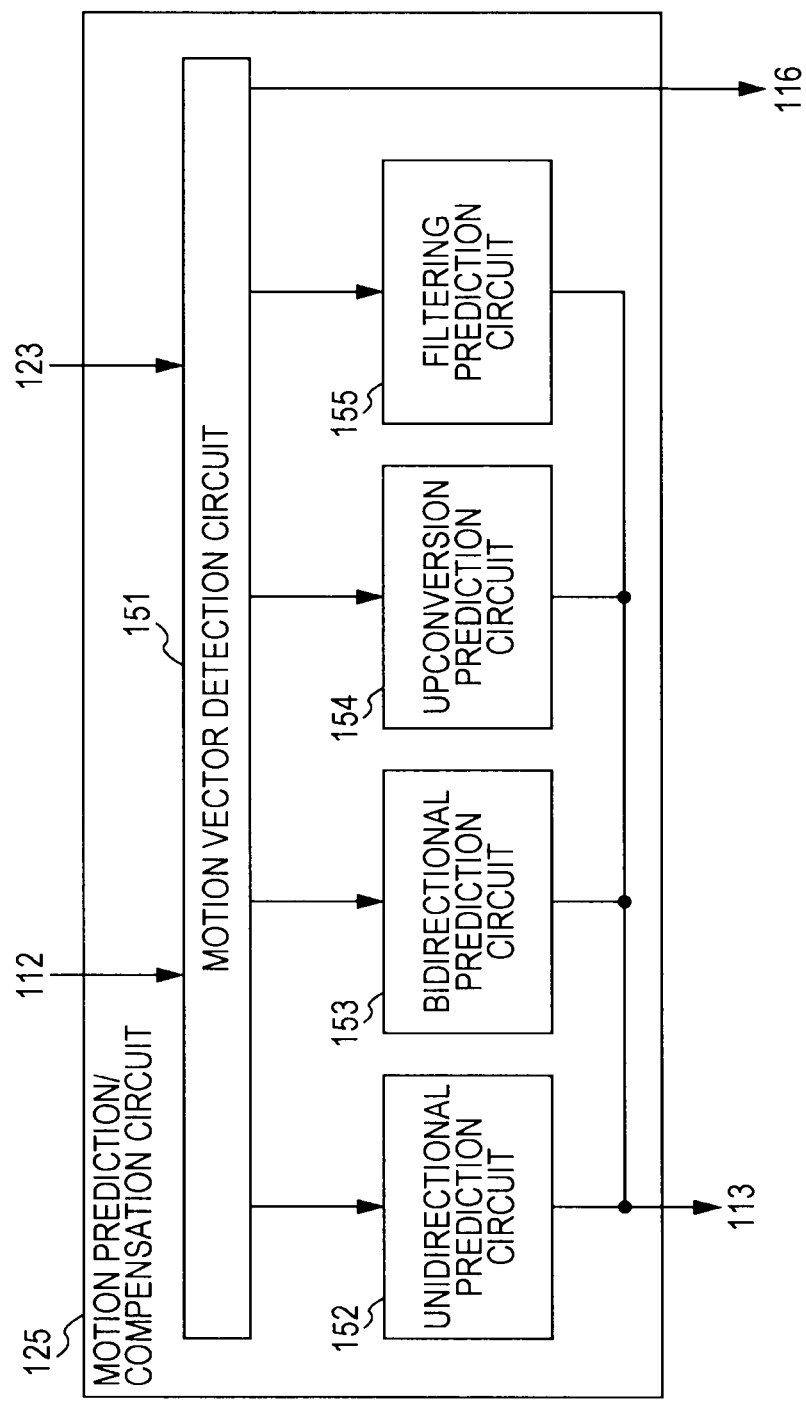
FIG. 12 is a block diagram illustrating an example configuration of a main part of a motion prediction/compensation circuit.

FIG. 12 is a block diagram illustrating an example configuration of a main part of the motion prediction/compensation circuit 125 in FIG. 10.

As illustrated in FIG. 12, the motion prediction/compensation circuit 125 includes a motion vector detection circuit 151, a unidirectional prediction circuit 152, a bidirectional prediction circuit 153, an upconversion prediction circuit 154, and a filtering circuit 155. The motion prediction/compensation circuit 125 has a similar configuration to the motion prediction/compensation circuit 21 illustrated in FIG. 5, except that the motion vector detection circuit 151 is provided in place of the prediction selection circuit 51.

The motion vector detection circuit 151 detects motion vectors by performing block matching or the like on the basis of the original image supplied from the rearrangement buffer 112 and reference frames supplied from the mode determination circuit 123. The motion vector detection circuit 151 refers to the mode information supplied from the mode determination circuit 123, and outputs the reference frames to one of the unidirectional prediction circuit 152 to the filtering prediction circuit 155. Furthermore, the motion vector detection circuit 151 also outputs the motion vectors to the destination to which the reference frames are to be output, as necessary.

The motion vector detection circuit 151 outputs the motion vectors, together with the reference frames, to the unidirectional prediction circuit 152 in a case where unidirectional prediction has been selected, and outputs these pieces of information to the bidirectional prediction circuit 153 in a case where it has been selected that bidirectional prediction is to be performed. Furthermore, in a case where upconversion prediction has been selected, the motion vector detection circuit 151 outputs the image of the current frame in the base layer, which is a reference frame, to the upconversion prediction circuit 154. Moreover, in a case where filtering prediction has been selected, the motion vector detection circuit 151 outputs the motion vectors, together with the reference frames in the base layer, to the filtering prediction circuit 155.

The unidirectional prediction circuit 152 generates a prediction image by, similarly to the unidirectional prediction circuit 61 in FIG. 5, performing unidirectional prediction. The unidirectional prediction circuit 152 outputs the generated prediction image to the adder circuit 113. The bidirectional prediction circuit 153 generates a prediction image by, similarly to the bidirectional prediction circuit 62 in FIG. 5, performing bidirectional prediction. The bidirectional prediction circuit 153 outputs the generated prediction image to the adder circuit 113. The upconversion prediction circuit 154 generates a prediction image by, similarly to the upconversion prediction circuit 63 in FIG. 5, performing upconversion prediction. The upconversion prediction circuit 154 outputs the generated prediction image to the adder circuit 113.

The filtering prediction circuit 155 generates a prediction image by, similarly to the filtering prediction circuit 64 in FIG. 5, extracting a motion compensation image from each of a plurality of reference frames in the base layer and performing filtering prediction involving upconversion on the plurality of extracted motion compensation images. The filtering prediction circuit 155 outputs the generated prediction image to the adder circuit 113. Note that the filtering prediction circuit 155 has a configuration similar to the configuration of the filtering prediction circuit 64 illustrated in FIG. 6. Hereinafter, the configuration of the filtering prediction circuit 155 will be explained by referring to the configuration of the filtering prediction circuit 64 illustrated in FIG. 6, as appropriate.

The prediction image generated through filtering prediction may be an image that includes more high-frequency components than a prediction image generated through unidirectional prediction, bidirectional prediction, or upconversion prediction and that has a small difference from the original image. Therefore, filtering prediction requires only a small amount of code to be assigned to residuals, thus making it possible to increase encoding efficiency. Furthermore, in filtering prediction, the resolution of reference frames is lower than that in the case of unidirectional prediction or bidirectional prediction in which frames in the enhancement layer are referred to, resulting in a small load of processes such as saving reference frames in the frame memory 122 and reading reference frames from the frame memory 122. That is to say, with the use of filtering prediction, the encoding apparatus 101 can improve encoding efficiency while preventing an increase in the load of encoding or decoding.

Moreover, filtering prediction can be performed using at least two reference frames. Thus, such an increase in encoding efficiency is made feasible without increasing the complexity of processing. The residual from the original image can be reduced and the encoding efficiency can be increased by, for example, increasing the number of reference frames to be used in inter-prediction to generate a high-accuracy prediction image and by using it. However, in this case, the number of reference frames used increases, and the complexity of processing increases.

Note that when a prediction method is selected, an optimum prediction method may be selected by taking into account the amount of code for information such as motion vectors necessary for prediction and an encoding mode and by adding a weight corresponding to the amount of code to the intensity of a residual signal. This makes it possible to further improve encoding efficiency. Furthermore, for a simplified encoding process, a prediction method may be adaptively selected utilizing feature values of an input original image in the time and spatial directions.

[Explanation of Flow of Encoding Process]

Next, the process of the encoding apparatus 101 having the above configuration will be explained.

Figure 13:
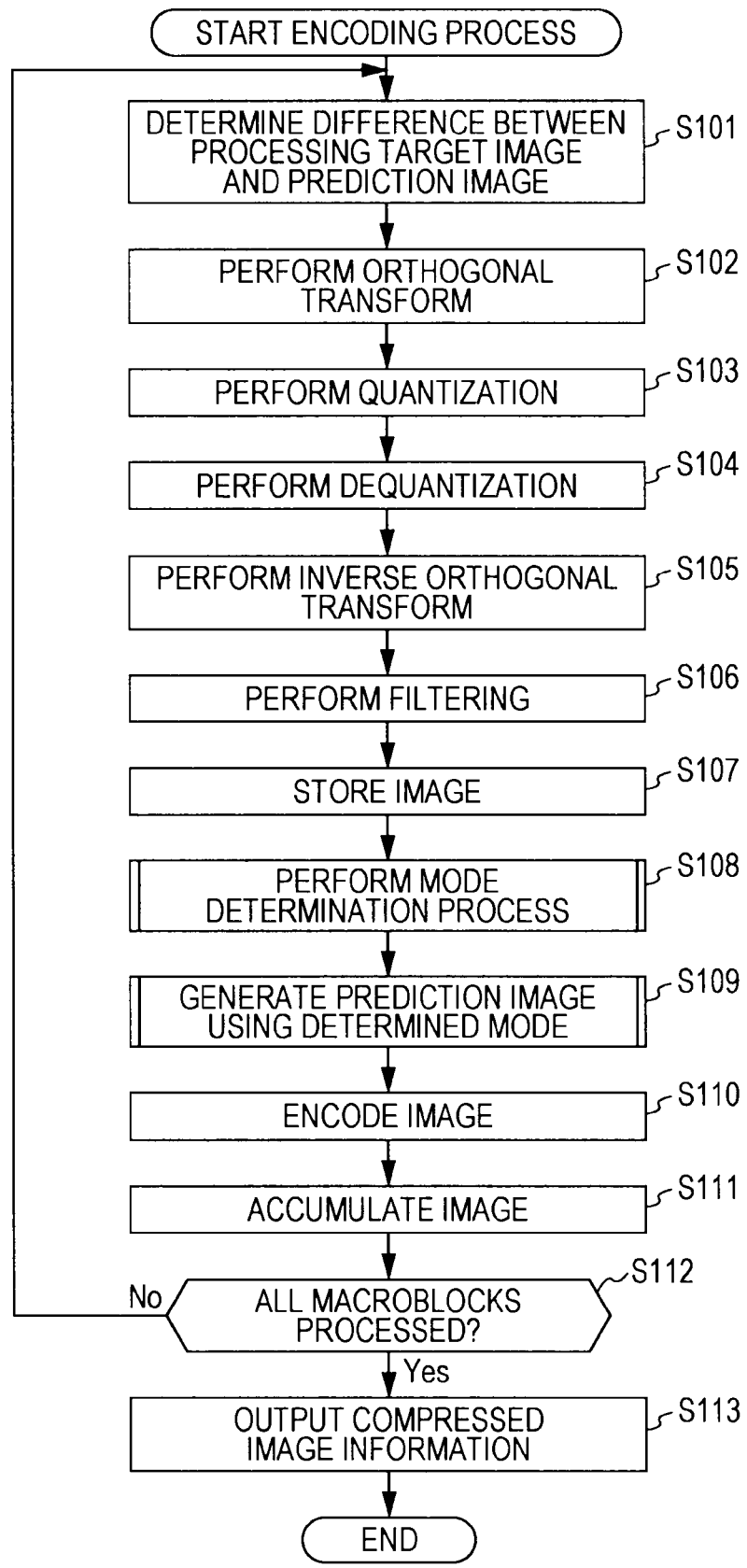
FIG. 13 is a flowchart explaining an example of a flow of an encoding process.

An encoding process for the enhancement layer, which is performed by the encoding apparatus 101, will be explained with reference to a flowchart in FIG. 13. This process is started when an image of a certain unit such as a macroblock is output from the rearrangement buffer 112. Note that, as described above, the encoding process for the base layer is similar to the method based on the H.264 requirements and the explanation thereof is thus omitted.

In step S101, the adder circuit 113 determines the difference between an image supplied from the rearrangement buffer 112 and a prediction image generated by the motion prediction/compensation circuit 125 or the intra-prediction circuit 126, and outputs the residual to the orthogonal transform circuit 114.

In step S102, the orthogonal transform circuit 114 performs the orthogonal transform on the residual supplied from the adder circuit 113, and outputs a transform coefficient to the quantization circuits 115.

In step S103, the quantization circuit 115 quantizes the transform coefficient supplied from the orthogonal transform circuit 114, and outputs the quantized transform coefficient.

In step S104, the dequantization circuit 119 performs dequantization on the transform coefficient quantized by the quantization circuit 115, and outputs the transform coefficient to the inverse orthogonal transform circuit 120.

In step S105, the inverse orthogonal transform circuit 120 performs the inverse orthogonal transform on the transform coefficient supplied from the dequantization circuit 119, and outputs an obtained image to the deblocking filter 121.

In step S106, the deblocking filter 121 removes block noise by performing filtering, and outputs an image from which the block noise has been removed to the frame memory 122.

In step S107, the frame memory 122 stores the image supplied from the deblocking filter 121.

In step S108, the mode determination circuit 123 performs a mode determination process. With the mode determination process, which prediction mode a prediction image is to be generated in is determined. The details of the mode determination process will be described below.

In step S109, the motion prediction/compensation circuit 125 or the intra-prediction circuit 126 generates a prediction image in the mode determined in step S108. This prediction image is utilized in the processing of step S101.

In step S110, the lossless encoding circuit 116 compresses the transform coefficient supplied from the quantization circuit 115, and outputs the compressed transform coefficient to the storage buffer 117. Furthermore, the lossless encoding circuit 116 describes an identification flag in the header of the image or describes motion vectors supplied from the motion prediction/compensation circuit 125 in the header of the image in accordance with the information supplied from the mode determination circuit 123.

In step S111, the storage buffer 117 temporarily stores the information supplied from the lossless encoding circuit 116.

In step S112, the control circuit 31 judges whether or not the foregoing process has been performed on the macroblocks in one entire frame. In a case where it is judged that the process has not been performed, attention is focused on another macroblock and the process from step S101 is repeatedly performed.

In contrast, in a case where it is judged in step S112 that the process has been performed on the macroblocks in one entire frame, then, in step S113, the storage buffer 117 outputs compressed image information in accordance with the control by the control circuit 131. The foregoing process is performed on each frame.

Figure 14:
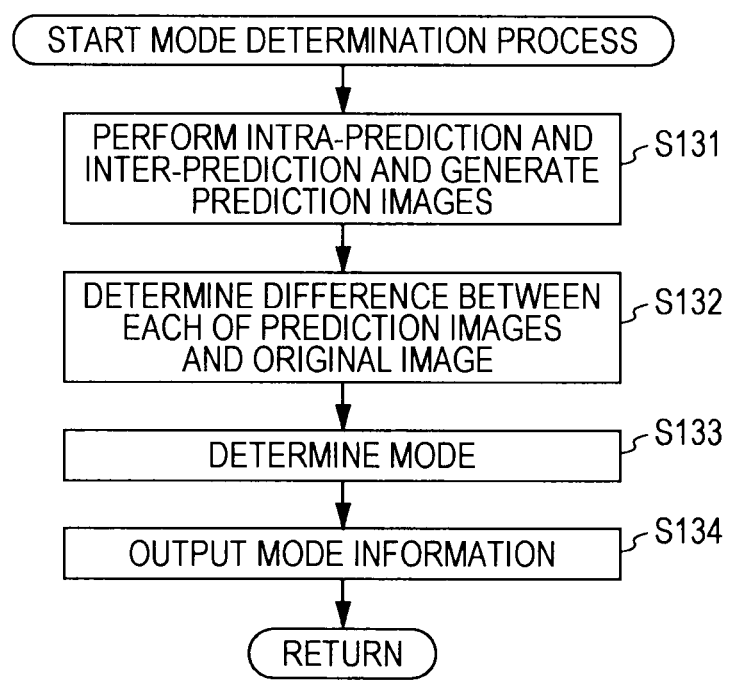
FIG. 14 is a flowchart explaining an example of a flow of a mode determination process.

Next, the mode determination process performed in step S108 of FIG. 13 will be explained with reference to a flowchart of FIG. 14.

In step S131, each of the intra-prediction circuit 141 to the filtering prediction circuit 145 performs intra-prediction or inter-prediction on a block having a different dimension, and generates a prediction image. The generated prediction images are supplied to the prediction error calculation circuit 146.

In step S132, the prediction error calculation circuit 146 determines the difference between the original image and each of the prediction images supplied from the intra-prediction circuit 141 to the filtering prediction circuit 145. The prediction error calculation circuit 146 outputs residual signals to the determination circuit 147.

In step S133, the determination circuit 147 determines a prediction method for generating a prediction image to be supplied to the adder circuit 113 on the basis of the intensities of the residual signals supplied from the prediction error calculation circuit 146.

In step S134, the determination circuit 147 outputs mode information that is information regarding the determined prediction method to the lossless encoding circuit 116. After that, the process returns to step S108 of FIG. 13, and the subsequent processing is performed.

Next, an example of a flow of a filtering prediction process for generating a prediction image by performing filtering prediction will be explained with reference to a flowchart in FIG. 15 as an example of a process for generating a prediction image performed in step S109 in FIG. 13.

As described above, in step S109 in FIG. 13, a prediction image is generated using the mode determined in the mode determination process of step S108. Accordingly, in a case where a filtering prediction mode is determined in step S108, in step S109, a filtering prediction process as illustrated in FIG. 15 is executed.

When the filtering prediction process is started, in step S151, the motion vector detection circuit 151 detects motion vectors on the basis of the original image and the reference frames.

When motion vectors are detected, the processing of steps S152 to S161 is executed using the detected motion vectors in a manner similar to that of the processing of steps S41 to S50 in FIG. 9, respectively. That is to say, motion compensation images are generated in the reference frames in the base layer on the basis of the motion vectors, and a filtering process involving upconversion is performed on the motion compensation images to generate a prediction image in the enhancement layer.

When the processing of step S161 is completed, the filtering prediction process ends. Then, the process returns to step S109 in FIG. 13, and the processing after step S110 is executed.

Note that in a case where a different mode is selected in the processing of step S108, the motion prediction/compensation circuit 125 or the intra-prediction circuit 126 generates a prediction image using the selected different mode. The above processes are performed in accordance with the H.264/SVC standard, and the explanation thereof is thus omitted.

As above, encoding that takes spatial scalability into account is performed by more efficiently utilizing the temporal correlation included in a signal sequence in a moving image, thus enabling, for example, improvement in encoding efficiency while preventing an increase in load of processes such as encoding and decoding.

3. Third Embodiment

Overview of Decoding Process

Figure 16:
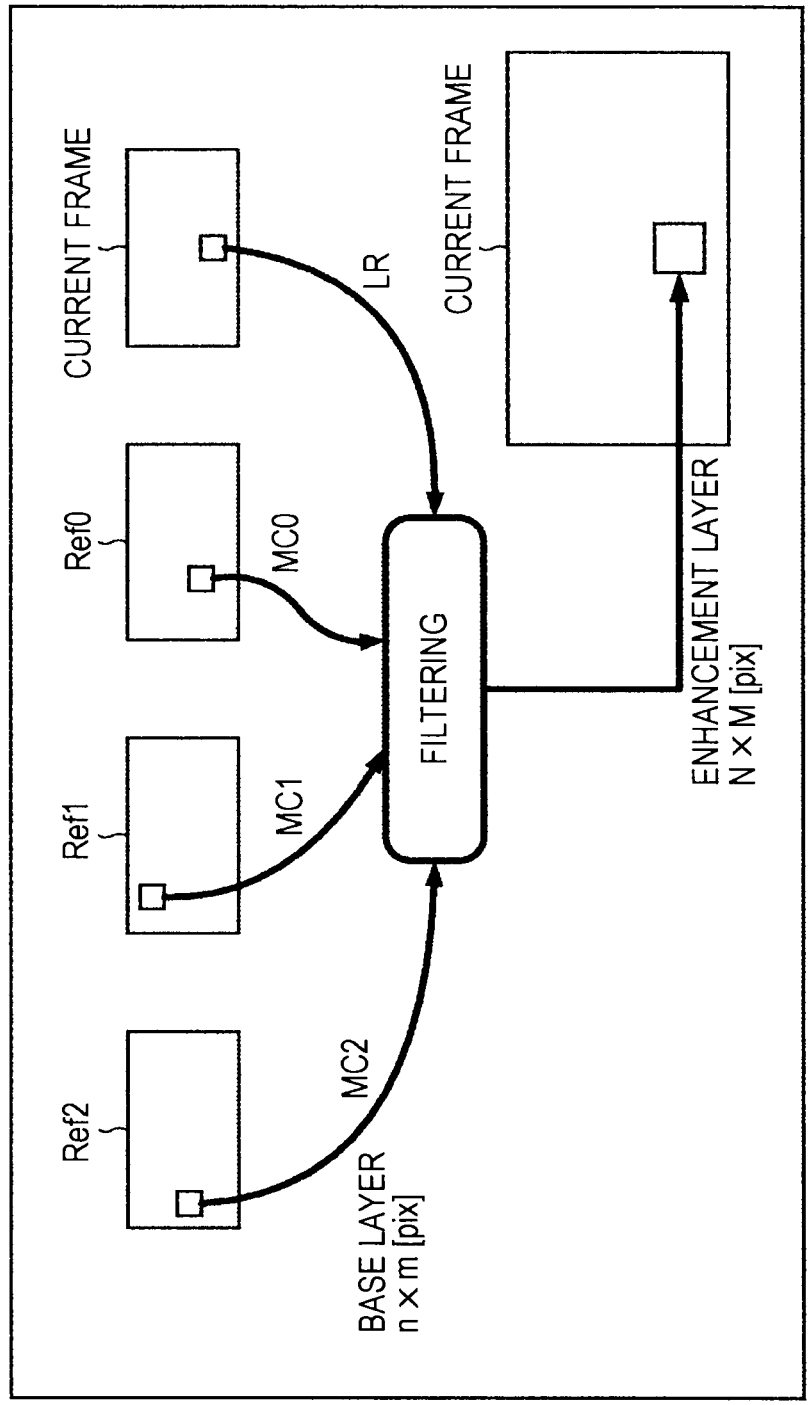
FIG. 16 is a diagram explaining another example of the overview of the decoding process to which the present invention is applied.

FIG. 16 is a diagram explaining another example of the overview of the decoding process to which the present invention is applied. As illustrated in FIG. 16, the number of reference frames may be three or more.

In the example in FIG. 16, the temporally preceding frame with respect to the current frame, the further preceding frame, and the still further preceding frame, i.e., three frames (Ref0, Ref1, Ref2), are set as reference frames. The preceding frame with respect to the current frame is set as the reference frame Ref0, the preceding frame with respect to the reference frame Ref0 is set as the reference frame Ref1, and the preceding frame with respect to the reference frame Ref1 is set as the reference frame Ref2.

[Configuration of Filtering Circuit]

Figure 17:
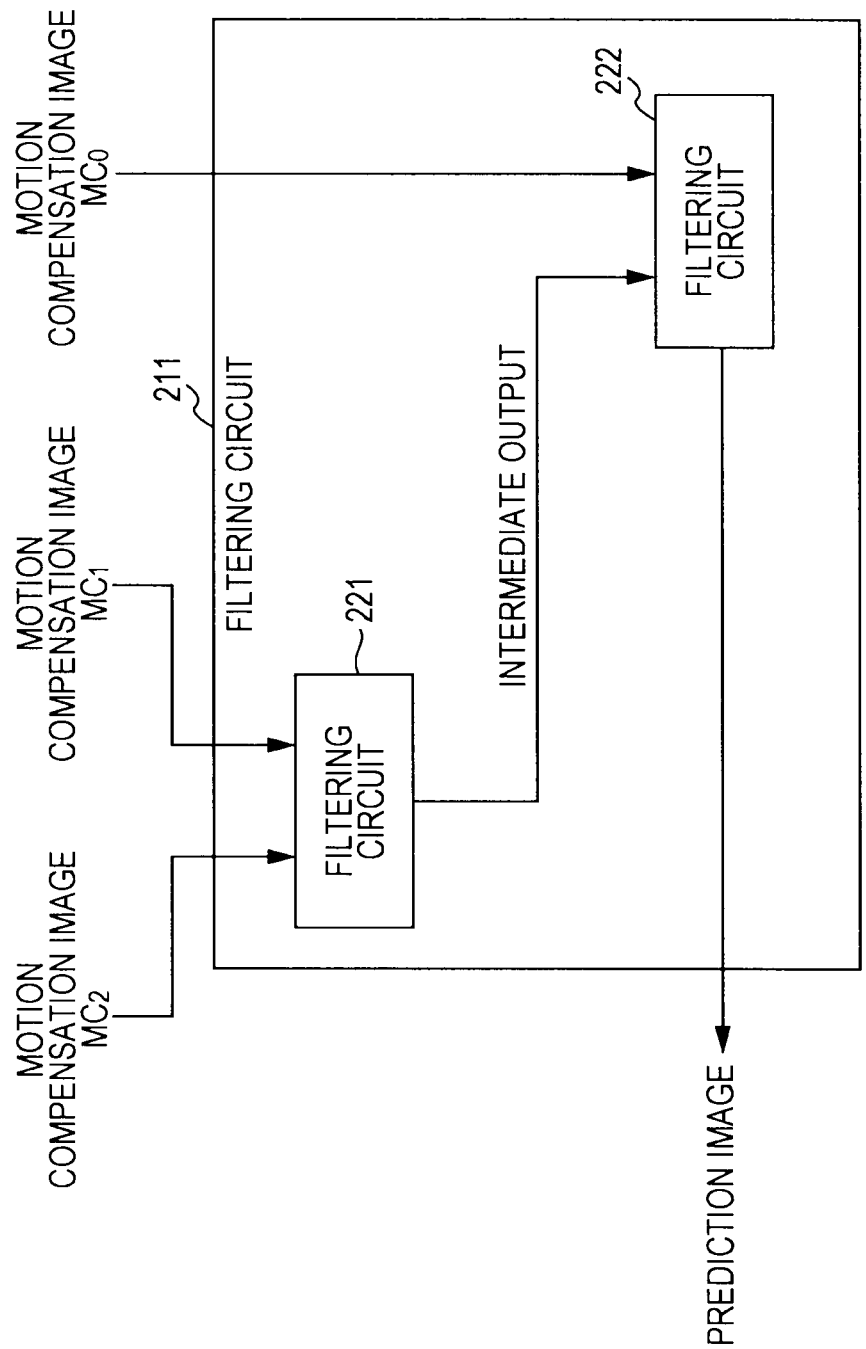
FIG. 17 is a block diagram illustrating another example configuration of a filtering circuit in FIG. 6.

FIG. 17 is a block diagram illustrating an example configuration of the filtering circuit in FIG. 6 in such a case where three frames are referred to.

As illustrated in FIG. 17, a filtering circuit 211 includes a filtering circuit 221 and a filtering circuit 222. Each of the filtering circuit 221 and the filtering circuit 222 has the configuration as illustrated in FIG. 6. That is, the filtering circuit 211 is configured to operate as a three-input and one-output circuit by connecting, in cascade, filtering circuits 72 used for the two-input and one-output design.

Note that, at this time, the extraction circuit 71 extracts a motion compensation image from each of the three reference frames (Ref0, Ref1, Ref2). That is to say, for example, the extraction circuit 71 extracts a motion compensation image MC0 from the reference frame Ref0. Furthermore, for example, the extraction circuit 71 extracts a motion compensation image MC1 from the reference frame Ref1. Moreover, for example, the extraction circuit 71 extracts a motion compensation image MC2 from the reference frame Ref2.

The motion compensation images MC1 and MC2 are input to the filtering circuit 221, and the motion compensation image MC0 is input to the filtering circuit 222.

The filtering circuit 221 performs filtering using the motion compensation images MC1 and MC2 as the motion compensation images MC0 and MC1, respectively, in FIG. 6 and the like, and an intermediate output X that is the result of filtering is output to the filtering circuit 222.

The filtering circuit 221 performs filtering using the intermediate output X and the motion compensation image MC0 as the motion compensation images MC0 and MC1, respectively, in FIG. 6 and the like, and the result of filtering is output as a prediction image.

The filtering circuit 211 that handles such three reference frames, in place of the filtering circuit 72, can also be provided in the decoding apparatus 1 in FIG. 3 or the encoding apparatus 101 in FIG. 10.

Note that the filtering circuit 221 and the filtering circuit 222 may not necessarily have the same configuration, and may have different configurations. Furthermore, parameters (for example, $\alpha$, $\beta$) used for the filters can also be made different from each other by taking into account the input/output characteristics obtained before and after filtering.

The filtering circuit 211 may perform filtering not on motion compensation images extracted from reference frames located in one temporal direction but on motion compensation images extracted from three reference frames located in the forward and backward directions.

Note that in a case where the preceding and following frames with respect to the time of the current frame are used as reference frames, a parameter such as a tap coefficient during filtering may be dynamically changed in accordance with the time direction or the distance of the reference frames.

Compressed image information is transmitted from the encoding apparatus 101 to the decoding apparatus 1 via various media including recording media such as an optical disk, a magnetic disk, and a flash memory, satellite broadcasting, cable TV, the Internet, and a mobile phone network.

Note that it has been explained that in the case of encoding and decoding of the enhancement layer, motion compensation images are extracted from reference frames in the base layer. However, motion compensation images may be extracted from an arbitrary layer other than the base layer.

For example, it is assumed that compressed image information forms a three-layer structure having a first layer to a third layer, where the first layer is the base layer that is a layer having the lowest resolution, the second layer is a layer having the next lowest resolution, and the third layer is a layer having the highest resolution. In this case, in filtering prediction for the third layer, motion compensation images may be extracted from reference frames in the second layer that is not the base layer. Of course, motion compensation images may be extracted from reference frames in the first layer that is the base layer.

4. Fourth Embodiment

Overview of Decoding Process

Furthermore, motion compensation images may also be extracted from reference frames in the same layer as that in which a prediction image is to be generated. For example, in the case of the three-layer structure described above, in filtering prediction for the third layer, low-resolution motion compensation images may be extracted from reference frames in the third layer.

Figure 18:
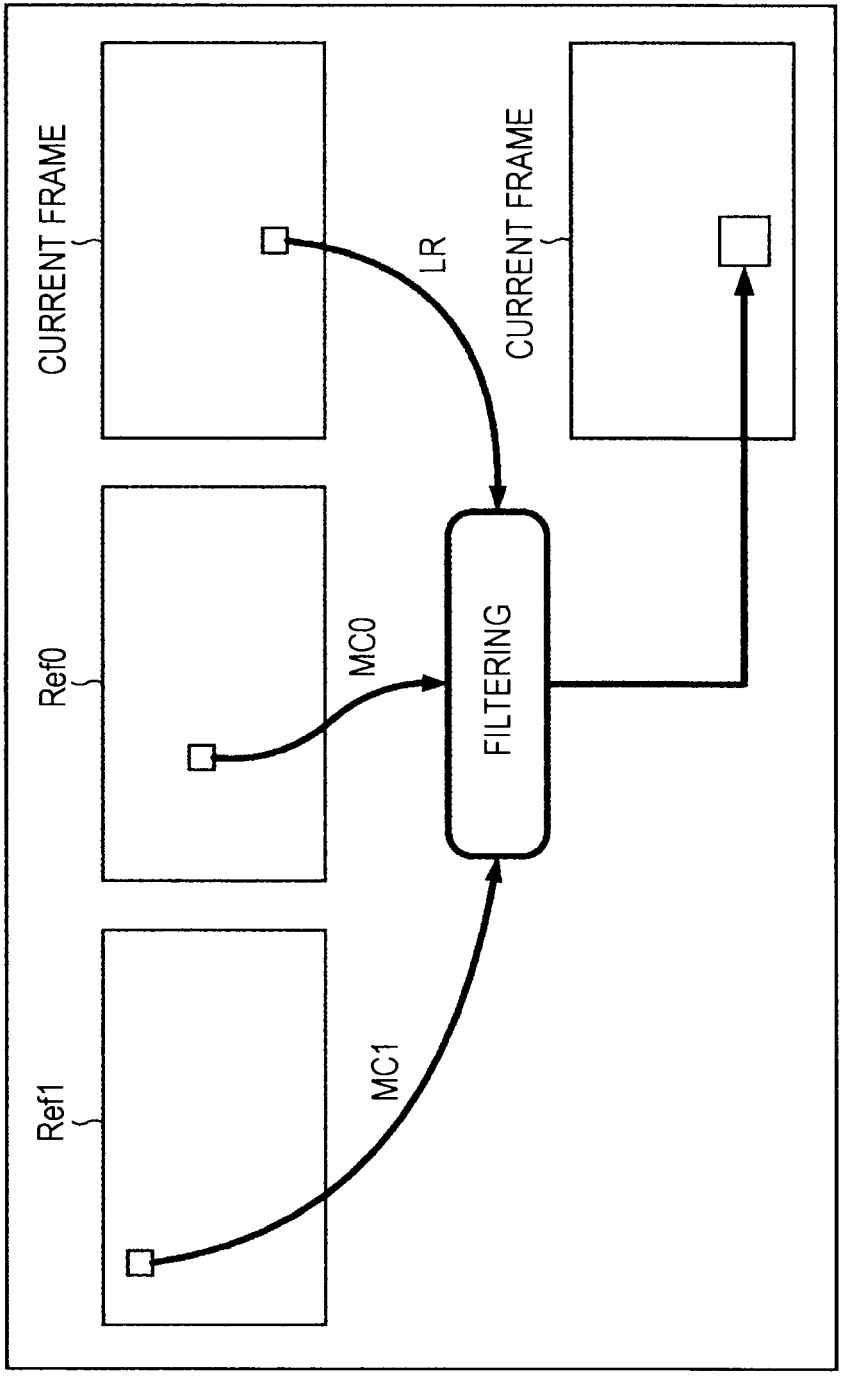
FIG. 18 is a diagram explaining still another example of the overview of the decoding process to which the present invention is applied.

FIG. 18 is a diagram explaining an overview of a decoding process in this case.

In the case of the example illustrated in FIG. 18, the reference frame Ref0 and the reference frame Ref1 are frames in an enhancement layer that is the same as that of a prediction image. In this regard, the resolutions of motion compensation images extracted from the respective reference frames are lower than the resolution of the prediction image.

For example, similarly to the conventional method complying with the H.264 standard, the positions (ranges) corresponding to the processing target macroblock in reference frames in the enhancement layer are specified by motion vectors, pixel values in the ranges are decimated by a certain number, and motion compensation images are extracted. Furthermore, for example, similarly to the conventional method complying with the H.264 standard, the positions corresponding to the processing target macroblock in reference frames in the enhancement layer are specified by motion vectors, and ranges that are centered on the positions and that are smaller than the size of the processing target macroblock are extracted as motion compensation images. Of course, any other method may be used.

That is to say, the resolutions of motion compensation images to be extracted may be lower than the resolution of a prediction image, and the extraction method therefor is arbitrary. Furthermore, motion compensation images may be extracted from any layer.

The low-resolution motion compensation images extracted in this manner are subjected to a filtering process including upconversion in a manner similar to that in the other case described above, and a prediction image having a desired resolution is generated.

The layer from which motion compensation images are to be generated is merely different, and the configuration of the encoding apparatus 1 in this case is basically similar to the configuration in the case explained with reference to FIGS. 3 to 6. In this regard, the frame memory 19 holds frames in the enhancement layer, and the extraction circuit 71 reads images in the enhancement layer from the frame memory 19.

[Explanation of Flow of Decoding Process]

Figure 7:
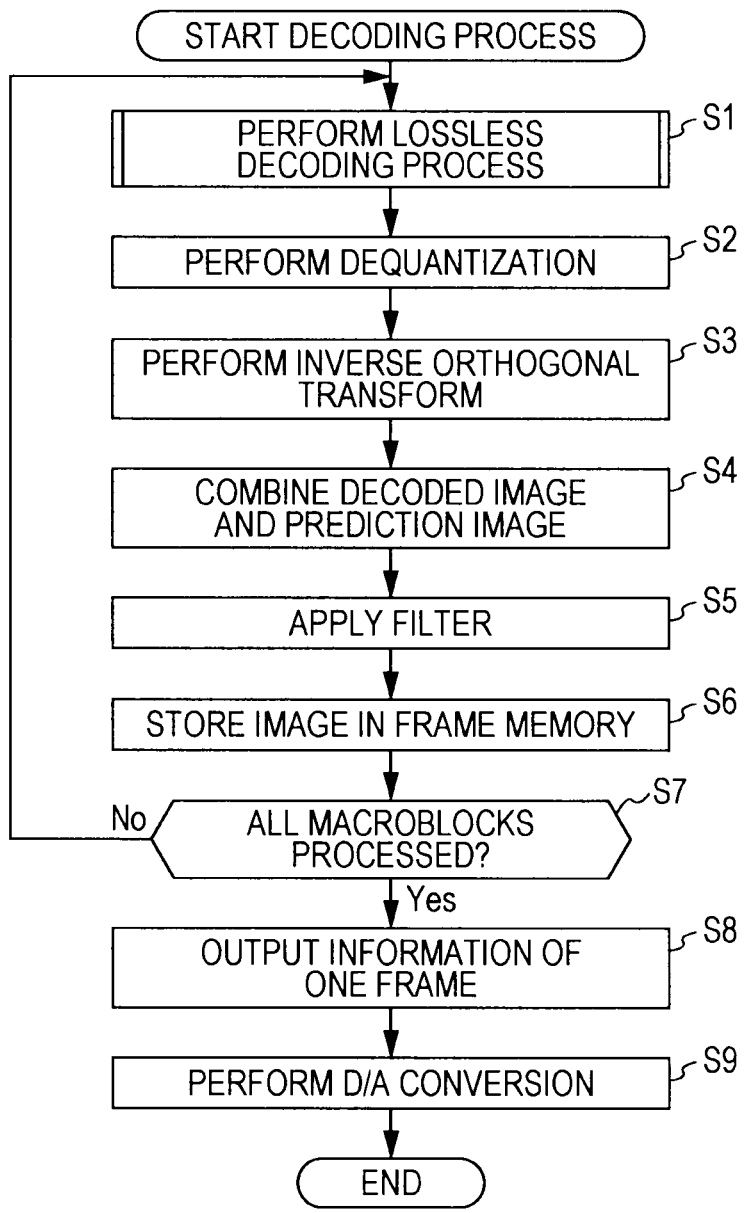
FIG. 7 is a flowchart explaining an example of a flow of a decoding process.
Figure 19:
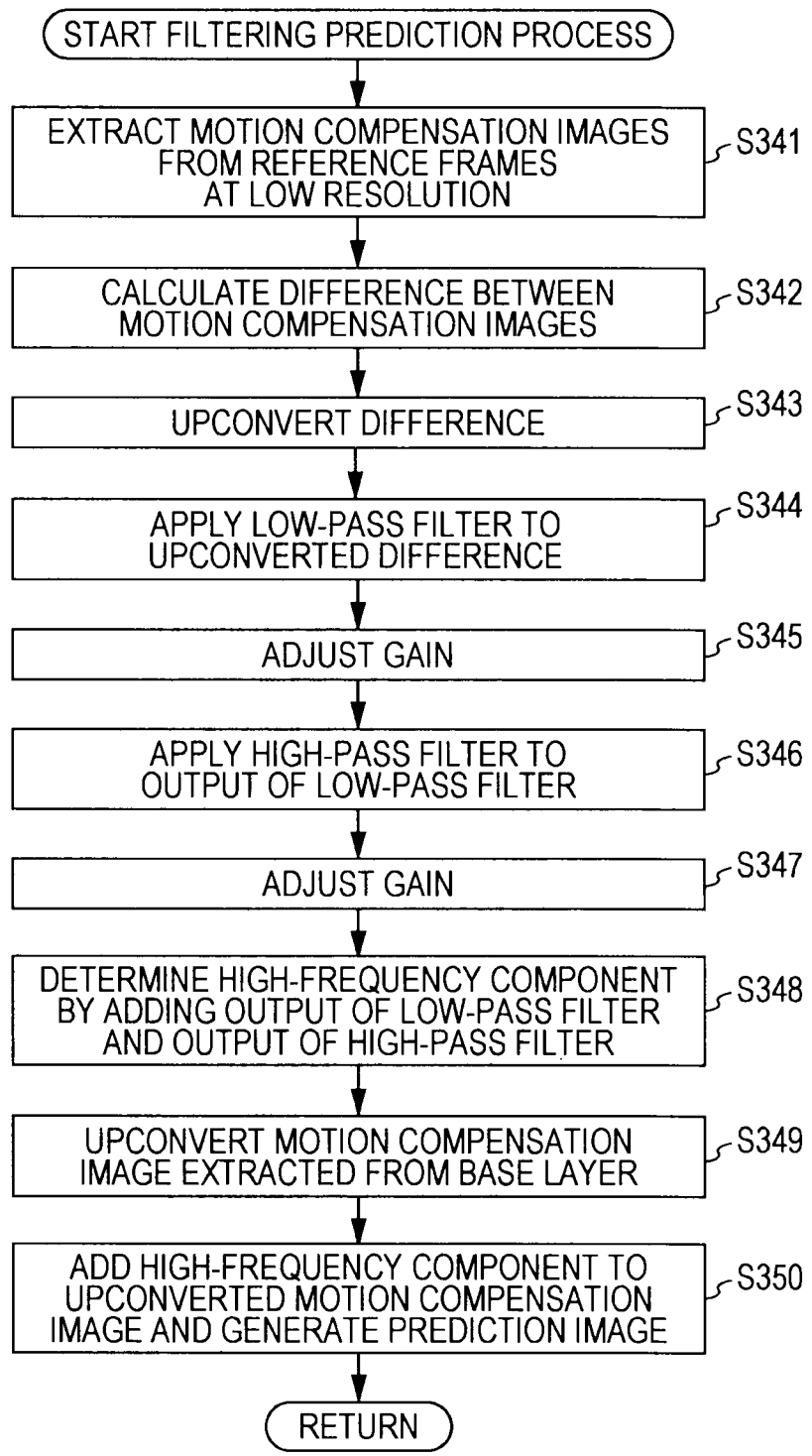
FIG. 19 is a flowchart explaining another example of the flow of the filtering prediction process when decoding is performed.

Accordingly, a flow of a decoding process and a lossless decoding process is also executed in a manner basically similar to that in the case explained with reference to the flowcharts in FIGS. 7 and 8. A flow of a filtering prediction process performed by the filtering prediction circuit 64 in this case will be explained with reference to a flowchart in FIG. 19. This flowchart corresponds to the flowchart in FIG. 9.

When the filtering prediction process is started, in step S341, the extraction circuit 71 extracts motion compensation images at a low resolution from reference frames in the enhancement layer. The processing of steps S342 to S350 is executed in a manner similar to that in the processing of steps S42 to S50 in FIG. 9, respectively, and a prediction image is generated in a manner similar to that in the case of FIG. 9.

When the processing of step S350 is completed, the filtering prediction process ends. Then, the process returns to step S28 in FIG. 8, and the process proceeds to step S29.

In this manner, even in a case where motion compensation images are extracted from frames in the enhancement layer, the decoding apparatus 1 can generate a high-resolution and high-accuracy prediction image by more efficiently utilizing the temporal correlation included in a signal sequence in a moving image, and can improve encoding efficiency. Furthermore, since motion compensation images can be made to have a lower resolution than a prediction image, for example, the decoding apparatus 1 can reduce the amount of image information to be read from a frame memory, and can improve encoding efficiency while preventing an increase in load of processes such as encoding and decoding.

[Explanation of Flow of Encoding Process]

Note that the configuration of the encoding apparatus 101 corresponding to the decoding apparatus 1 in this case is basically similar to that in the case explained with reference to FIGS. 10 to 12. In this regard, the frame memory 122 holds frames in the enhancement layer, and the mode determination process 123 reads images in the enhancement layer from the frame memory 19.

Even in this case, similarly to the case of FIGS. 11 and 12, the configuration of the filtering prediction circuit 145 of the mode determination process 123 and the filtering prediction circuit 155 of the motion prediction/compensation circuit 125 is also similar to the configuration of the filtering prediction circuit 64 illustrated in FIG. 6. In this regard, similarly to the case of the decoding apparatus 1, the extraction circuit 71 extracts motion compensation images from frames in the enhancement layer.

Figure 20:
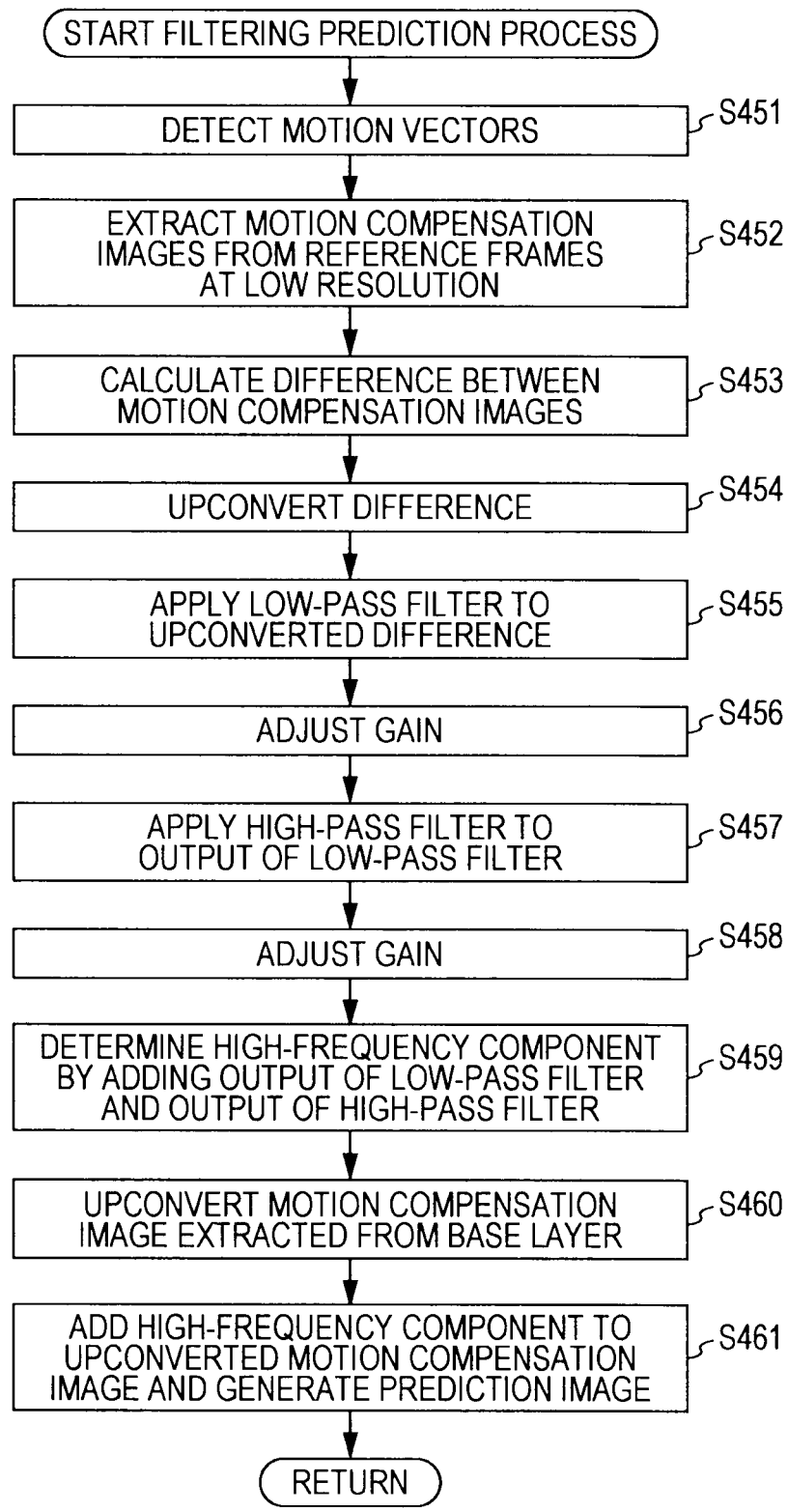
FIG. 20 is a flowchart explaining another example of the filtering prediction process when encoding is performed.

Accordingly, the flow of the encoding process or the mode determination process is executed in a manner basically similar to that in the case explained with reference to the flowcharts in FIGS. 13 and 14. A flow of a filtering prediction process performed by the filtering prediction circuit 155 in this case will be explained with reference to a flowchart in FIG. 20. This flowchart corresponds to the flowchart in FIG. 15.

Figure 15:
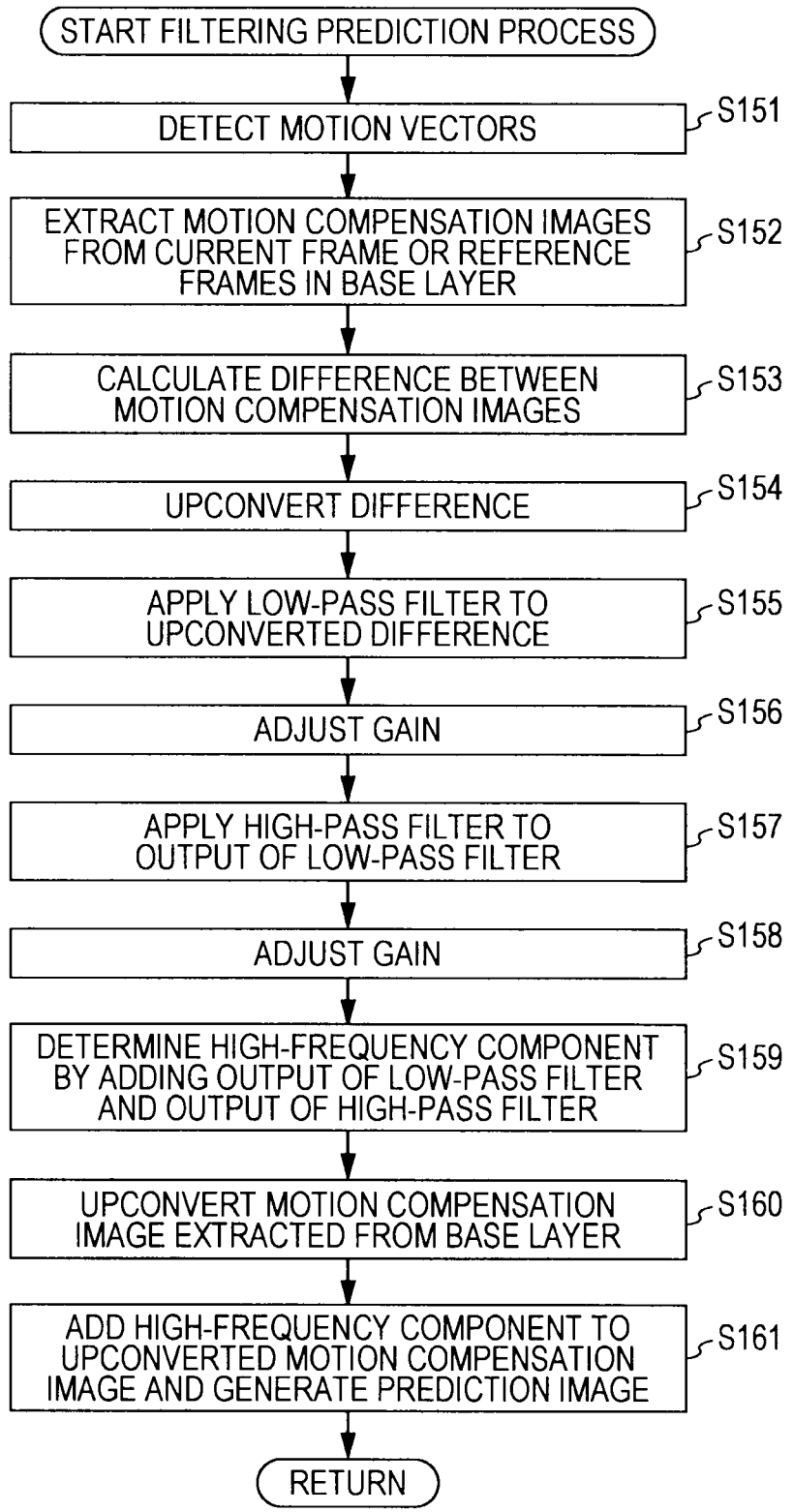
FIG. 15 is a flowchart explaining an example of a flow of a filtering prediction process when encoding is performed.

When the filtering prediction process is started, in step S451, similarly to the case of step S151 in FIG. 15, the motion vector detection circuit 151 detects motion vectors. In step S452, the extraction circuit 71 extracts motion compensation images at a low resolution from reference frames in the enhancement layer. The processing of steps S453 to S461 is executed in a manner similar to the processing of steps S153 to S161 in FIG. 15, respectively, and a prediction image is generated in a manner similar to that in FIG. 15.

When the processing of step S461 is completed, the filtering prediction process ends. Then, the process returns to step S109 in FIG. 13, and the process proceeds to step S110.

In this manner, even in a case where motion compensation images are extracted from frames in an enhancement layer, the encoding apparatus 101 can generate a high-resolution and high-accuracy prediction image by more efficiently utilizing the temporal correlation included in a signal sequence in a moving image, and can improve encoding efficiency. Furthermore, since motion compensation images can be made to have a lower resolution than a prediction image, for example, the encoding apparatus 101 can reduce the amount of image information to be read from a frame memory, and can improve encoding efficiency while preventing an increase in load of processes such as encoding and decoding.

That is, the above method can also be applied to the case of encoding and decoding image information using a single-layer structure that does not take spatial scalability into account. That is to say, the above method can also be applied to encoding and decoding in the H.264/AVC standard.

Note that, as described above, when motion compensation images are extracted, the resolutions may be adjusted to low resolutions. Thus, the extraction of motion compensation images may be performed in a plurality of layers. In this regard, the filtering prediction process requires to determine the difference between the motion compensation images. Thus, by this time, it is necessary to make the resolutions of the respective motion compensation images match each other.

The series of processes described above can be executed by hardware or software. In this case, the series of processes may be implemented as, for example, a personal computer as illustrated in FIG. 21.

Figure 21:
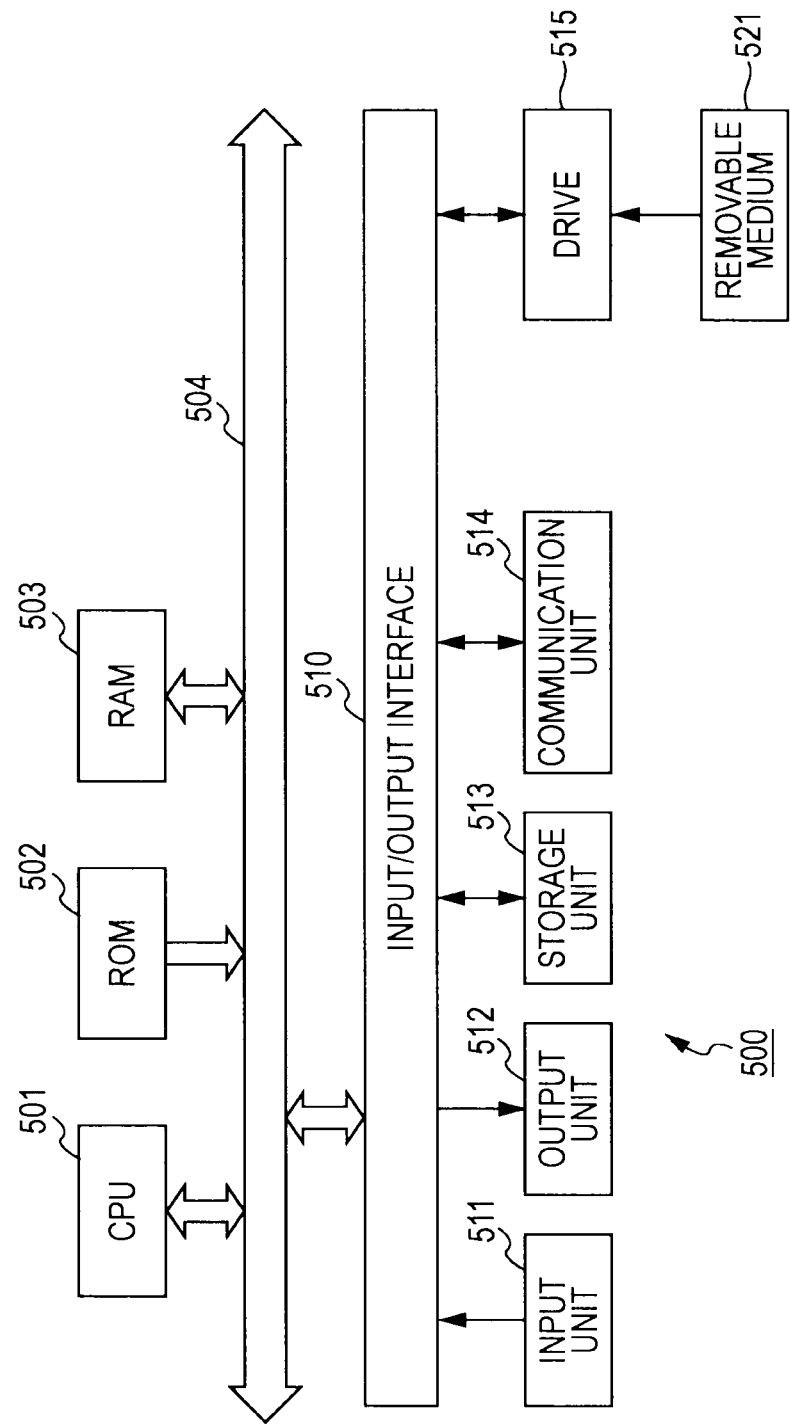
FIG. 21 is a block diagram illustrating an example configuration of a main part of a personal computer to which the present invention is applied.

In FIG. 21, a CPU (Central Processing Unit) 501 of a personal computer 500 executes various processes in accordance with a program stored in a ROM (Read Only Memory) 502 or in accordance with a program loaded into a RAM (Random Access Memory) 503 from a storage unit 513. The RAM 503 also stores, as appropriate, data and the like necessary for the CPU 501 to execute various processes.

The CPU 501, the ROM 502, and the RAM 503 are connected to one another via a bus 504. An input/output interface 510 is also connected to the bus 504.

An input unit 511 including a keyboard, a mouse, etc., an output unit 512 including a display such as a CRT (Cathode Ray Tube) display or an LCD (Liquid Crystal Display), speakers, etc., a storage unit 513 composed of a hard disk and the like, and a communication unit 514 composed of a modem and the like are connected to the input/output interface 510. The communication unit 514 performs a communication process via a network including the Internet.

A drive 515 is also connected to the input/output interface 510, as necessary, and a removable medium 521 such as a magnetic disk, an optical disk, a magneto-optical disk, or a semiconductor memory is attached to the drive 515, as appropriate. A computer program read from the removable medium 521 is installed into the storage unit 513 as necessary.

In a case where the series of processes described above is executed by software, a program constituting the software is installed from a network or a recording medium.

As illustrated in FIG. 21, this recording medium is not only composed of, for example, the removable medium 521 that is distributed separately from the apparatus main body in order to deliver the program to users and that has the program recorded thereon, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory, but also composed of the ROM 502, the hard disk included in the storage unit 513, and the like, which are distributed to users in the state being incorporated in the apparatus main body in advance and that have the program recorded thereon.

Note that the program executed by the computer may be a program in which processes are performed in a time-series manner in accordance with the order described herein, or may be a program in which processes are performed in parallel or at a necessary timing such as when called.

Furthermore, as used herein, the steps describing a program recorded on a recording medium include, of course, processes performed in a time-series manner in the order described herein and also include processes that are not necessarily processed in a time-series manner but are executed in parallel or individually.

Furthermore, as used herein, the term system refers to the overall apparatus composed of a plurality of devices (apparatuses).

Furthermore, the configuration explained above as a single apparatus (or processing unit) may be divided to construct a plurality of apparatuses (or processing units). Conversely, the configuration explained above as a plurality of apparatuses (or processing units) may be collected to construct a single apparatus (or processing unit). Furthermore, of course, a configuration other than that described above may be added to the configuration of each apparatus (or each processing unit). Moreover, a portion of the configuration of a certain apparatus (or processing unit) may be included in the configuration of another apparatus (or another processing unit) if the configuration or operation as an entire system is substantially the same. That is to say, embodiments of the present invention are not to be limited to the embodiments described above, and a variety of changes can be made without deviating from the gist of the present invention.

For example, the decoding apparatus 1 or encoding apparatus 101 described above can be applied to any electronic device. Examples thereof will be explained hereinafter.

Figure 22:
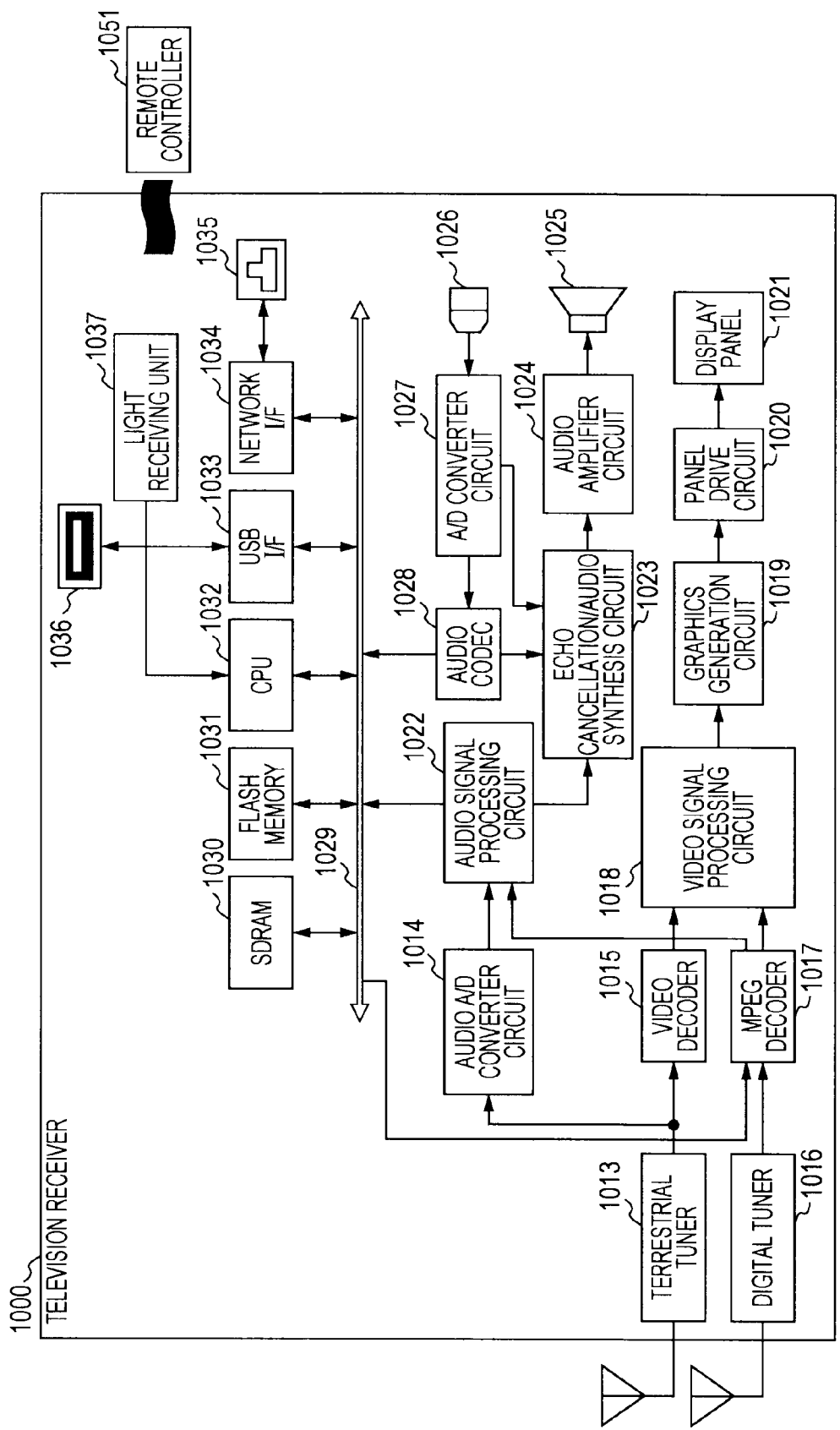
FIG. 22 is a block diagram illustrating an example configuration of a main part of a television receiver to which the present invention is applied.

FIG. 22 is a block diagram illustrating an example configuration of a main part of a television receiver that uses the decoding apparatus 1 to which the present invention is applied.

A television receiver 1000 illustrated in FIG. 22 includes a terrestrial tuner 1013, a video decoder 1015, a video signal processing circuit 1018, a graphic generation circuit 1019, a panel drive circuit 1020, and a display panel 1021.

The terrestrial tuner 1013 receives a broadcast wave signal of a terrestrial analog broadcast via an antenna, demodulates it, obtains a video signal, and supplies it to the video decoder 1015. The video decoder 1015 performs a decoding process on the video signal supplied from the terrestrial tuner 1013, and supplies an obtained digital component signal to the video signal processing circuit 1018.

The video signal processing circuit 1018 performs a certain process such as noise removal on the video data supplied from the video decoder 1015, and supplies obtained video data to the graphic generation circuit 1019.

The graphic generation circuit 1019 generates video data of a program to be displayed on the display panel 1021, image data obtained through a process that is based on an application supplied via a network, or the like, and supplies the generated video data or image data to the panel drive circuit 1020. Furthermore, the graphic generation circuit 1019 also performs processes, as appropriate, such as generating video data (graphic) for displaying a screen utilized by a user to select an item or the like, superimposing it onto the video data of the program to obtain video data, and supplying the obtained video data to the panel drive circuit 1020.

The panel drive circuit 1020 drives the display panel 1021 on the basis of the data supplied from the graphic generation circuit 1019, and causes video of a program or the various screens described above to be displayed on the display panel 1021.

The display panel 1021 is formed of an LCD (Liquid Crystal Display) or the like, and causes video of a program or the like to be displayed in accordance with the control by the panel drive circuit 1020.

Furthermore, the television receiver 1000 also includes an audio A/D (Analog/Digital) converter circuit 1014, an audio signal processing circuit 1022, an echo cancellation/audio synthesis circuit 1023, an audio amplifier circuit 1024, and a speaker 1025.

The terrestrial tuner 1013 demodulates a received broadcast wave signal to acquire a video signal as well as an audio signal. The terrestrial tuner 1013 supplies the acquired audio signal to the audio A/D converter circuit 1014.

The audio A/D converter circuit 1014 performs an A/D conversion process on the audio signal supplied from the terrestrial tuner 1013, and supplies an obtained digital audio signal to the audio signal processing circuit 1022.

The audio signal processing circuit 1022 performs a certain process such as noise removal on the audio data supplied from the audio A/D converter circuit 1014, and supplies obtained audio data to the echo cancellation/audio synthesis circuit 1023.

The echo cancellation/audio synthesis circuit 1023 supplies the audio data supplied from the audio signal processing circuit 1022 to the audio amplifier circuit 1024.

The audio amplifier circuit 1024 performs a D/A conversion process and an amplification process on the audio data supplied from the echo cancellation/audio synthesis circuit 1023, and adjusts it to a certain volume before outputting audio from the speaker 1025.

Further, the television receiver 1000 also includes a digital tuner 1016 and an MPEG decoder 1017.

The digital tuner 1016 receives a broadcast wave signal of a digital broadcast (terrestrial digital broadcast, BS (Broadcasting Satellite)/CS (Communications Satellite) digital broadcast) via the antenna, demodulates it, acquires an MPEG-TS (Moving Picture Experts Group-Transport Stream), and supplies it to the MPEG decoder 1017.

The MPEG decoder 1017 descrambles the MPEG-TS supplied from the digital tuner 1016, and extracts a stream including the data of a program to be reproduced (to be viewed and listened to). The MPEG decoder 1017 decodes audio packets forming the extracted stream, and supplies obtained audio data to the audio signal processing circuit 1022. Also, the MPEG decoder 1017 decodes video packets forming the stream, and supplies obtained video data to the video signal processing circuit 1018. Furthermore, the MPEG decoder 1017 supplies EPG (Electronic Program Guide) data extracted from the MPEG-TS to a CPU 1032 via a path that is not illustrated in the figure.

The television receiver 1000 uses the decoding apparatus 1 described above as the MPEG decoder 1017 that decodes a video packet in the above way. Note that an MPEG-TS transmitted from a broadcast station or the like has been encoded by the encoding apparatus 101.

Similarly to the case of the decoding apparatus 1, the MPEG decoder 1017 performs filtering on images of a plurality of reference planes in the base layer to generate a prediction image of the current block in the enhancement layer. Accordingly, the MPEG decoder 1017 can more effectively utilize the signal components in an image sequence than a spatial upsampling filter. As a result, a prediction image can have spatially higher frequency components than a prediction image generated through conventional upconversion prediction that utilizes an image of the current frame in the base layer, while prediction residuals can be reduced. That is to say, the amount of code for a picture to be encoded in the enhancement layer can be reduced, and it is possible to contribute to the improvement in encoding efficiency.

Moreover, in this filtering prediction, decoded images in the enhancement layer at temporally different frames are not referred to. Thus, the amount of processing necessary for encoding, the temporary storage capacity, the amount of information read from a memory, and the like can be reduced, and the cost taken for implementation can be reduced. Furthermore, power consumption can also be reduced.

The video data supplied from the MPEG decoder 1017 is subjected to, similarly to the case of the video data supplied from the video decoder 1015, a certain process by the video signal processing circuit 1018, and generated video data or the like is superimposed thereon by the graphic generation circuit 1019. The resulting data is supplied to the display panel 1021 via the panel drive circuit 1020, and an image thereof is displayed.

The audio data supplied from the MPEG decoder 1017 is subjected to, similarly to the case of the audio data supplied from the audio A/D converter circuit 1014, a certain process by the audio signal processing circuit 1022, supplied to the audio amplifier circuit 1024 via the echo cancellation/audio synthesis circuit 1023, and subjected to a D/A conversion process or an amplification process. Consequently, audio whose volume has been adjusted to a certain value is output from the speaker 1025.

Furthermore, the television receiver 1000 also includes a microphone 1026 and an A/D converter circuit 1027.

The A/D converter circuit 1027 receives a signal of audio of a user, which is captured by the microphone 1026 provided in the television receiver 1000 for use in audio conversation, performs an A/D conversion process on the received audio signal, and supplies obtained digital audio data to the echo cancellation/audio synthesis circuit 1023.

In a case where data of audio of a user (user A) of the television receiver 1000 has been supplied from the A/D converter circuit 1027, the echo cancellation/audio synthesis circuit 1023 performs echo cancellation on the audio data of the user A, and causes the data of audio obtained by, for example, being combined with other audio data to be output from the speaker 1025 via the audio amplifier circuit 1024.

Further, the television receiver 1000 also includes an audio codec 1028, an internal bus 1029, an SDRAM (Synchronous Dynamic Random Access Memory) 1030, a flash memory 1031, a CPU 1032, a USB (Universal Serial Bus) I/F 1033, and a network I/F 1034.

The A/D converter circuit 1027 receives a signal of audio of a user, which is captured by the microphone 1026 provided in the television receiver 1000 for use in audio conversation, performs an A/D conversion process on the received audio signal, and supplies obtained digital audio data to the audio codec 1028.

The audio codec 1028 converts the audio data supplied from the A/D converter circuit 1027 into data of a certain format for transmission through a network, and supplies it to the network I/F 1034 via the internal bus 1029.

The network I/F 1034 is connected to a network via a cable attached to a network terminal 1035. The network I/F 1034 transmits the audio data supplied from the audio codec 1028 to, for example, another apparatus connected to the network. Furthermore, the network I/F 1034 receives, for example, audio data transmitted from another apparatus connected over a network via the network terminal 1035, and supplies it to the audio codec 1028 via the internal bus 1029.

The audio codec 1028 converts the audio data supplied from the network I/F 1034 into data of a certain format, and supplies it to the echo cancellation/audio synthesis circuit 1023.

The echo cancellation/audio synthesis circuit 1023 performs echo cancellation on the audio data supplied from the audio codec 1028, and causes the data of audio obtained by, for example, being combined with other audio data to be output from the speaker 1025 via the audio amplifier circuit 1024.

The SDRAM 1030 stores various data necessary for the CPU 1032 to perform processes.

The flash memory 1031 stores the program executed by the CPU 1032. The program stored in the flash memory 1031 is read by the CPU 1032 at a certain timing such as when the television receiver 1000 is started. The flash memory 1031 also stores EPG data acquired via digital broadcasting, data acquired from a certain server via a network, and the like.

For example, the flash memory 1031 stores an MPEG-TS including content data acquired from a certain server over a network under the control of the CPU 1032. The flash memory 1031 supplies the MPEG-TS to the MPEG decoder 1017 via the internal bus 1029 by, for example, the control of the CPU 1032.

The MPEG decoder 1017 processes the MPEG-TS in a manner similar to that in the case of the MPEG-TS supplied from the digital tuner 1016. In this manner, the television receiver 1000 can receive content data composed of video, audio, and the like over a network, decode the content data using the MPEG decoder 1017, display video of the content data, and output audio.

Furthermore, the television receiver 1000 also includes a light receiving unit 1037 that receives light of an infrared signal transmitted from a remote controller 1051.

The light receiving unit 1037 receives infrared light from the remote controller 1051, and outputs a control code indicating the content of a user operation obtained through demodulation to the CPU 1032.

The CPU 1032 executes a program stored in the flash memory 1031, and controls the overall operation of the television receiver 1000 in accordance with the control code supplied from the light receiving unit 1037 or the like. The CPU 1032 is connected to each unit of the television receiver 1000 via a path that is not illustrated in the figure.

The USB I/F 1033 transmits and receives data to and from an external device of the television receiver 1000, which is connected via a USB cable attached to a USB terminal 1036. The network I/F 1034 is connected to a network via a cable attached to the network terminal 1035, and also transmits and receives data other than audio data to and from various apparatuses connected to the network.

With the use of the decoding apparatus 1 as the MPEG decoder 1017, the television receiver 1000 is capable of obtaining a high-definition decoded image without increasing a load during the decoding on video packets forming a stream. That is to say, the television receiver 1000 can improve encoding efficiency while preventing an increase in load.

Figure 23:
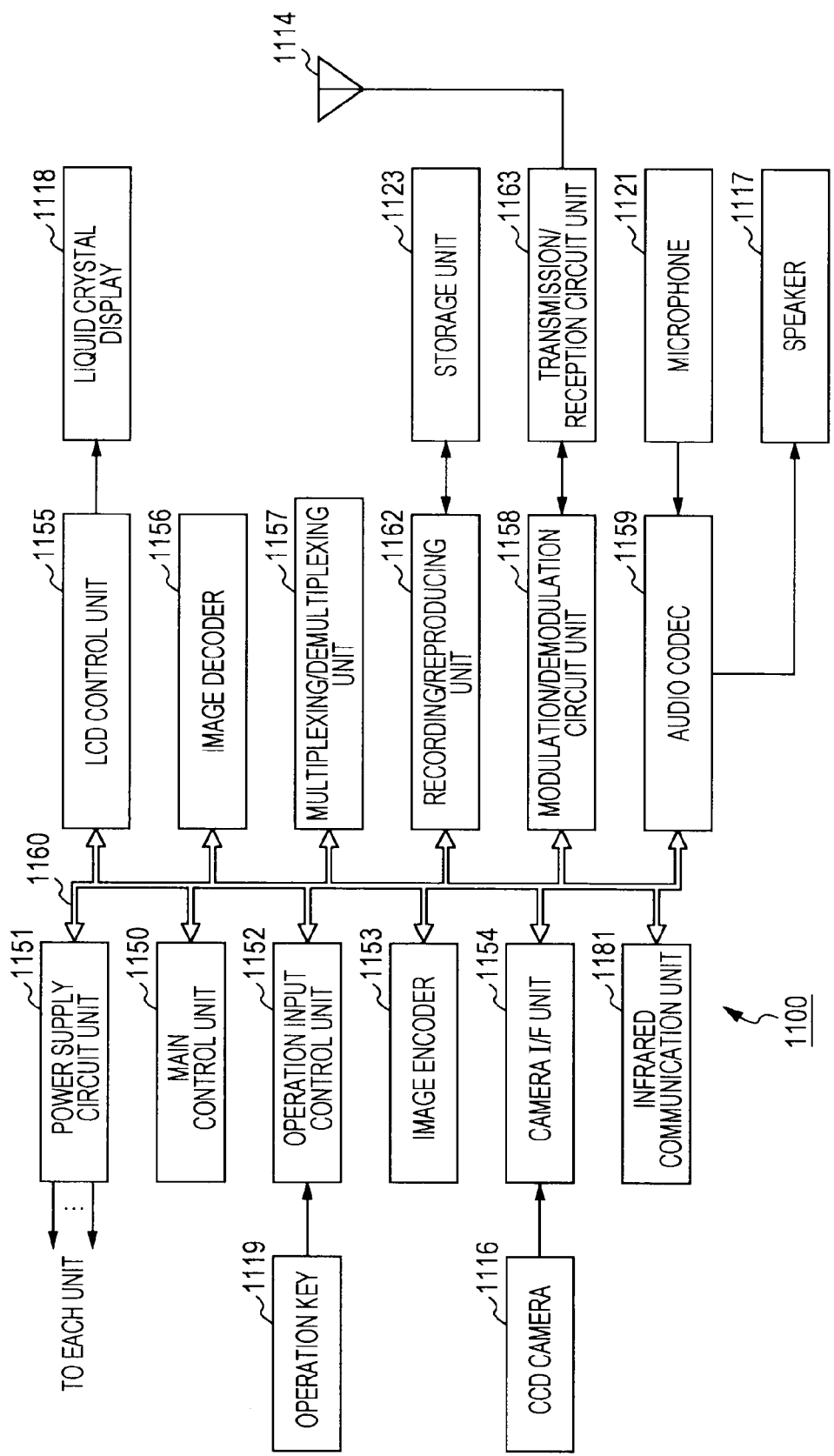
FIG. 23 is a block diagram illustrating an example configuration of a main part of a mobile phone to which the present invention is applied.

FIG. 23 is a block diagram illustrating an example configuration of a main part of a mobile phone that uses the decoding apparatus 1 and the encoding apparatus 101 to which the present invention is applied.

A mobile phone 1100 illustrated in FIG. 23 includes a main control unit 1150 configured to totally control individual units, a power supply circuit unit 1151, an operation input control unit 1152, an image encoder 1153, a camera I/F unit 1154, an LCD control unit 1155, an image decoder 1156, a multiplexing/demultiplexing unit 1157, a recording/reproducing unit 1162, a modulation/demodulation circuit unit 1158, and an audio codec 1159. They are interconnected via a bus 1160.

Furthermore, the mobile phone 1100 includes an operation key 1119, a CCD (Charge Coupled Devices) camera 1116, a liquid crystal display 1118, a storage unit 1123, a transmission/reception circuit unit 1163, an antenna 1114, a microphone (mic) 1121, and a speaker 1117.

When a call-end and power key is turned on by a user operation, the power supply circuit unit 1151 supplies electric power to each unit from a battery pack, thereby starting the mobile phone 1100 so as to be able to operate.

The mobile phone 1100 performs various operations in various modes such as an audio call mode and a data communication mode, such as transmitting and receiving an audio signal, transmitting and receiving electronic mail and image data, capturing images, and recording data, on the basis of the control of the main control unit 1150 composed of a CPU, a ROM, a RAM, etc.

For example, in the audio call mode, the mobile phone 1100 converts, using the audio codec 1159, an audio signal collected by the microphone (mic) 1121 into digital audio data, performs a spread spectrum process on the digital audio data using the modulation/demodulation circuit unit 1158, and performs a digital-to-analog conversion process and a frequency conversion process using the transmission/reception circuit unit 1163. The mobile phone 1100 transmits a transmission signal obtained through the conversion processes to a base station that is not illustrated in the figure via the antenna 1114. The transmission signal (audio signal) transmitted to the base station is supplied to a mobile phone on the other end of the call via a public telephone line network.

Furthermore, for example, in the audio call mode, the mobile phone 1100 amplifies, using the transmission/reception circuit unit 1163, a received signal that has been received by the antenna 1114, further performs a frequency conversion process and an analog-to-digital conversion process, performs an inverse spread spectrum process using the modulation/demodulation circuit unit 1158, and converts the resulting signal into an analog audio signal using the audio codec 1159. The mobile phone 1100 outputs the analog audio signal obtained by conversion from the speaker 1117.

Moreover, for example, in a case where electronic mail is transmitted in the data communication mode, the mobile phone 1100 accepts, using the operation input control unit 1152, text data of electronic mail input by operating the operation key 1119. The mobile phone 1100 processes the text data using the main control unit 1150, and causes the resulting data to be displayed as an image on the liquid crystal display 1118 via the LCD control unit 1155.

Furthermore, the mobile phone 1100 generates, using the main control unit 1150, electronic mail data on the basis of the text data accepted by the operation input control unit 1152, on the basis of a user instruction, or the like. The mobile phone 1100 performs, using the modulation/demodulation circuit unit 1158, a spread spectrum process on the electronic mail data, and performs, using the transmission/reception circuit unit 1163, a digital-to-analog conversion process and a frequency conversion process. The mobile phone 1100 transmits a transmission signal obtained by the conversion processes to a base station that is not illustrated in the figure via the antenna 1114. The transmission signal (electronic mail) transmitted to the base station is supplied to a certain destination via a network, a mail server, and the like.

Furthermore, for example, in a case where electronic mail is received in the data communication mode, the mobile phone 1100 receives, using the transmission/reception circuit unit 1163, a signal transmitted from a base station via the antenna 1114, amplifies it, and further performs a frequency conversion process and an analog-to-digital conversion process. The mobile phone 1100 performs an inverse spread spectrum process on the received signal using the modulation/demodulation circuit unit 1158 to restore the original electronic mail data. The mobile phone 1100 displays the restored electronic mail data on the liquid crystal display 1118 via the LCD control unit 1155.

Note that the mobile phone 1100 is also capable of recording (storing) received electronic mail data on the storage unit 1123 via the recording/reproducing unit 1162.

The storage unit 1123 is any rewritable storage medium. The storage unit 1123 may be, for example, a semiconductor memory such as a RAM or a built-in flash memory, or may be a hard disk, or a removable medium such as a magnetic disk, a magneto-optical disk, an optical disk, a USB memory, or a memory card. Of course, any other type of medium may be used.

Further, for example, in a case where image data is transmitted in the data communication mode, the mobile phone 1100 generates, using the CCD camera 1116, image data by capturing an image. The CCD camera 1116 includes optical devices such as a lens and an aperture, and a CCD serving as a photoelectric conversion element, captures an image of an object, converts the intensity of received light into an electrical signal, and generates image data of the image of the object. The CCD camera 1116 encodes the image data using the image encoder 1153 via the camera I/F unit 1154, and converts the image data into encoded image data.

The mobile phone 1100 uses the encoding apparatus 101 described above as the image encoder 1153 that performs the above processes. Similarly to the case of the encoding apparatus 101, the image encoder 1153 uses filtering prediction for generating a prediction image. Through this, a prediction image that includes more high-frequency components than a prediction image generated through unidirectional prediction, bidirectional prediction, or upconversion prediction and that has a small difference from the original image can be obtained. Hence, only a small amount of code to be assigned to a residual can be required, and it is possible to increase encoding efficiency. Since the resolution of reference frames is lower than that in the case of unidirectional prediction or bidirectional prediction in which frames in the enhancement layer are referred to, the load of processes such as saving reference frames in the frame memory 122 and reading reference frames from the frame memory 122 is small. Moreover, filtering prediction can be performed using at least two reference frames. Thus, such an increase in encoding efficiency is made feasible without increasing the complexity of processing.

Note that, at this time, the mobile phone 1100 simultaneously performs, using the audio codec 1159, analog-to-digital conversion on the audio collected by the microphone (mic) 1121 during the capture of an image using the CCD camera 1116, and further encodes it.

The mobile phone 1100 multiplexes, using the multiplexing/demultiplexing unit 1157, the encoded image data supplied from the image encoder 1153 and the digital audio data supplied from the audio codec 1159 using a certain scheme. The mobile phone 1100 performs, using the modulation/demodulation circuit unit 1158, a spread spectrum process on multiplexed data obtained as a result, and performs, using the transmission/reception circuit unit 1163, a digital-to-analog conversion process and a frequency conversion process. The mobile phone 1100 transmits a transmission signal obtained by the conversion process to a base station that is not illustrated in the figure via the antenna 1114. The transmission signal (image data) transmitted to the base station is supplied to the other end of the communication via a network or the like.

Note that in a case where no image data is to be transmitted, the mobile phone 1100 may also cause image data generated using the CCD camera 1116 to be displayed on the liquid crystal display 1118 via the LCD control unit 1155 without intervention of the image encoder 1153.

Furthermore, for example, in a case where data of a moving image file having a link to a simplified homepage or the like is to be received in the data communication mode, the mobile phone 1100 receives, using the transmission/reception circuit unit 1163 via the antenna 1114, a signal transmitted from a base station, amplifies it, and further performs a frequency conversion process and an analog-to-digital conversion process. The mobile phone 1100 performs an inverse spread spectrum process on the received signal using the modulation/demodulation circuit unit 1158 to restore the original multiplexed data. The mobile phone 1100 demultiplexes, using the multiplexing/demultiplexing unit 1157, the multiplexed data to separate it into encoded image data and audio data.

The mobile phone 1100 decodes encoded image data using the image decoder 1156 to generate reproduction moving image data, and displays the reproduction moving image data on the liquid crystal display 1118 via the LCD control unit 1155. This allows, for example, moving image data included in a moving image file linked to the simplified homepage to be displayed on the liquid crystal display 1118.

The mobile phone 1100 uses the decoding apparatus 1 described above as the image decoder 1156 that performs the above processes. That is to say, similarly to the case of the decoding apparatus 1, the image decoder 1156 performs filtering on images of a plurality of reference planes in the base layer to generate a prediction image of the current block in the enhancement layer. Accordingly, the image decoder 1156 can more effectively utilize the signal components in an image sequence than a spatial upsampling filter. As a result, a prediction image can have spatially higher frequency components than a prediction image generated through conventional upconversion prediction that utilizes an image of the current frame in the base layer, while prediction residuals can be reduced. That is to say, the amount of code for a picture to be encoded in the enhancement layer can be reduced, and it is possible to contribute to the improvement in encoding efficiency.

Moreover, in this filtering prediction, decoded images in the enhancement layer at temporally different frames are not referred to. Thus, the amount of processing necessary for encoding, the temporary storage capacity, the amount of information read from a memory, and the like can be reduced, and the cost taken for implementation can be reduced. Furthermore, power consumption can also be reduced.

At this time, the mobile phone 1100 simultaneously converts digital audio data into an analog audio signal using the audio codec 1159, and causes it to be output from the speaker 1117. This allows, for example, audio data included in the moving image file linked to the simplified homepage to be reproduced.

Note that, similarly to the case of electronic mail, the mobile phone 1100 may also be capable of causing received data linked to the simplified homepage or the like to be recorded on (stored in) the storage unit 1123 via the recording/reproducing unit 1162.

Furthermore, the mobile phone 1100 can also analyze, using the main control unit 1150, a two-dimensional code obtained by the CCD camera 1116 by capturing an image thereof, and acquire information recorded in the two-dimensional code.

Moreover, the mobile phone 1100 can communicate with an external device via infrared light using an infrared communication unit 1181.

The mobile phone 1100 uses the encoding apparatus 101 as the image encoder 1153. Thus, for example, encoding that takes spatial scalability into account when image data generated by the CCD camera 1116 is encoded and transmitted, by more efficiently utilizing the temporal correlation included in a signal sequence in a moving image. Thereby, for example, encoding efficiency can be improved while preventing an increase in the load of processes such as encoding and decoding.

Furthermore, the mobile phone 1100 uses the decoding apparatus 1 as the image decoder 1156, thus making it possible to obtain a high-definition decoded image without increasing the load of processing during decoding when, for example, receiving data (encoded data) of a moving image file linked to a simplified homepage or the like. That is to say, the mobile phone 1100 can improve encoding efficiency without preventing an increase in load.

Note that while it has been explained that the mobile phone 1100 uses the CCD camera 1116. However, the mobile phone 1100 may use, in place of the CCD camera 1116, an image sensor (CMOS image sensor) that uses a CMOS (Complementary Metal Oxide Semiconductor). Also in this case, similarly to the case of using the CCD camera 1116, the mobile phone 1100 can capture an image of an object and generate image data of the image of the object.

Furthermore, while the foregoing explanation has been given in the context of the mobile phone 1100, the decoding apparatus 1 and the encoding apparatus 101 can be applied to, similarly to the case of the mobile phone 1100, for example, any apparatus having an image capture function or communication function similar to that of the mobile phone 1100, such as a PDA (Personal Digital Assistants), a smartphone, a UMPC (Ultra Mobile Personal Computer), a netbook, or a notebook personal computer.

Figure 24:
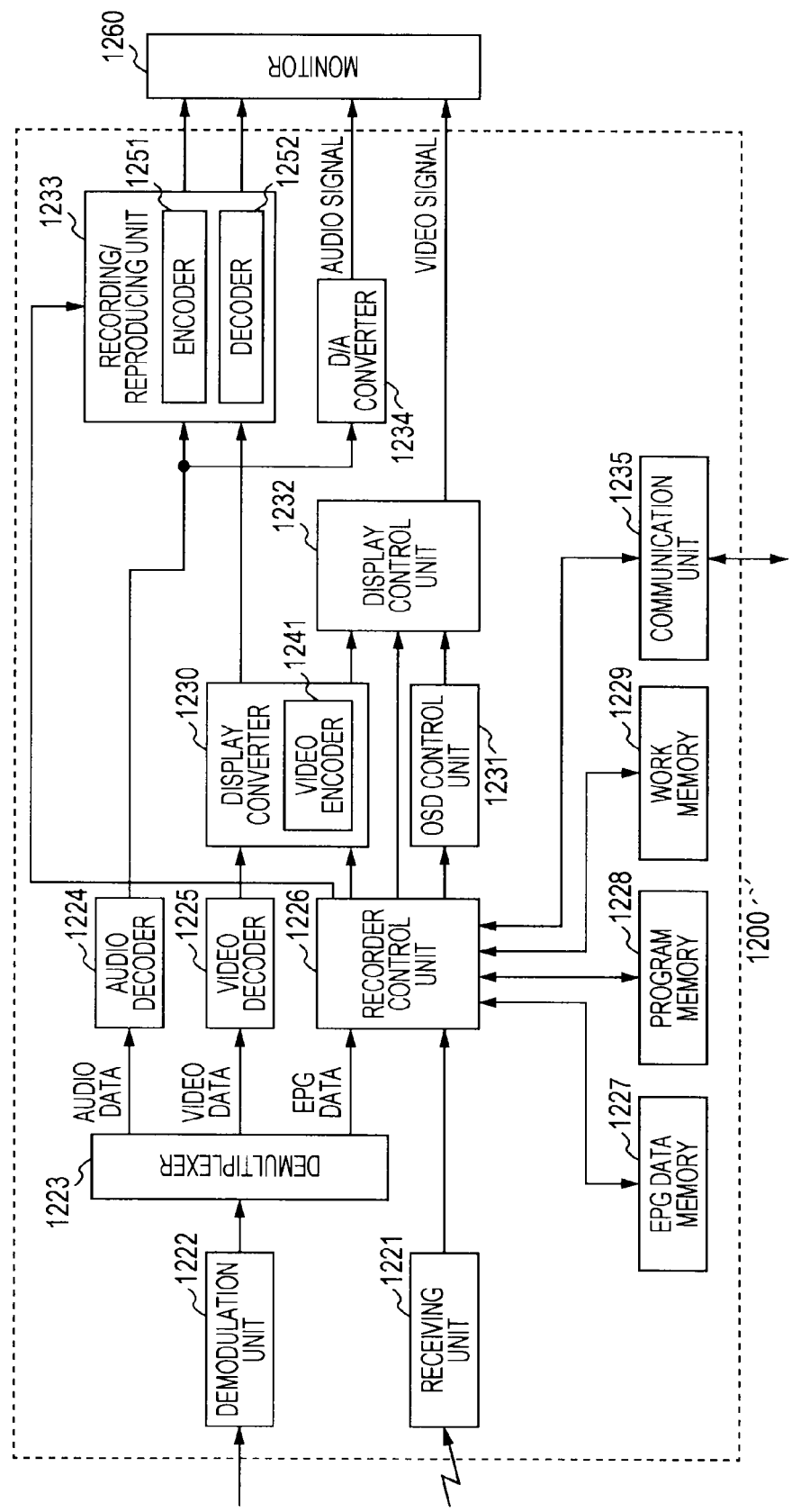
FIG. 24 is a block diagram illustrating an example configuration of a main part of a hard disk recorder to which the present invention is applied.

FIG. 24 is a block diagram illustrating an example configuration of a main part of a hard disk recorder that uses the decoding apparatus 1 and the encoding apparatus 101 to which the present invention is applied.

A hard disk recorder (HDD recorder) 1200 illustrated in FIG. 24 is an apparatus that saves, in its built-in hard disk, audio data and video data of a broadcast program included in a broadcast wave signal (television signal) transmitted from a satellite, a terrestrial antenna, or the like, which has been received by a tuner, and that provides a user with the saved data at a timing according to a user instruction.

The hard disk recorder 1200 can extract, for example, audio data and video data from a broadcast wave signal, decode them as appropriate, and store them in the built-in hard disk. Furthermore, the hard disk recorder 1200 can also acquire audio data or video data from another apparatus via, for example, a network, decode it as appropriate, and store the decoded data in the built-in hard disk.

Further, the hard disk recorder 1200 can decode audio data and video data recorded on, for example, the built-in hard disk, supply them to a monitor 1260, display an image thereof on a screen of the monitor 1260, and output audio thereof from a speaker of the monitor 1260. Furthermore, the hard disk recorder 1200 can also decode, for example, audio data and video data extracted from a broadcast wave signal acquired via a tuner or audio data and video data acquired from another apparatus via a network, supply them to the monitor 1260, display an image thereof on the screen of the monitor 1260, and output audio thereof from the speaker of the monitor 1260.

Of course, other operations are also possible.

As illustrated in FIG. 24, the hard disk recorder 1200 includes a receiving unit 1221, a demodulation unit 1222, a demultiplexer 1223, an audio decoder 1224, a video decoder 1225, and a recorder control unit 1226. The hard disk recorder 1200 further includes an EPG data memory 1227, a program memory 1228, a work memory 1229, a display converter 1230, an OSD (On Screen Display) control unit 1231, a display control unit 1232, a recording/reproducing unit 1233, a D/A converter 1234, and a communication unit 1235.

Furthermore, the display converter 1230 includes a video encoder 1241. The recording/reproducing unit 1233 includes an encoder 1251 and a decoder 1252.

The receiving unit 1221 receives an infrared signal from a remote controller (not illustrated), converts it into an electrical signal, and outputs it to the recorder control unit 1226. The recorder control unit 1226 is composed of, for example, a microprocessor or the like, and executes various processes in accordance with a program stored in the program memory 1228. At this time, the recorder control unit 1226 uses the work memory 1229 as necessary.

The communication unit 1235 is connected to a network, and performs a communication process with another apparatus via the network. For example, the communication unit 1235 is controlled by the recorder control unit 1226 to communicate with a tuner (not illustrated) and to output mainly a channel selection control signal to the tuner.

The demodulation unit 1222 demodulates a signal supplied from the tuner, and outputs it to the demultiplexer 1223. The demultiplexer 1223 demultiplexes the data supplied from the demodulation unit 1222 into audio data, video data, and EPG data, and outputs them to the audio decoder 1224, the video decoder 1225, and the recorder control unit 1226, respectively.

The audio decoder 1224 decodes the input audio data and outputs the decoded audio data to the recording/reproducing unit 1233. The video decoder 1225 decodes the input video data and outputs the decoded video data to the display converter 1230. The recorder control unit 1226 supplies the input EPG data to the EPG data memory 1227 to store the EPG data.

The display converter 1230 encodes, using the video encoder 1241, video data supplied from the video decoder 1225 or the recorder control unit 1226 into video data of, for example, the NTSC (National Television Standards Committee) scheme, and outputs it to the recording/reproducing unit 1233. Furthermore, the display converter 1230 converts the screen size of the video data supplied from the video decoder 1225 or the recorder control unit 1226 into the size corresponding to the size of the monitor 1260, converts the video data into video data of the NTSC scheme using the video encoder 1241, converts it into an analog signal, and outputs it to the display control unit 1232.

Under the control of the recorder control unit 1226, the display control unit 1232 superimposes an OSD signal output from the OSD (On Screen Display) control unit 1231 onto the video signal input from the display converter 1230, and outputs it to the display of the monitor 1260 to display it.

The audio data output from the audio decoder 1224, which has been converted into an analog signal by the D/A converter 1234, is also supplied to the monitor 1260. The monitor 1260 outputs the audio signal from its built-in speaker.

The recording/reproducing unit 1233 includes a hard disk as a storage medium on which video data, audio data, and the like are recorded.

The recording/reproducing unit 1233 encodes, using the encoder 1251, for example, the audio data supplied from the audio decoder 1224. Furthermore, the recording/reproducing unit 1233 encodes, using the encoder 1251, the video data supplied from the video encoder 1241 of the display converter 1230. The recording/reproducing unit 1233 combines the encoded data of the audio data and the encoded data of the video data using a multiplexer. The recording/reproducing unit 1233 performs channel coding on resulting composite data, amplifies it, and writes the data to the hard disk via a recording head.

The recording/reproducing unit 1233 reproduces the data recorded on the hard disk via a reproduction head, amplifies it, and separates it into audio data and video data using a demultiplexer. The recording/reproducing unit 1233 decodes the audio data and the video data using the decoder 1252. The recording/reproducing unit 1233 performs D/A conversion on the decoded audio data, and outputs it to the speaker of the monitor 1260. Furthermore, the recording/reproducing unit 1233 performs D/A conversion on the decoded video data, and outputs it to the display of the monitor 1260.

The recorder control unit 1226 reads the latest EPG data from the EPG data memory 1227 on the basis of a user instruction indicated by the infrared signal from the remote controller which is received via the receiving unit 1221, and supplies the EPG data to the OSD control unit 1231. The OSD control unit 1231 produces image data corresponding to the input EPG data, and outputs it to the display control unit 1232. The display control unit 1232 outputs the video data input from the OSD control unit 1231 to the display of the monitor 1260 to display it. This allows an EPG (electronic program guide) to be displayed on the display of the monitor 1260.

Furthermore, the hard disk recorder 1200 can also acquire various data such as video data, audio data, and EPG data supplied from another apparatus via a network such as the Internet.

The communication unit 1235 is controlled by the recorder control unit 1226 to acquire encoded data such as video data, audio data, and EPG data transmitted from another apparatus via a network, and supplies it to the recorder control unit 1226. The recorder control unit 1226 supplies, for example, encoded data of the acquired video data and audio data to the recording/reproducing unit 1233 to store it in a hard disk. At this time, the recorder control unit 1226 and the recording/reproducing unit 1233 may perform a process such as re-encoding as necessary.

Furthermore, the recorder control unit 1226 decodes encoded data of the acquired video data and audio data, and supplies obtained video data to the display converter 1230. The display converter 1230 processes the video data supplied from the recorder control unit 1226 in a manner similar to that of the video data supplied from the video decoder 1225, and supplies the resulting video data to the monitor 1260 via the display control unit 1232 to display an image thereof.

Furthermore, along with the display of the image, the recorder control unit 1226 may supply decoded audio data to the monitor 1260 via the D/A converter 1234 and output audio thereof from the speaker.

Further, the recorder control unit 1226 decodes encoded data of the acquired EPG data, and supplies the decoded EPG data to the EPG data memory 1227.

The hard disk recorder 1200 as above uses the decoding apparatus 1 as each of the video decoder 1225, the decoder 1252, and the built-in decoder of the recorder control unit 1226. That is to say, similarly to the case of the decoding apparatus 1, the video decoder 1225, the decoder 1252, and the built-in decoder of the recorder control unit 1226 perform filtering on images of a plurality of reference planes in the base layer to generate a prediction image of the current block in the enhancement layer.

Accordingly, the video decoder 1225, the decoder 1252, and the built-in decoder of the recorder control unit 1226 can more effectively utilize the signal components in an image sequence than a spatial upsampling filter. As a result, a prediction image can have spatially higher frequency components than a prediction image generated through conventional upconversion prediction that utilizes an image of the current frame in the base layer, while prediction residuals can be reduced. That is to say, the amount of code for a picture to be encoded in the enhancement layer can be reduced, and it is possible to contribute to the improvement in encoding efficiency.

Moreover, in this filtering prediction, decoded images in the enhancement layer at temporally different frames are not referred to. Thus, the amount of processing necessary for encoding, the temporary storage capacity, the amount of information read from a memory, and the like can be reduced, and the cost taken for implementation can be reduced. Furthermore, power consumption can also be reduced.

Accordingly, the hard disk recorder 1200 can obtain a high-definition decoded image without increasing the load of processing during decoding when, for example, the tuner or the communication unit 1235 receives video data (encoded data) or when the recording/reproducing unit 1233 reproduces video data (encoded data) from a hard disk. That is to say, the hard disk recorder 1200 can improve encoding efficiency without preventing an increase in load.

Furthermore, the hard disk recorder 1200 uses the encoding apparatus 101 as the encoder 1251. Accordingly, similarly to the case of the encoding apparatus 101, the encoder 1251 obtains a prediction image that includes more high-frequency components than a prediction image generated through bidirectional prediction or upconversion prediction and that has a small difference from the original image. Hence, only a small amount of code to be assigned to a residual can be reduced, and it is possible to increase encoding efficiency. Since the resolution of reference frames is lower than that in the case of unidirectional prediction or bidirectional prediction in which frames in the enhancement layer are referred to, the load of processes such as saving reference frames in the frame memory 122 and reading reference frames from the frame memory 122 is small. Moreover, filtering prediction can be performed using at least two reference frames. Thus, such an increase in encoding efficiency is made feasible without increasing the complexity of processing.

Accordingly, the hard disk recorder 1200 performs encoding that takes spatial scalability into account when, for example, encoded data is recorded on a hard disk, by more efficiently utilizing the temporal correlation included in a signal sequence in a moving image, and therefore can, for example, improve encoding efficiency without preventing an increase in load of processes such as encoding and decoding.

Note that while the hard disk recorder 1200 that records video data and audio data on a hard disk has been explained, of course, any type of recording medium may be used. For example, even a recorder that uses a recording medium other than a hard disk, such as a flash memory, an optical disk, or a videotape, can also use the decoding apparatus 1 and the encoding apparatus 101 in a manner similar to that in the case of the hard disk recorder 1200 described above.

Figure 25:
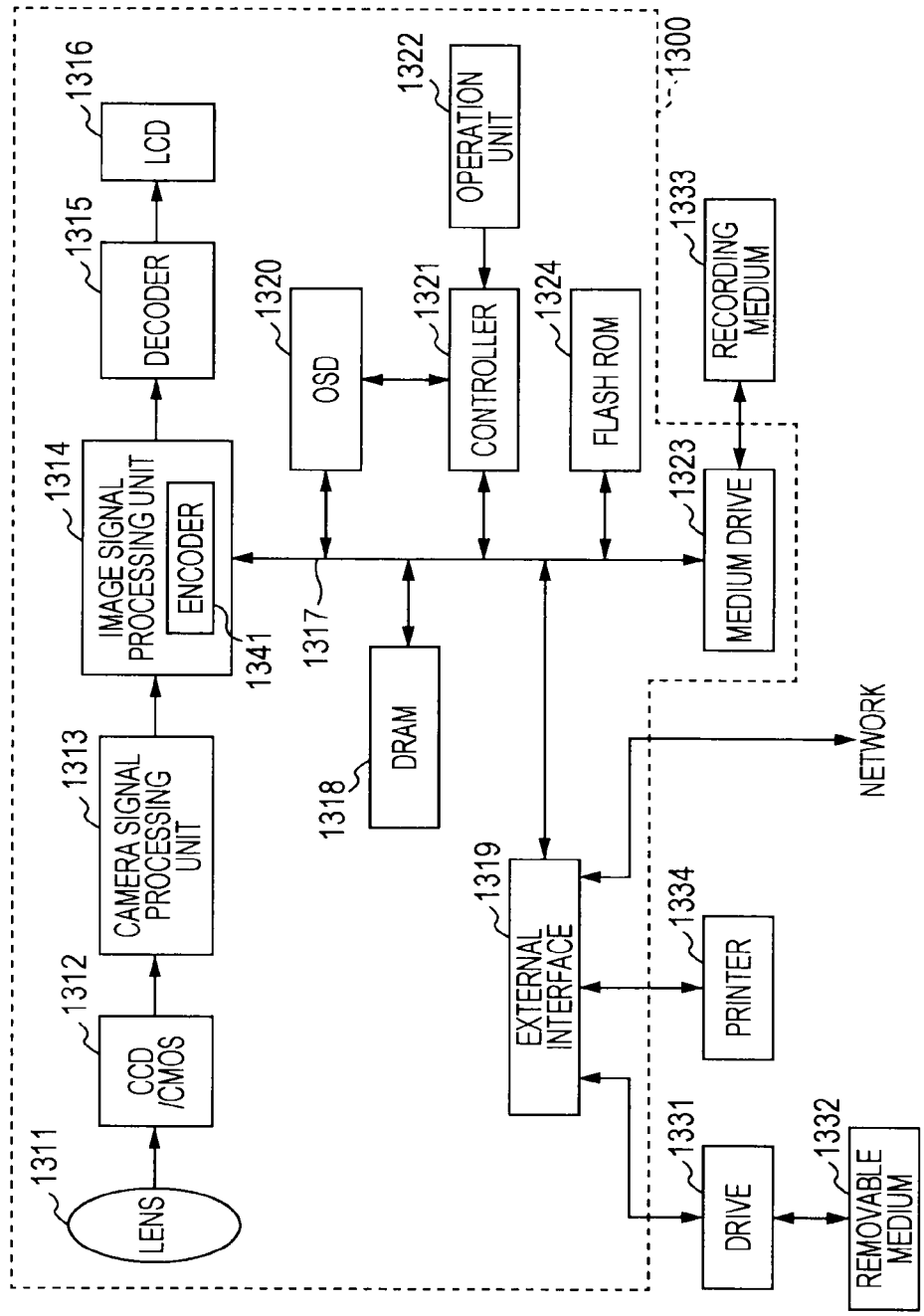
FIG. 25 is a block diagram illustrating an example configuration of a main part of a camera to which the present invention is applied.

FIG. 25 is a block diagram illustrating an example configuration of a main part of a camera that uses the decoding apparatus 1 and the encoding apparatus 101 to which the present invention is applied.

A camera 1300 illustrated in FIG. 25 captures an image of an object, and causes the image of the object to be displayed on an LCD 1316 or records it on a recording medium 1333 as image data.

A lens block 1311 causes light (that is, video of an object) to be incident on a CCD/CMOS 1312. The CCD/CMOS 1312 is an image sensor that uses a CCD or a CMOS, converts the intensity of received light into an electrical signal, and supplies it to a camera signal processing unit 1313.

The camera signal processing unit 1313 converts the electrical signal supplied from the CCD/CMOS 1312 into Y, Cr, and Cb color difference signals, and supplies them to an image signal processing unit 1314. Under the control of a controller 1321, the image signal processing unit 1314 performs certain image processing on the image signal supplied from the camera signal processing unit 1313, or encodes the image signal using an encoder 1341. The image signal processing unit 1314 supplies encoded data generated by encoding the image signal to the decoder 1315. Further, the image signal processing unit 1314 acquires display data generated by an on-screen display (OSD) 1320, and supplies it to a decoder 1315.

In the foregoing processes, the camera signal processing unit 1313 utilizes a DRAM (Dynamic Random Access Memory) 1318 connected via a bus 1317, and causes image data, encoded data obtained by encoding the image data, or the like to be held in the DRAM 1318 as necessary.

The decoder 1315 decodes the encoded data supplied from the image signal processing unit 1314, and supplies obtained image data (decoded image data) to the LCD 1316. Furthermore, the decoder 1315 supplies the display data supplied from the image signal processing unit 1314 to the LCD 1316. The LCD 1316 combines the image of the decoded image data supplied from the decoder 1315 and the image of the display data, as appropriate, and displays a resulting composite image.

Under the control of the controller 1321, the on-screen display 1320 outputs display data such as a menu screen formed of signs, characters, or figures, and an icon to the image signal processing unit 1314 via the bus 1317.

The controller 1321 executes various processes on the basis of a signal indicating the content of a command issued by a user using an operation unit 1322, and also controls the image signal processing unit 1314, the DRAM 1318, an external interface 1319, the on-screen display 1320, a medium drive 1323, and the like via the bus 1317. A FLASH ROM 1324 stores programs, data, and the like necessary for the controller 1321 to execute various processes.

For example, the controller 1321 can encode image data stored in the DRAM 1318 or decode encoded data stored in the DRAM 1318 on behalf of the image signal processing unit 1314 or the decoder 1315. At this time, the controller 1321 may perform an encoding or decoding process using a scheme similar to the encoding or decoding scheme of the image signal processing unit 1314 or the decoder 1315, or may perform an encoding or decoding process using a scheme that is not supported by the image signal processing unit 1314 or the decoder 1315.

Furthermore, for example, in a case where an instruction for starting printing an image has been issued from the operation unit 1322, the controller 1321 reads image data from the DRAM 1318, and supplies it to a printer 1334 connected to the external interface 1319 via the bus 1317 to print it.

Further, for example, in a case where an instruction for recording an image has been issued from the operation unit 1322, the controller 1321 reads encoded data from the DRAM 1318, and supplies it to the recording medium 1333 attached to the medium drive 1323 via the bus 1317 to store it.

The recording medium 1333 is, for example, any readable and rewritable removable medium such as a magnetic disk, a magneto-optical disk, an optical disk, or a semiconductor memory. The recording medium 1333 may also be, of course, any type of removable medium, and may be a tape device, a disk, or a memory card. Of course, a non-contact IC card or the like may also be used.

Furthermore, the medium drive 1323 and the recording medium 1333 may also be integrally formed into, for example, a non-portable storage medium such as a built-in hard disk drive or an SSD (Solid State Drive).

The external interface 1319 is composed of, for example, a USB input/output terminal or the like, and is connected to the printer 1334 in a case where an image is to be printed. Furthermore, a drive 1331 is connected to the external interface 1319 as necessary, and a removable medium 1332 such as a magnetic disk, an optical disk, or a magneto-optical disk is attached as appropriate, so that a computer program read therefrom is installed into the FLASH ROM 1324 as necessary.

Further, the external interface 1319 includes a network interface that is connected to a certain network such as a LAN or the Internet. The controller 1321 can read encoded data from the DRAM 1318 in accordance with an instruction from, for example, the operation unit 1322, and supply it to another apparatus connected via a network from the external interface 1319. Furthermore, the controller 1321 can acquire, via the external interface 1319, encoded data or image data supplied from another apparatus via a network, and hold it in the DRAM 1318 or supply it to the image signal processing unit 1314.

The camera 1300 as above uses the decoding apparatus 1 as the decoder 1315. That is to say, similarly to the case of the decoding apparatus 1, the decoder 1315 performs filtering on images of a plurality of reference planes in the base layer to generate a prediction image of the current block in the enhancement layer. Accordingly, the decoder 1315 can more effectively utilize the signal components in an image sequence than a spatial upsampling filter. As a result, a prediction image can have spatially higher frequency components than a prediction image generated through conventional upconversion prediction that utilizes an image of the current frame in the base layer, while prediction residuals can be reduced. That is to say, the amount of code for a picture to be encoded in the enhancement layer can be reduced, and it is possible to contribute to the improvement in encoding efficiency.

Accordingly, the camera 1300 can improve encoding efficiency without preventing an increase in load for, for example, image data generated by the CCD/CMOS 1312, when encoded data of video data is read from the DRAM 1318 or the recording medium 1333, or when encoded data of video data is acquired via a network.

Furthermore, the camera 1300 uses the encoding apparatus 101 as the encoder 1341. Similarly to the case of the encoding apparatus 101, the encoder 1341 can obtain a prediction image that includes more high-frequency components than a prediction image generated through bidirectional prediction or upconversion prediction and that has a small difference from the original image. Hence, only a small amount of code to be assigned to a residual can be reduced, and it is possible to increase encoding efficiency. Since the resolution of reference frames is lower than that in the case of unidirectional prediction or bidirectional prediction in which frames in the enhancement layer are referred to, the load of processes such as saving reference frames in the frame memory 122 and reading reference frames from the frame memory 122 is small. Moreover, filtering prediction can be performed using at least two reference frames. Thus, such an increase in encoding efficiency is made feasible without increasing the complexity of processing.

Accordingly, the camera 1300 performs encoding that takes spatial scalability into account when, for example, encoded data is recorded on the DRAM 1318 or the recording medium 1333, or when encoded data is provided to another apparatus, by more efficiently utilizing the temporal correlation included in a signal sequence in a moving image, and therefore can, for example, improve encoding efficiency without preventing an increase in load of processes such as encoding and decoding.

Note that a decoding method of the decoding apparatus 1 may be applied to a decoding process performed by the controller 1321. Similarly, an encoding method of the encoding apparatus 101 may be applied to an encoding process performed by the controller 1321.

Furthermore, image data captured by the camera 1300 may be that of a moving image or a still image.

Of course, the decoding apparatus 1 and the encoding apparatus 101 can also be applied to an apparatus or a system other than the apparatuses described above.

Furthermore, the dimensions of a macroblock are arbitrary. The present invention can be applied to, for example, a macroblock having any dimension as illustrated in FIG. 26. For example, the present invention can be applied not only to a normal macroblock of 16×16 pixels but also to an extended macroblock (extension macroblock) such as a macroblock of 32×32 pixels.

In FIG. 26, in the upper portion, macroblocks composed of 32×32 pixels that are divided by blocks (partitions) of 32×32 pixels, 32×16 pixels, 16×32 pixels, and 16×16 pixels are illustrated in sequence from the left. Furthermore, in the middle portion, blocks composed of 16×16 pixels that are divided by blocks of 16×16 pixels, 16×8 pixels, 8×16 pixels, and 8×8 pixels are illustrated in sequence from the left. Moreover, in the lower portion, blocks composed of 8×8 pixels that are divided by blocks of 8×8 pixels, 8×4 pixels, 4×8 pixels, and 4×4 pixels are illustrated in sequence from the left.

That is, macroblocks of 32×32 pixels can be processed by blocks of 32×32 pixels, 32×16 pixels, 16×32 pixels, and 16×16 pixels illustrated in the upper portion.

The block of 16×16 pixels illustrated on the right side in the upper portion can be processed by, similarly to the H.264/AVC scheme, blocks of 16×16 pixels, 16×8 pixels, 8×16 pixels, and 8×8 pixels illustrated in the middle portion.

The block of 8×8 pixels illustrated on the right side in the middle portion can be processed by, similarly to the H.264/AVC scheme, blocks of 8×8 pixels, 8×4 pixels, 4×8 pixels, and 4×4 pixels illustrated in the lower portion.

The above blocks can be classified into the following three hierarchical layers. That is, the blocks of 32×32 pixels, 32×16 pixels, and 16×32 pixels illustrated in the upper portion of FIG. 26 are referred to as blocks in a first hierarchical layer. The block of 16×16 pixels illustrated on the right side in the upper portion, and the blocks of 16×16 pixels, 16×8 pixels, and 8×16 pixels illustrated in the middle portion are referred to as blocks in a second hierarchical layer. The block of 8×8 pixels illustrated on the right side in the middle portion, and the blocks of 8×8 pixels, 8×4 pixels, 4×8 pixels, and 4×4 pixels illustrated in the lower portion are referred to as blocks in a third hierarchical layer.

With the adoption of the above hierarchical layer structure, with regard to the blocks equal to or lower than the block of 16×16 pixels, larger blocks can be defined as supersets thereof while maintaining the compatibility with the H.264/AVC scheme.

For example, the decoding apparatus 1 and the encoding apparatus 101 may be configured to generate a prediction image for each hierarchical layer. Furthermore, for example, the decoding apparatus 1 and the encoding apparatus 101 may be configured to utilize a prediction image, which is generated in the first hierarchical layer that has a larger block size than the second hierarchical layer, also for the second hierarchical layer.

Macroblocks for which encoding is to be performed using a comparatively large block size, such as the first hierarchical layer and the second hierarchical layer, do not include comparatively high-frequency components. In contrast, macroblocks for which encoding is to be performed using a comparatively small block size, such as the third hierarchical layer, are considered to include comparatively high-frequency components.

Thus, prediction images are separately generated in accordance with individual hierarchical layers having different block sizes, thus making feasible improvement in encoding performance suitable for local characteristics of an image.

REFERENCE SIGNS LIST

1 decoding apparatus, 12 lossless decoding circuit, 15 adder circuit, 19 frame memory, 21 motion prediction/compensation circuit, 41 prediction judgment circuit, 51 prediction selection circuit, 64 filtering prediction circuit, 71 extraction circuit, 72 filtering circuit, 81 difference calculation circuit, 82 upconversion circuit, 83 low-pass filter circuit, 84 gain adjustment circuit, 85 high-pass filter circuit, 86 gain adjustment circuit, 87 adder circuit, 88 upconversion circuit, 89 adder circuit, 101 encoding apparatus, 112 rearrangement buffer, 123 mode determination circuit, 125 motion prediction/compensation circuit, 126 intra-prediction circuit, 145 filtering prediction circuit, 155 filtering prediction circuit, 211 filtering circuit

The invention claimed is:

1. An image processing apparatus comprising:
processing circuitry including:
an extraction circuitry portion that performs motion compensation using, as reference frames, frames formed of decoded images and using motion vectors in images that have been encoded, and that extracts motion compensation images having a lower resolution than a prediction image from the reference frames corresponding to the prediction image; and
a prediction imaging circuitry portion that performs a filtering process to compensate the motion compensation images extracted by the extraction circuitry portion for high-frequency components by utilizing correlation in a time direction that is included in the motion compensation images, thereby generating the prediction image that has a higher resolution than the motion compensation images,
wherein the prediction imaging circuitry portion includes
a converter that converts a resolution of a difference image between a plurality of the motion compensation images extracted by the extraction circuitry portion and that increases the resolution of the difference image,
a first filter that applies a low-pass filter to the difference image whose resolution has been increased by the converter,
a second filter that applies a high-pass filter to an image obtained by applying the low-pass filter by the first filter, and
an adder that adds the image obtained by applying the low-pass filter by the first filter and another image obtained by applying the high-pass filter by the second filter to one of the plurality of the motion compensation images extracted by the extraction circuitry portion, and that generates the prediction image.

2. The image processing apparatus according to claim 1,
wherein the images that have been encoded have been hierarchically decomposed into images in a plurality of layers having different resolutions,
wherein when decoding of a high-resolution layer is to be performed, the extraction circuitry portion uses, as the reference frames, frames in a layer having a lower resolution than the layer, and extracts the motion compensation images from the reference frames in the layer having the lower resolution, and
wherein the prediction imaging circuitry portion generates the prediction image in the high-resolution layer by performing the filtering process on the motion compensation images extracted from the reference frames in the layer having the lower resolution.

3. The image processing apparatus according to claim 1,
wherein the adder adds the image obtained by applying the low-pass filter by the first filter and the another image obtained by applying the high-pass filter by the second filter to a motion compensation image extracted from a preceding frame with respect to a time of the prediction image.

4. The image processing apparatus according to claim 1,
wherein the processing circuitry further includes:
a receiving circuitry portion that receives an identification flag identifying whether the prediction image is to be generated through unidirectional prediction, through bidirectional prediction, or through the filtering process performed by the prediction imaging circuitry portion; and
a judging circuitry portion that judges whether the prediction image is to be generated through said unidirectional prediction, through said bidirectional prediction, or through the filtering process, by referring to the identification flag received by the receiving circuitry portion.

5. The image processing apparatus according to claim 4,
wherein the processing circuitry further includes:
a unidirectional predictor circuitry portion that performs said unidirectional prediction using the plurality of motion compensation images, and that generates the prediction image; and
a bidirectional predictor circuitry portion that performs said bidirectional prediction using the plurality of motion compensation images, and that generates the prediction image.

6. The image processing apparatus according to claim 1,
wherein the processing circuitry further includes:
a decoder that decodes an encoded image; and
a generating circuitry portion that adds the encoded image decoded by the decoder and the prediction image, and that generates a decoded image.

7. An image processing method comprising:
performing motion compensation using, as reference frames, frames formed of decoded images and using motion vectors in images that have been encoded, and extracting motion compensation images having a lower resolution than a prediction image from the reference frames corresponding to the prediction image; and
performing a filtering process to compensate the extracted motion compensation images for high-frequency components by utilizing correlation in a time direction that is included in the motion compensation images, thereby generating the prediction image that has a higher resolution than the motion compensation images, wherein said performing the filtering process includes:
converting a resolution of a difference image between a plurality of the extracted motion compensation images and increasing the resolution of the difference image,
applying a low-pass filter to the difference image whose resolution has been increased,
applying a high-pass filter to an image obtained by said applying the low-pass filter,
adding the image obtained by said applying the low-pass filter and another image obtained by said applying the high-pass filter to one of the plurality of the extracted motion compensation images, and
generating the prediction image.

8. An image processing apparatus comprising:
processing circuitry including:
a detecting circuitry portion that detects motion vectors based on images and an original image that is an image to be encoded, each of the images being obtained by performing local decoding based on a residual signal indicating a difference between the original image and a prediction image;
an extraction circuitry portion that performs motion compensation using, as reference frames, frames formed of the locally decoded images and using the motion vectors detected by the detecting circuitry portion, and that extracts motion compensation images having a lower resolution than the prediction image from the reference frames corresponding to the prediction image; and
a prediction imaging circuitry portion that performs a filtering process to compensate the motion compensation images extracted by the extracting circuitry portion for high-frequency components by utilizing correlation in a time direction that is included in the motion compensation images, thereby generating the prediction image having a higher resolution than the motion compensation images,
wherein the prediction imaging circuitry portion includes
a converter that converts a resolution of a difference image between a plurality of the motion compensation images extracted by the extraction circuitry portion and that increases the resolution of the difference image,
a first filter that applies a low-pass filter to the difference image whose resolution has been increased by the converter,
a second filter that applies a high-pass filter to an image obtained by applying the low-pass filter by the first filter, and
an adder that adds the image obtained by applying the low-pass filter by the first filter and another image obtained by applying the high-pass filter by the second filter to one of the plurality of the motion compensation images extracted by the extraction circuitry portion, and that generates the prediction image.

9. The image processing apparatus according to claim 8,
wherein when decoding of a high-resolution layer is to be performed, the extraction circuitry portion uses, as the reference frames, frames in a layer having a lower resolution than the layer, and extracts the motion compensation images from the reference frames in the layer having a lower resolution using motion vectors detected in the layer having the lower resolution by the detecting circuitry portion, and
wherein the prediction imaging circuitry portion generates the prediction image in the high-resolution layer by performing the filtering process on the motion compensation images extracted from the reference frames in the layer having the lower resolution.

10. The image processing apparatus according to claim 8, wherein the adder adds the image obtained by applying the low-pass filter by the first filter and the another image obtained by applying the high-pass filter by the second filter to a motion compensation image extracted from a preceding frame with respect to a time of the prediction image.

11. The image processing apparatus according to claim 8, wherein the processing circuitry further includes:
an encoder that encodes an original image that is an image to be encoded, and that generates an encoded image.

12. The image processing apparatus according to claim 11, wherein the encoder makes a header including an identification flag identifying whether the prediction image to be added to an image decoded by a decoder is to be generated through unidirectional prediction, through bidirectional prediction, or through the filtering process.

13. An image processing method comprising:
detecting motion vectors based on images and an original image that is an image to be encoded, each of the images being obtained by performing local decoding based on a residual signal indicating a difference between the original image and a prediction image;
performing motion compensation using, as reference frames, frames formed of the locally decoded images and using the detected motion vectors, and extracting motion compensation images having a lower resolution than the prediction image from the reference frames corresponding to the prediction image; and
performing a filtering process to compensate the extracted motion compensation images for high-frequency components by utilizing correlation in a time direction that is included in the motion compensation images, thereby generating the prediction image having a higher resolution than the motion compensation images,
wherein said performing the filtering process includes:
converting a resolution of a difference image between a plurality of the extracted motion compensation images and increasing the resolution of the difference image,
applying a low-pass filter to the difference image whose resolution has been increased,
applying a high-pass filter to an image obtained by said applying the low-pass filter,
adding the image obtained by said applying the low-pass filter and another image obtained by said applying the high-pass filter to one of the plurality of the extracted motion compensation images, and
generating the prediction image.

\* \* \* \* \*